(12) United States Patent
Favor et al.

(10) Patent No.: US 12,282,430 B1
(45) Date of Patent: Apr. 22, 2025

(54) MACRO-OP CACHE DATA ENTRY POINTERS DISTRIBUTED AS INITIAL POINTERS HELD IN TAG ARRAY AND NEXT POINTERS HELD IN DATA ARRAY FOR EFFICIENT AND PERFORMANT VARIABLE LENGTH MACRO-OP CACHE ENTRIES

(71) Applicant: Ventana Micro Systems Inc., Cupertino, CA (US)

(72) Inventors: John G. Favor, San Francisco, CA (US); Michael N. Michael, Folsom, CA (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 18/380,152

(22) Filed: Oct. 13, 2023

Related U.S. Application Data

(63) Continuation-in-part of application No. 18/240,249, filed on Aug. 30, 2023.

(51) Int. Cl.
*G06F 12/08* (2016.01)
*G06F 12/0864* (2016.01)

(52) U.S. Cl.
CPC .... *G06F 12/0864* (2013.01); *G06F 2212/452* (2013.01)

(58) Field of Classification Search
CPC ............ G06F 12/0895; G06F 12/0864; G06F 12/0871; G06F 12/0875; G06F 12/0815; G06F 12/0808; G06F 2212/452; G06F 2212/657; G06F 9/30145; G06F 9/30047; G06F 9/30043; G06F 9/3016;
(Continued)

(56) References Cited

U.S. PATENT DOCUMENTS 7,590,825 B2   9/2009   Krimer et al.
7,681,019 B1   3/2010   Favor
(Continued)

OTHER PUBLICATIONS

Slechta, Brian et al. "Dynamic Optimization of Micro-Operations." HPCA '03: Proceedings of the 9th International Symposium on High-Performance Computer Architecture. Feb. 2003. pp. 1-12.
(Continued)

*Primary Examiner* — Tracy C Chan
(74) *Attorney, Agent, or Firm* — E. Alan Davis; Huffman Law Group, PC

(57) ABSTRACT

A microprocessor includes a macro-op (MOP) cache (MOC) comprising a set-associative MOC tag RAM (MTR) and a MOC data RAM (MDR) managed as a pool of MDR entries. A MOC entry (ME) comprises one MTR entry and one or more MDR entries that hold the MOPs of the ME. The MDR entries of the ME have a program order. Each MDR entry holds MOPs and a next MDR entry pointer. Each MTR entry holds initial MDR entry pointers and specifies the number of the MDR entries of the ME. During ME allocation, the MOC populates the MDR entry pointers to point to the MDR entries based on the program order. In response to an access that hits upon an MTR entry, the MOC fetches the MDR entries according to the program order initially using the initial pointers and subsequently using the next pointers.

27 Claims, 16 Drawing Sheets

(58) Field of Classification Search
CPC .. G06F 9/3802; G06F 9/3804; G06F 9/30196; G06F 9/5016; G06F 9/383
See application file for complete search history.

(56) References Cited

U.S. PATENT DOCUMENTS

| | | | |
|---|---|---|---|
| 7,797,517 | B1 | 9/2010 | Favor |
| 7,814,298 | B1 | 10/2010 | Thaik et al. |
| 7,870,369 | B1 | 1/2011 | Nelson et al. |
| 7,941,607 | B1 | 5/2011 | Thaik et al. |
| 7,949,854 | B1 | 5/2011 | Thaik et al. |
| 7,953,933 | B1 | 5/2011 | Thaik et al. |
| 7,953,961 | B1 | 5/2011 | Thaik et al. |
| 7,987,342 | B1 | 7/2011 | Thaik et al. |
| 8,032,710 | B1 | 10/2011 | Ashcraft et al. |
| 8,037,285 | B1 | 10/2011 | Thaik et al. |
| 8,103,831 | B2 | 1/2012 | Rappoport et al. |
| 8,370,609 | B1 | 2/2013 | Favor et al. |
| 8,499,293 | B1 | 7/2013 | Ashcraft et al. |
| 8,930,679 | B2 | 1/2015 | Day et al. |
| 9,524,164 | B2 | 12/2016 | Olson et al. |
| 10,579,535 | B2 | 3/2020 | Rappoport et al. |
| 2012/0311308 | A1 | 12/2012 | Xekalakis et al. |
| 2015/0100762 | A1 | 4/2015 | Jacobs |
| 2017/0139706 | A1 | 5/2017 | Chou et al. |
| 2019/0188142 | A1* | 6/2019 | Rappoport ............ G06F 9/3017 |
| 2019/0303161 | A1 | 10/2019 | Nassi et al. |
| 2020/0110610 | A1* | 4/2020 | Lapeyre ............... G06F 9/3818 |
| 2020/0125498 | A1 | 4/2020 | Betts et al. |
| 2021/0026770 | A1* | 1/2021 | Ishii ..................... G06F 9/3802 |
| 2022/0107807 | A1* | 4/2022 | Schinzler ............. G06F 9/3836 |
| 2023/0305962 | A1* | 9/2023 | Dutta .................. G06F 9/30145 |
| 2025/0077438 | A1 | 3/2025 | Favor et al. |

OTHER PUBLICATIONS

Petric, Vlad et al. "RENO: A Rename-Based Instruction Optimizer." ACM SIGARCH Computer Architecture News, vol. 33, Issue 2. May 2005. pp. 98-109.

Patel, Sanjay J. et al. "rePLay: A Hardware Framework for Dynamic Optimization." IEEE Transactions on Computers, vol. 50, No. 6. Jun. 2001. pp. 590-608.

Moody, Logan et al. "Speculative Code Compaction: Eliminating Dead Code via Speculative Microcode Transformations." 2022 55th IEEE/ACM International Symposium on Microarchitecture (MICRO) Chicago, IL. 2022. pp. 162-180.

Behar, Michael et al. "Trace Cache Sampling Filter." ACM Transactions on Computer Systems. Feb. 2007. pp. 1-10.

Friendly, Daniel Holmes et al. "Putting the fill unit to work: dynamic optimizations for trace cache microprocessors." MICRO 31: Proceedings of the 31st Annual ACM/IEEE International Symposium on Microarchitecture. Nov. 1998. pp. 173-181.

Rotenberg, Eric et al. "Trace Cache: a Low Latency Approach to High Bandwidth Instruction Fetching." *Proceedings of the 29th Annual IEEE/ACM International Symposium on Microarchitecture. MICRO 29*, Paris, France. 1996. pp. 24-34. doi: 10.1109/MICRO.1996.566447.

Ren, Xida et al. "I see Dead µops: Leaking Secrets via Intel/AMD Micro-Op Caches." *2021 ACM/IEEE 48th Annual Internaitonal Symposium on Computer Architecture (ISCA)*, Valencia, Spain, 2021. pp. 361-374. doi: 10.1109/ISCA52012.2021.00036.

Kotra, Jagadish B. et al. "Improving the Utilization of Micro-operation Caches in x86 Processors." *2020 53rd Annual IEEE/ACM International Symposium on Microarchitecture (MICRO)*, Athens, Greece, 2020. pp. 160-172. doi: 10.1109/MICRO50266.2020.00025.

Burtscher, Martin et al. "Load Value Prediction Using Prediction Outcome Histories." 1999 Technical Report CU-CS-873-98. Department of Computer Science, University of Colorado. pp. 1-9.

Appendix to the specification, 25 Pages, Mail room date Jul. 23, 2007, Doc code Appendix, referred to as "Appendix A" at col. 4, lines 46-47 of U.S. Pat. No. 7,987,342 to Thaik et al. issued Jul. 26, 2011; downloaded Jul. 23, 2024 from https://patentcenter.uspto.gov/applications/11880862/ifw/docs?application=.

Appendix to the specification, 28 Pages, Mail room date Jul. 23, 2007, Doc code Appendix, referred to as "Appendix B" at col. 4, lines 48-49 of U.S. Pat. No. 7,987,342 to Thaik et al. issued Jul. 26, 2011; downloaded Jul. 23, 2024 from https://patentcenter.uspto.gov/applications/11880862/ifw/docs?application=.

White Paper. "Security Analysis of AMD Predictive Store Forwarding." Advanced Micro Devices, Inc. (AMD). Aug. 2023. pp. 1-7.

Liu, Chang et al. "Uncovering and Exploiting AMD Speculative Memory Access Predictors for Fun and Profit." 2024 IEEE International Symposium on High-Performance Computer Architecture (HPCA). Mar. 2-6, 2024. pp. 1-15.

\* cited by examiner

*FIG. 2*

200 FBP entry

| FBP tag 202 | predicted set index 204 | predicted way number 206 | fetch block length 208 | PC-relative target address 212 | termination type 214 | FBlk hotness counter (FBHC) 217 | translated address bits

*FIG. 3A*

300 FBD

| FBP hit 302 | predicted set index 304 | predicted way number 306 | fetch block length 308 | FBSA 312 | fetch source indicator (FSI) 314 | initial MDR pointers 316 | hot FBlk (HFB) 318 | numMDREs 319 | translated address bits

*FIG. 3B*

330 MTR entry (MTRE)

| MTR tag 332 | initial MDR pointer(s) 336 | numMDREs 339 |

*FIG. 3C*

340 MDR entry (MDRE)

| MOPs 342 | next MDR pointer 344 |

*FIG. 3D*

350 MOC entry (ME)

| MTRE 330 | MDRE 340 | ... | MDRE 340 |

*FIG. 3E*

360 FBlk FIFO entry

| Valid 362 | Type 364 | Data (AIs or MOPs, as indicated by Type) 366 |

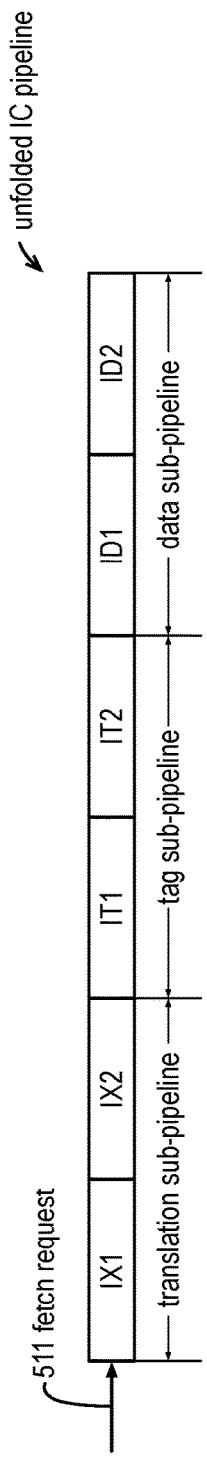
FIG. 7A
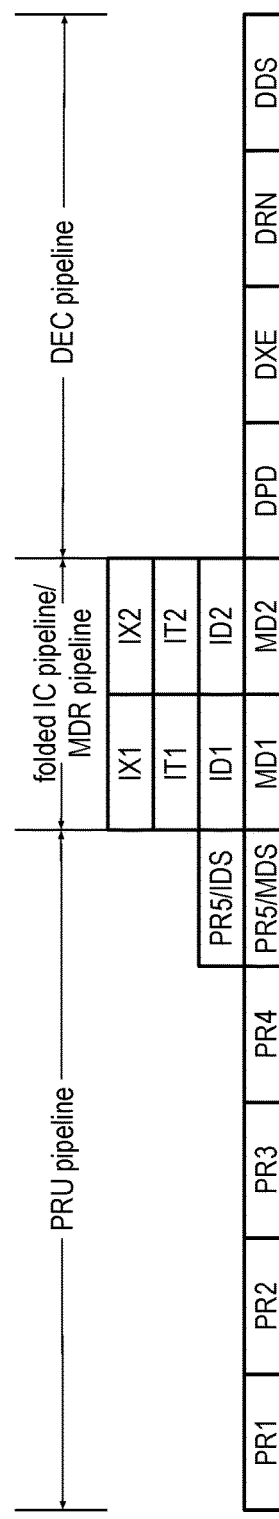
FIG. 7B

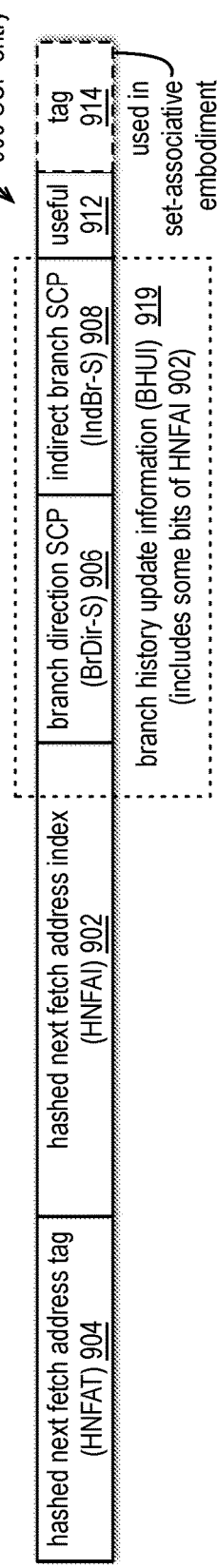
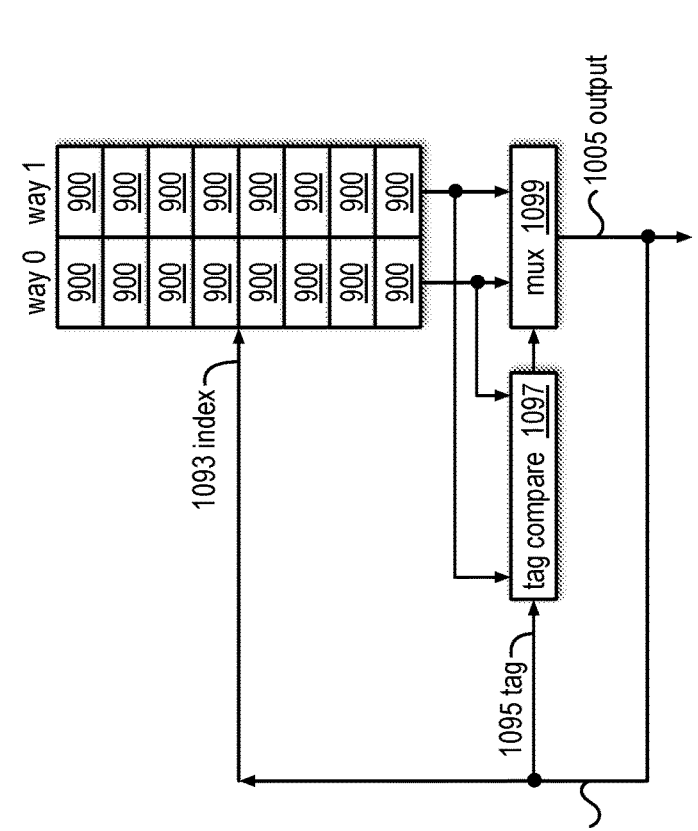
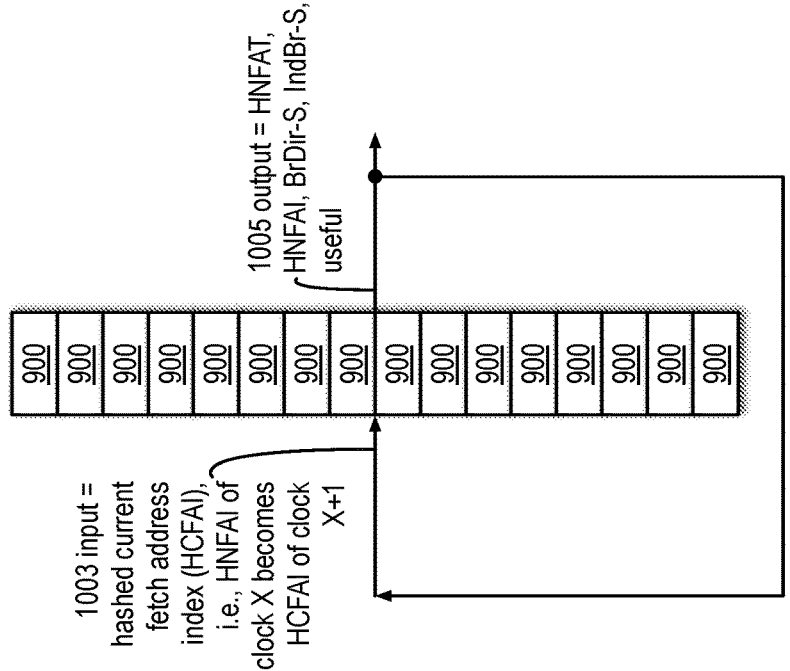
FIG. 9
FIG. 10A
FIG. 10B

FIG. 12

← 102 PRU pipeline stages

| PR1 1201 | PR2 1202 | PR3 1203 | PR4 1204 | PR5 1205 |
|---|---|---|---|---|
| Access SCP to obtain HNFAI, HNFAT, BrDir-S, IndBr-S produced by previous FBlk. SCP is accessed using output (e.g., portion of HNFAI) of SCP provided during immediately previous clock cycle and fed back to SCP input. | Use BrDir-S, IndBr-S, and HNFAI bits and current branch history (e.g., GHist, CPHist, IPHist) to produce updated branch history. Hash updated branch history with HNFAI and HNFAT to generate indexes and tags used to access FSPU structures (e.g., CBP and IBP). Use PR2 as setup time for MTR, FBP, CBP, IBP, RAP RAM structure accesses (RAP may be flip-flop structure). Update current branch history using BrDir-S, IndBr-S, and HNFAI bits. | Use HNFAI and indexes generated in PR2 to initiate access of FSPU RAM structures to obtain MOC hit, initial MDR pointers, FBP hit, predicted set index, predicted way number, FBlk length, PC-relative target address, termination type, conditional branch direction, indirect branch target address, and return target address. Start FBP tag comparisons using HNFAT obtained in PR1 and use tags generated in PR2 to start CBP/IBP tag comparisons and table selections. | Finish tag comparisons and evaluation of table-based predictors to obtain MOC hit, initial MDR pointers and FBP/CBP/IBP/RAP predictions. Form fetch address of next FBlk (next FBSA, i.e., next FA produced by current FBlk), based on FBP/CBP/IBP/RAP predictions and fetch address of current FBlk (current FBSA). Next FBlk is FBlk immediately succeeding current FBlk in program execution order. Current FBSA is next FA of previous FBlk generated in PR4 during previous clock cycle and fed back to PR4 in this clock cycle. Predict BrDir-F/IndBr-F produced by current FBlk based on predictions of termination type, FBlk length, and conditional branch direction. Form FBD of current FBlk and push into FBD FIFO. Update restoration branch history with predicted BrDir-F/IndBr-F. Update RAP. | To check for possible SCP mis-prediction: (1) compare "correct" BrDir-F/IndBr-F produced by current FBlk as predicted by the FSPU against BrDir-S/IndBr-S obtained from SCP produced by the current FBlk as predicted by SCP in PR1 3 clock cycles earlier and fed forward to PR5 this clock cycle; (2) hash next FBSA produced by current FBlk as predicted by the FSPU to generate "correct" HNFAI and HNFAT, then compare against HNFAI and HNFAT obtained from SCP produced by the current FBlk as predicted by SCP in PR1 3 clock cycles earlier and fed forward to PR5 this clock cycle. If SCP mis-predicted: flush PRU pipeline, train SCP, restore current branch history from restoration branch history, restart PRU using "correct" next FBlk information. |

MACRO-OP CACHE DATA ENTRY POINTERS DISTRIBUTED AS INITIAL POINTERS HELD IN TAG ARRAY AND NEXT POINTERS HELD IN DATA ARRAY FOR EFFICIENT AND PERFORMANT VARIABLE LENGTH MACRO-OP CACHE ENTRIES

CROSS REFERENCE TO RELATED APPLICATION(S)

This application is a continuation-in-part (CIP) of U.S. Non-Provisional application Ser. No. 18/240,249, filed Aug. 30, 2023, which is hereby incorporated by reference in its entirety.

This application is related to U.S. Non-Provisional application Ser. No. 18/380,150, filed concurrently herewith, and which is hereby incorporated by reference in its entirety.

BACKGROUND

Microprocessors process data by fetching instructions from memory, typically referred to as system memory, and executing the fetched instructions. In conventional systems, the time required to fetch a block of instructions from system memory is on the order of one hundred clock cycles of the microprocessor. For this reason, high-performance microprocessors include one or more cache memories, or simply caches, into which the fetched instructions are stored. The cache is many orders of magnitude smaller than the system memory and, unlike the system memory, is typically included within the same integrated circuit that includes the one or more processing cores of the microprocessor. As a result, the time required to fetch an instruction from the cache, assuming it is found there, is typically an order of shorter than a fetch from system memory. The performance of the microprocessor may be significantly improved in accordance with the percentage of time instructions are found in the cache when needed, which is commonly referred to as the cache hit rate.

The cache hit rate may be affected by different characteristics of the cache. One of the characteristics is the size of the cache, i.e., the number of instructions the cache can hold. Generally, the larger the cache the higher the hit rate. Another characteristic that may affect the hit rate is the cache line size, which is the number of sequential bytes of instructions that are held together in an entry of the cache, e.g., 64 bytes.

Yet, another characteristic that may affect the hit rate is the replacement policy of the cache. When a new cache line of instructions is to be put into the cache, the replacement policy determines which entry of the cache will be replaced with the new cache line of instructions. Caches are commonly arranged as set associative caches having many sets each having multiple ways and each way having an entry for holding a cache line of instructions. A given memory address selects a set among the many sets. Each set includes replacement information used to implement the replacement policy. That is, the replacement information is used to decide which way of the selected set will be replaced. The replacement information indicates the usage history of the entries in the set relative to one another. When an entry of a given set is used because the entry is hit upon by the memory address that specifies the next one or more of the instructions to be fetched, the replacement information of the set is updated to reflect the use, such as the frequency of use or recency of use. For example, a popular replacement scheme is least-recently-used (LRU), or variations thereof, for which the replacement information may generally be characterized as maintaining a relative age of each entry with respect to its use. Each time the set is accessed, the replacement information for the set is updated to reflect the usage of the used entry and the non-usage of the other entries in the set. In an LRU replacement scheme, when the need arises to allocate an entry for a new cache line of instructions, the cache selects the least recently used way in the set for replacement as indicated by the replacement information.

Micro-Ops and Micro-Op Caches

Modern microprocessors are typically separated essentially into a front-end whose job is to fetch instructions and provide a stream of instructions to a back-end that executes the fetched instruction stream. The back-end includes execution units that are the functional units of the microprocessor that perform arithmetic, logical, memory or other operations to accomplish the semantics of the instructions of the program. The instructions fetched from system memory and cached in the cache of a microprocessor may be referred to as architectural instructions. Architectural instructions conform to the instruction set architecture (ISA) of the microprocessor, popular examples of which are x86, ARM, SPARC, MIPS, RISC-V, among others.

Modern microprocessors typically decode, or translate, architectural instructions into micro-operations, or simply micro-ops. The execution units in fact execute micro-ops rather than architectural instructions. For example, an execution unit performs the operations specified by a micro-op on source operands from source registers specified by the micro-op to produce a result operand that is written to a destination register specified by the micro-op and that may be used by other micro-ops as a source operand. Analogously to the fact that architectural instructions conform to the ISA of the microprocessor, micro-ops conform to a micro-architectural "micro-instruction set architecture" of the micro-architecture of the microprocessor. Unlike the ISA which is visible to programmers and/or compilers that write/generate programs using architectural instructions, the micro-instruction set architecture is not visible to programmers and compilers. Rather, the micro-architecture is defined by the designers of the microprocessor, and two microprocessors that conform to the same ISA but that are designed by different designers will almost certainly have different micro-architectural instruction sets.

The differences between architectural instructions and micro-ops may vary widely depending upon the ISA and the microarchitecture. For example, in the x86 ISA, the architectural instructions may be very complex, as evidenced by the fact that the length of an instruction may be in the tens of bytes. As a result, a complex x86 instruction may be decoded into several micro-ops. This was particularly true after the emergence of reduced instruction set computers (RISC) in the 1980's, after which the trend was often toward keeping the back-end as RISC-like as possible and the micro-ops relatively simple.

The complexity and power consumption required by the decode logic that decodes the architectural instructions into micro-ops may also vary widely depending upon the ISA. Using the x86 ISA again as an example, instructions can be variable length, ranging from a single byte to tens of bytes. Consequently, the decode logic for an x86 processor can be very complex and power consuming. This is especially true for a high-performance superscalar out-of-order back-end design that requires a high rate of micro-ops per clock cycle to consume. In such processors the decode is typically performed by multiple pipeline stages over multiple clock cycles. The longer the decode pipeline, the greater the decode latency, which may increase power consumption as well as the penalty associated with branch mispredictions, for example. Furthermore, there are often multiple decode pipelines that operate in parallel to provide micro-ops at the rate needed by the high-performance back-end, which may increase the power consumption even further.

Micro-op caches have been included in some high-performance microprocessors to supply micro-ops to the back-end at a high rate, to reduce decode latency, and to reduce power consumption. As the decode logic decodes architectural instructions into micro-ops, the micro-ops are allocated into the micro-op cache so that if the program instruction stream again includes the same architectural instructions, the associated micro-ops can be fetched from the micro-op cache. Fetching the micro-ops from the micro-op cache eliminates the need to decode the corresponding architectural instructions and eliminates the need to fetch the corresponding architectural instructions from the instruction cache, which may result in both a reduction in power consumption and decode latency, which may translate into higher performance. Fetching the micro-ops from the micro-op cache may also facilitate the ability to supply micro-ops to the back-end at a higher rate than when fetching architectural instructions from the instruction cache and decoding them into micro-ops.

Just as it is desirable to have a high hit rate in an architectural instruction cache, so also it is desirable to have a high hit rate in a micro-op cache so that the benefits of lower power consumption and higher performance may be experienced more often. Thus, as described above with respect to architectural instruction caches, micro-op caches have conventionally been designed to include replacement information to implement a replacement policy to decide which entry in the implicated set of the micro-op cache to replace. In an LRU replacement scheme, for example, when the decode logic decodes architectural instructions into a new group of micro-ops, the least recently used entry is selected for replacement, i.e., the new group of micro-ops is allocated into the least recently used entry.

Typically, there is no question about whether or not to allocate an entry in the micro-op cache for the new group of micro-ops. The only question is which entry in the selected set will be replaced to perform the allocation. However, it has been observed that generally speaking programs tend to have a relatively small percentage of instructions that are frequently executed and a relatively large percentage of instructions that are infrequently executed. Indeed, some instructions may only be executed once. Thus, a consequence of an "always allocate" policy is that in some instances-perhaps a significant percentage of instances—the new group of micro-ops might only have been executed the one time or may be executed relatively infrequently and in that case may unfortunately replace a group of micro-ops that is more frequently used than the new group of micro-ops, resulting in inefficient use of the micro-op cache. In a more sophisticated scheme, the micro-op cache may examine the replacement information and if none of the entries in the set is sufficiently old, e.g., the usage history indicates all the entries currently in the set have been used sufficiently recently, then the micro-op cache decides not to replace any of the current entries in the set, i.e., not to allocate an entry in the micro-op cache for the new group of micro-ops and to instead retain all the groups of micro-ops currently in the set.

Fetch Source Switching

As described above, significant performance and power efficiency may be achieved if the micro-op cache hit rate is high. However, sometimes the micro-ops associated with the current program instruction stream are not present in the micro-op cache. In this case the needed architectural instructions are fetched from the instruction cache and decoded into micro-ops. Eventually, the needed micro-ops will be present again in the micro-op cache such that they may be fetched from the micro-op cache again. Thus, there is a switching back and forth between the two fetch sources. Essentially, the processor predicts that the next fetch source will be the same as the current fetch source until it realizes it predicted incorrectly, i.e., the processor assumed the next fetch source will be the micro-op cache since the current fetch source is the micro-op cache but there is a miss in the micro-op cache, or the processor assumed the instruction cache will be the next fetch source since the instruction cache is the current fetch source but there was a hit in the micro-op cache. Because of the pipelined nature of the processor, conventionally there may be a penalty associated with such a misprediction/wrong assumption, i.e., the delay when switching from one fetch source to the other.

One solution to this problem is to fetch from both sources in parallel. That is, micro-ops are fetched from the micro-op cache while architectural instructions are fetched concurrently from the instruction cache. If there is a hit in the micro-op cache, the fetched architectural instructions are discarded, whereas if there is a miss in the micro-op cache, the fetched micro-ops are discarded. However, a drawback of this approach is that power is consumed by both fetch sources even though the power consumption by one fetch source is an unnecessary waste thus increasing power consumption.

U.S. Pat. No. 8,103,831 (the '831 Patent) issued to Rappoport et al. describes an efficient method for employing a micro-op cache in a processor. The '831 Patent's Abstract states:

A tag match for an instruction pointer retrieves a set of micro-op cache line access tuples having matching tags. The set is stored in a match queue. Line access tuples from the match queue are used to access cache lines in a micro-op cache data array to supply a micro-op queue. On a micro-op cache miss, a macro-instruction translation engine (MITE) decodes macro-instructions to supply the micro-op queue. Instruction pointers are stored in a miss queue for fetching macroinstructions from the MITE. The MITE may be disabled to conserve power when the miss queue is empty likewise for the micro-op cache data array when the match queue is empty. Synchronization flags in the last micro-op from the micro-op cache on a subsequent micro-op cache miss indicate where micro-ops from the MITE merge with micro-ops from the micro-op cache.

The '831 Patent further describes that "when the number of micro-op cache line access tuples stored in the match queue 222 at the time of a micro-op cache 202 miss is sufficiently large to oversupply line access tuples to micro-op cache data array 223, then the latency for switching to MITE 214 may be covered by a continued supply of micro-ops from the cache data array 223 to micro-op queue 216." However, the implication is that there will be instances when the switching latency is not covered up but instead incurred by the '831 Patent's processor. Furthermore, the loosely-coupled and loosely-synchronized dual path approach taken by the '831 Patent may involve a significant amount of cost and complexity, for example in terms of design verification due to the large space of possibilities to verify. As further observed by the '831 Patent, "the range of effective techniques for employing saved or cached micro-ops to improve processing of instructions and reduce costs in terms of circuit complexity and power consumption in a processor have not been fully explored."

Variable Length Micro-Op Cache Entries

Typically, micro-op caches are set-associative to improve hit rates in exchange for the increased delay and area required by additional comparators and muxes. Given the same cache size, higher associativity—i.e., a greater number of ways-generally yields a higher hit rate. The higher associativity reduces the likelihood that enough different memory addresses—i.e., more than the number of ways-will map to the same set to cause eviction of an entry that is needed soon after the eviction, often referred to as a conflict miss.

Furthermore, the number of micro-ops held in an entry of a micro-op cache may vary depending on various factors including the type of the architectural instructions (e.g., load/stores, arithmetic, integer, floating point) from which the micro-ops were decoded, the instruction set architecture (e.g., x86, ARM, RISC-V), and the micro-architectural instruction set supported by the execution units. Because the number of micro-ops held in the entry varies, a problem arises. One solution is to design a data field large enough to hold the maximum number of micro-ops. However, the larger the data field, the lower the efficiency of the cache due to wastage of space in the data field for entries that have fewer than the maximum number of micro-ops, which may be referred to as fragmentation.

U.S. Pat. No. 10,579,535 (the '535 Patent) issued to Rappoport et al. describes a defragmented and efficient micro-op cache. The micro-op cache of the '535 Patent is set-associative, and to each entry is allocated one or more ways of a tag array each of which includes multiple index pointers to a single micro-op in a data array. When the number of micro-ops exceeds the number of index pointers in a way, another way of the tag array must be allocated. Column 10, lines 8-14 of the '535 Patent states:

> The method 400 may continue with the processing logic allocating indexing metadata of the first entry to the micro-op tag array according to set-associative cache allocation, which may mean allocation of two entries crossing two separate ways as illustrated in FIG. 3 (420). FIG. 3 is only an example, as the processing logic may need to allocate more than two ways in order to cache all the uops that come from a given fetch line.

Thus, according to the '535 Patent, two or more ways of the micro-op cache may be needed to cache all the micro-ops that come from a given fetch line. Allocating multiple ways effectively reduces the associativity of the micro-op cache which may harm its performance in the form of increased conflict misses. Furthermore, as the '535 Patent recognizes, "a certain level of fragmentation . . . in the micro-op tag array" may occur, and that fragmentation increases as the number of index pointers increases. Finally, the maximum number of micro-ops that may be included in an entry of the micro-op cache of the '535 Patent is limited by the number of ways and the number of index pointers in a way.

BRIEF DESCRIPTION OF THE DRAWINGS

FIG. 2 is an example block diagram of an entry of the fetch block predictor (FBP) of FIG. 1, in accordance with embodiments of the present disclosure.

FIG. 3A is an example block diagram of a fetch block descriptor (FBD), in accordance with embodiments of the present disclosure.

FIG. 3B is an example block diagram of a macro-op cache (MOC) tag RAM entry in accordance with embodiments of the present disclosure.

FIG. 3C is an example block diagram of an MOC data RAM entry in accordance with embodiments of the present disclosure.

FIG. 3D is an example block diagram of a MOC entry in accordance with embodiments of the present disclosure.

FIG. 3E is an example block diagram of a fetch block (FBlk) first-in-first-out (FIFO) structure entry in accordance with embodiments of the present disclosure.

FIG. 7A is three example pipeline diagrams illustrating the MDR pipeline and dynamic operation of the IC pipeline of the IFU of FIG. 5 in both a folded mode and in an unfolded mode in accordance with embodiments of the present disclosure.

FIG. 7B is an example pipeline diagram illustrating the front-end and mid-end pipeline of the processor 100 of FIG. 1 in accordance with embodiments of the present disclosure.

FIG. 9 is example block diagram of a single-cycle predictor (SCP) entry in accordance with embodiments of the present disclosure.

FIG. 10A is an example block diagram of an SCP in accordance with embodiments of the present disclosure.

FIG. 10B is an example block diagram of an SCP in accordance with alternate embodiments of the present disclosure.

FIG. 12 is an example block diagram illustrating stages of the pipeline of the PRU of FIG. 11 in accordance with embodiments of the present disclosure.

DETAILED DESCRIPTION

Figure 1:
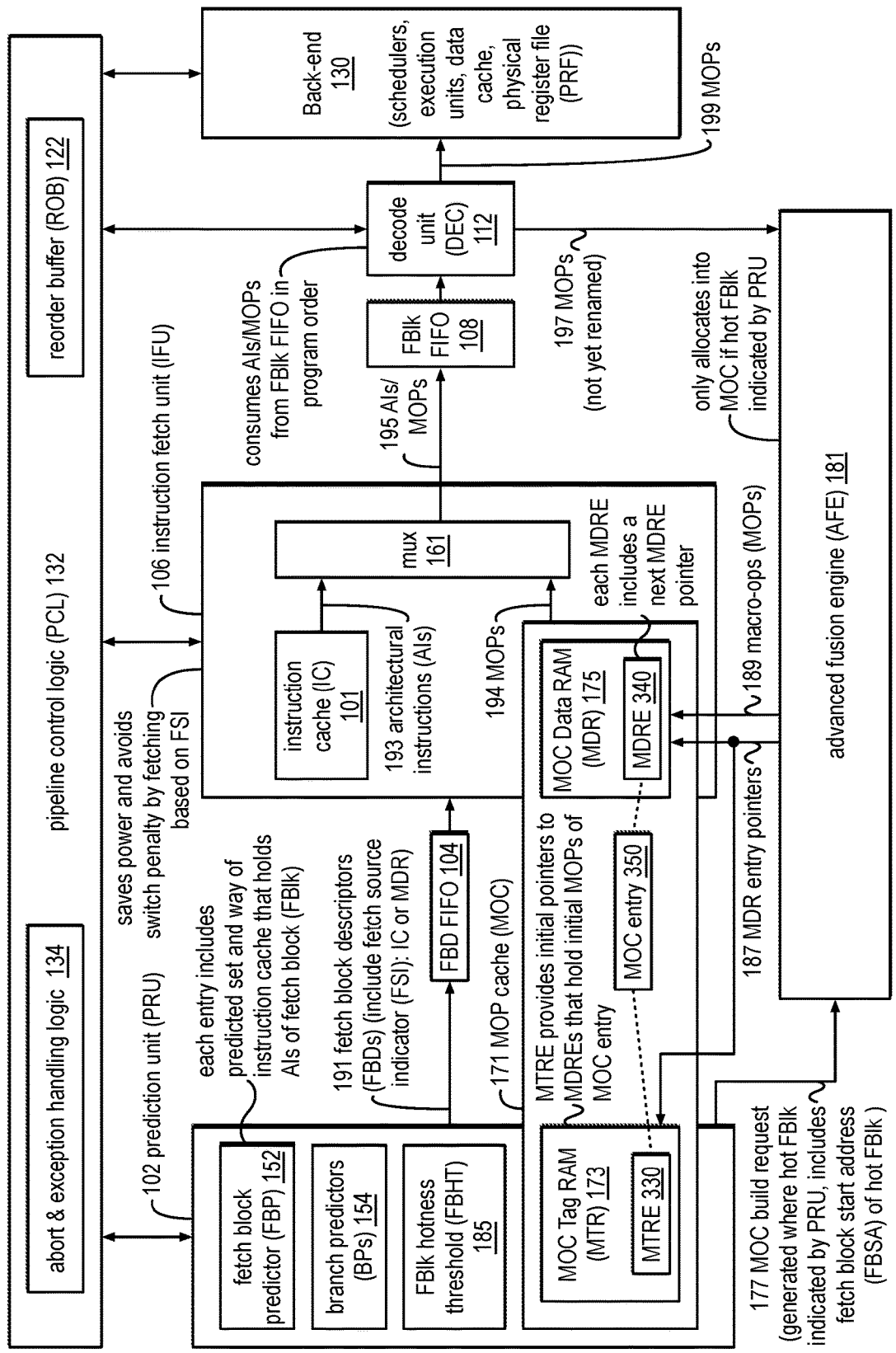
FIG. 1 is an example block diagram of a microprocessor core in accordance with embodiments of the present disclosure.

Embodiments are described that benefit from the power savings associated with disabling the source not being fetched from and that avoid the switch penalty incurred by a conventional design that can mis-predict that the current fetch source will be the next fetch source. The processor pipeline includes a prediction unit followed by an instruction fetch unit. The embodiments separate the micro-op cache into a tag array in the prediction unit and a data array in the instruction fetch unit. The data array is accessed using pointers provided by the tag array (and using pointers provided by entries fetched from the data array if the fetch block is sufficiently long). The prediction unit provides a sequence of fetch block descriptors in program order that describe a corresponding sequence of fetch blocks in a program instruction stream. A fetch block predictor in the prediction unit looks up a corresponding sequence of fetch block start addresses to generate a first hit indicator for each fetch block that indicates whether the fetch block is present in the program instruction stream. In parallel, the micro-op cache tag array looks up the fetch block start address to generate a second hit indicator that indicates a hit on a micro-op cache entry. A micro-op cache entry includes one tag array entry and one or more data array entries that hold the micro-ops. The instruction fetch unit, which includes an instruction cache and the micro-op cache data array, consumes the sequence of fetch block descriptors in program order to fetch architectural instructions from the instruction cache and micro-ops from the micro-op cache data array in program order and provide them in program order for consumption by a decode unit. Each fetch block descriptor includes a fetch source indicator that indicates the instruction cache if either of the hit indicators is false. In this manner the prediction unit already knows the correct fetch source and tells the instruction fetch unit before it starts to fetch such that the instruction fetch unit only fetches from the correct source and does so without having to incur a mis-prediction penalty. In other words, by concurrently looking up the fetch block start address in the fetch block predictor and micro-op cache tag array, the prediction unit concurrently determines what is the next fetch block and which fetch source to fetch from.

In addition to the tag array providing pointers to the entries in the data array that hold the micro-ops of the hit micro-op cache entry, the fetch block predictor provides the set and the way of the instruction cache in the case of a fetch block predictor hit, such that in either case only the data array of the instruction cache or the data array of the micro-op cache need be accessed within the instruction fetch unit, resulting in a short fetch pipeline for both micro-ops and architectural instructions. In an embodiment, the instruction cache is physically-tagged, and the fact that the fetch block predictor provides the data array set and way enables the data array access to be performed immediately performed and the fetch block start address translation and the instruction cache tag lookup to be performed in parallel for hit, set and way verification. In an embodiment, the micro-op cache is virtually-tagged, and the fact that the fetch block descriptor provides the pointers because the tag lookup is performed in the prediction unit enables the fetch of the micro-ops from the micro-op cache data array to be immediately performed. In an embodiment, the fetch latency of both pipelines is only two clock cycles, and their equal fetch latencies results in no penalty when switching between the two fetch pipelines in either direction.

Embodiments are also described in which each data array entry includes a next pointer to another entry whose micro-ops are younger in program order thus facilitating the building of a linked list of data array entries. The data array entry at the head of the linked list is pointed to by an initial pointer of the single tag array entry of the micro-op cache entry. Thus, a distributed pointer mechanism is provided—i.e., pointers are distributed between the micro-op cache tag and data arrays—in which only a single way of the set-associative micro-op cache need be allocated for each micro-op cache entry, thus advantageously preserving the full associativity of the micro-op cache. The linked list capability advantageously accommodates micro-op cache entries with a large number of micro-ops since the number of micro-ops is not limited to the number of pointers in the tag array entry, which further advantageously accommodates micro-op cache entries decoded from a large number of architectural instructions. In an embodiment, a micro-op cache entry may hold micro-ops decoded from multiple fetch blocks, i.e., from multiple sequential runs of instructions. Furthermore, the accommodation of large numbers of micro-ops per micro-op cache entry also advantageously accommodates data array entries that efficiently hold a small number of micro-ops. Embodiments may include tag array entries with multiple initial data array entry pointers for multiple linked lists to facilitate concurrent fetching of multiple data array entries per clock cycle and/or to avoid pipeline bubbles in the case of a pipelined micro-op cache data array.

In the present disclosure, a fetch block (FBIk) is a sequential run of architectural instructions in a program instruction stream and/or the micro-ops into which the architectural instructions are decoded.

In the present disclosure, program order refers to the architectural order in which architectural instructions appear in a program instruction stream as the program is being processed. Generally, the program order is sequential, i.e., the next instruction in program order after the current instruction is the instruction that is adjacent in memory to the current instruction. However, when a control transfer instruction is encountered (e.g., a taken conditional branch instruction or an unconditional branch instruction such as a call instruction or a return instruction or an unconditional jump), the next instruction in program order is the instruction at the target address of the control transfer instruction rather than the next sequential instruction. The architectural state of the processor reflects the program order. That is, although embodiments may speculatively execute instructions out of the program order or may (sometimes incorrectly) predict the program order (e.g., via branch direction and target prediction), the program order dictates the order in which the processor commits instruction execution results to its architectural state. In some contexts, program order is used with respect to fetch blocks and fetch block descriptors. For a sequence of fetch blocks to be provided/consumed/received in program order means, for each fetch block in the sequence, the first instruction of the fetch block follows in program order the last instruction of the previous fetch block in the sequence (the instructions within each fetch block are in program order). Accordingly, for a sequence of fetch block descriptors to be provided/consumed/received in program order means the order of the sequence of fetch block descriptors describes a corresponding sequence of fetch blocks in program order.

FIG. 1 is an example block diagram of a microprocessor core 100 in accordance with embodiments of the present disclosure. In the present disclosure, the term macro-op (MOP), rather than micro-op, is used to refer to the micro-architectural operations that are executed by the execution units of the microprocessor. This is because in an embodiment the microprocessor 100 includes an advanced fusion engine (AFE) 181 of FIG. 1 that is configured to perform higher levels of fusion than conventional processors to generate more complex micro-architectural operations, thus the term MOPs. Accordingly, the term macro-op cache (MOC), rather than micro-op cache, is used to refer to the cache memory that caches MOPs. However, the embodiments described are not limited to embodiments that employ an AFE or MOPs or a MOC, but instead may also be employed in embodiments that do not include an AFE and in which architectural instructions are decoded into micro-ops and allocated into a micro-op cache.

A MOP, like a micro-op, is an instruction that is executable by an execution unit of the microprocessor, as distinct from an architectural instruction which is not executable directly by an execution unit. Stated alternatively, a MOP, like a micro-op, specifies operations and operands within the set of operations and operands defined by the micro-architectural "micro-instruction set architecture" of the execution units of the microprocessor. In other words, MOPs, like micro-ops, are the internal instructions that are actually executed by the execution units, in contrast to architectural instructions that are decoded into MOPs, or micro-ops. Furthermore, a MOP, like a micro-op, may be a fusion of a pair of adjacent architectural instructions decoded into a single MOP/micro-op. In an embodiment, the decode unit (DEC) 112 of the microprocessor 100 of FIG. 1 is configured to fuse a pair of adjacent architectural instructions and decode them into a single MOP.

However, for some sequences of instructions of the program instruction stream, the AFE 181 may be capable of performing more complex fusing of the MOPs generated by the DEC 112 into MOPs. For example, the AFE 181 may be configured to fuse non-adjacent MOPs. For another example, the AFE 181 may be configured to fuse more than two MOPs. For example, the AFE 181 may be configured to examine a window of an entire FBlk worth of MOPs to look for fusion opportunities among more than two and/or non-adjacent MOPs. For another example, the MOPs may be more complex than conventional micro-ops, yet still have a single-cycle execution latency. For example, the MOPs may be more complex in that they perform compound operations, e.g., two arithmetic/logical operations on three source operands, including input conditioning (e.g., shift or rotate) on some of the source operands and output conditioning (e.g., zero-extend or sign-extend) on the result, i.e., the destination operand.

The core 100 includes an instruction pipeline that includes a predict unit (PRU) 102, a fetch block descriptor (FBD) FIFO 104, an instruction fetch unit (IFU) 106, a FBlk FIFO 108, a decode unit (DEC) 112, and a back-end 130. In an embodiment, each of the PRU 102, IFU 106, DEC 112, and back-end 130 are also pipelines. The PRU 102 and IFU 106 may be referred to generally as the front-end of the core 100, and the DEC 112 may be referred to as the mid-end. The core 100 also includes pipeline control logic (PCL) 132 that controls various aspects of the microprocessor 100 pipeline as described herein.

The back-end 130, in an embodiment, includes the following functional blocks which are not shown: a physical register file (PRF), a data cache, a plurality of execution units (EUs), and schedulers to which MOPs are dispatched by the DEC 112 and which schedule issuance of the MOPs to the EUs for execution. In an embodiment, the PRF includes separate integer, floating-point and vector PRFs. The DEC 112 may rename architectural registers specified by architectural instructions to physical registers of the PRF. In an embodiment, the EUs include integer execution units (IXUs), floating point units (FXUs), and load-store unit (LSUs). The core 100 may also include a memory management unit (MMU) that includes a data translation lookaside buffer (DTLB), an instruction translation lookaside buffer (ITLB), and a table walk engine (TWE). The ITLB translates a virtual fetch block start address (FBSA) into a physical fetch block start address that is used to fetch a block of architectural instructions from the instruction cache 101 or from system memory.

The core 100 may also include other blocks not shown, such as a load/store queue, a load buffer, a bus interface unit, and various levels of cache memory above the instruction cache 101 and data cache, some of which may be shared by other cores of the microprocessor. Furthermore, the core 100 may be multi-threaded in the sense that it includes the ability to hold architectural state (e.g., program counter, architectural registers) for multiple threads that share the back-end 130, and in some embodiments the mid-end and front-end, to perform simultaneous multithreading (SMT).

The PRU 102 maintains the program counter (PC) and includes predictors that predict program flow that may be altered by control flow instructions, such as branch instructions. In an embodiment, the PRU 102 includes a fetch block predictor (FBP) 152, branch predictors (BPs) 154, a FBlk hotness threshold (FBHT) 185, and a MOC Tag RAM (MTR) 173 portion of a macro-op cache (MOC) 171. The term RAM may be used in the present disclosure to refer to random access memory, such as a static RAM or dynamic RAM, and/or to other types of arrays of addressable storage, such as an array of registers or flip-flops. In an embodiment, the FBHT 185 is configurable by software executing on the microprocessor 100, e.g., via a write to a control register (not shown) of the microprocessor 100. In an embodiment, the BPs 154 include a main conditional branch predictor, a secondary conditional branch predictor, an indirect branch predictor, and a return address predictor. As a result of predictions made by the predictors, the core 100 may speculatively execute instructions in the instruction stream of the predicted path.

The FBP 152 caches information about previously fetched and decoded and executed FBlks in the program instruction stream such as the length and termination type of the FBlk. Each entry of the FBP 152 (described more with respect to FIG. 2) is associated with a FBlk. Each entry of the FBP 152 specifies the location within the instruction cache 101 of the FBlk, i.e., a prediction of the set and way (e.g., predicted set index 204 and predicted way number 206 of FIG. 2) of the instruction cache 101 that holds the architectural instructions of the FBlk such that the FBlk may be immediately fetched from the instruction cache 101 by the IFU 106 upon reception of the predicted set and way, as described in more detail below. Each entry of the FBP 152 also includes a FBlk hotness counter (FBHC)—storage element FBHC 217 of FIG. 2 output by the FBP 152 as FBHC 417 of FIG. 4A—that reflects the hotness of the FBlk associated with the FBP entry. More specifically, the FBHC 217 is incremented each time the FBP entry is hit upon and used as a prediction that the associated FBlk is present again in the program instruction stream. The FBHC is used in a filtering manner to decide whether to allocate an entry in the MOC 171 for MOPs into which architectural instructions of the FBlk are decoded. In an embodiment, an entry in the MOC 171 is not allocated unless the value of the FBHC 217 has incremented beyond the FBHT 185.

The PRU 102 generates fetch block descriptors (FBD) 191, described in more detail with respect to FIG. 3A, that are provided to the FBD FIFO 104 in program order. Each FBD describes a FBlk. If the AIs of the FBlk have been decoded into MOPs and cached in a MOC entry 350 (of FIG. 3D) of the MOC 171, then the FBD 191 also describes some characteristics of the MOC entry 350. FBDs are described in detail with respect to FIG. 3A. Each FBD includes the predicted set index and predicted way number provided by the FBP 152. Each FBD also includes a fetch source indicator (e.g., FSI 314 of FIG. 3A) that specifies whether the IFU 106 should fetch the FBlk from the instruction cache 101 or from a data RAM portion of the MOC 171, described in more detail below, within the IFU 106 and that is separate from the MTR 173. The FSI is generated based on whether the FBSA of the FBlk hits in the MTR 173 and in the FBP 152 of the PRU 102 earlier in the front-end pipeline than the IFU 106. Advantageously, the FSI both enables the IFU 106 to save power by disabling the other fetch source when not being fetched from and enables the IFU 106 not to incur a penalty that would otherwise be incurred if the IFU 106 had to predict which source to fetch from—which the IFU 106 does not have to do because the IFU 106 is told the fetch source by the PRU 102—and had to switch to the other source whenever the IFU 106 mis-predicted.

As described above, a FBlk is a sequential run of architectural instructions in a program instruction stream. A FBlk has a length and a termination type. A FBlk may terminate with an unconditional branch instruction or a conditional branch instruction that is predicted taken, or the FBlk may terminate because the run of instructions reached a maximum sequential FBlk length, i.e., the FBlk continues sequentially into the next FBlk. In an embodiment, a FBlk may be up to ninety-six bytes long and may contain as many as forty-eight architectural instructions. In an embodiment, a FBlk may include zero, one or more embedded conditional branch instructions that are not predicted taken. That is, typically embedded conditional branch instructions are not the last instruction of the FBlk, i.e., the embedded conditional branch instructions are internal to the FBlk, and the FBlk is terminated for a reason other than an embedded conditional branch instruction. In other words, an embedded conditional branch instruction is implicitly predicted to be not taken, e.g., because thus far it has never been taken. Unlike a FBlk-terminating conditional branch instruction, embedded conditional branch instructions are not actively predicted by the branch predictor (e.g., the conditional branch predictor of the BPs 154 of FIG. 4A). A FBlk may also refer to a sequential run of MOPs into which the corresponding sequential run of architectural instructions are decoded. In an embodiment, a FBlk may contain as many as forty-eight MOPs. The decoded MOPs of a FBlk may be generated by the AFE, i.e., MOPs some of which may be more highly fused than the simpler MOPs decoded by the DEC 112. Generally, the context will make clear whether a FBlk of architectural instructions or a FBlk of MOPs is being described, however in some instances a FBlk of architectural instructions is referred to herein as an architectural FBlk (AFBlk), and a FBlk of MOPs is referred to herein as a MOC FBlk (MFBlk).

The IFU 106 includes an instruction cache 101, a MOC Data RAM (MDR) 175 portion of the MOC 171, and a mux 161. The instruction cache 101 caches architectural instructions previously fetched from system memory. The MOC 171 caches MOPs previously generated by the DEC 112 and/or by the AFE 181. A FBD is essentially a request, also referred to as a fetch request, to fetch architectural instructions (AIs) 193 from the instruction cache 101 or to fetch MOPs 194 from the MDR 175. The IFU 106 uses the FBDs to fetch FBlks worth of AIs 193 or MOPs 194 via the mux 161 in program order into the FBlk FIFO 108, which feeds fetched AIs/MOPs 195 in program order to the DEC 112. In an embodiment, the mux 161 is effectively controlled by a fetch source indicator 514 (see FIG. 5) from a FBD that describes the FBlk whose AIs/MOPs are being fetched from the instruction cache 101/MDR 175. That is, the mux 161 selects MOPs 194 fetched from the MDR 175 if the fetch source indicator (FSI) 514 indicates the MOC 171, and the mux 161 selects AIs 193 fetched from the instruction cache 101 if the FSI 514 indicates the instruction cache 101.

The FBD FIFO 104 enables the PRU 102 to continue predicting FBDs to reduce the likelihood of starvation of the IFU 106. Likewise, the FBlk FIFO 108 enables the IFU 106 to continue fetching FBlks worth of AIs/MOPs to reduce the likelihood of starvation of the DEC 112. Architectural instructions may travel through the processor 100 pipeline from the instruction cache 101 of the IFU 106 to the DEC 112 as FBlks where they are decoded, register-renamed and dispatched in parallel, and MOPs may travel through the processor 100 pipeline from the MOC 171 of the IFU 106 to the DEC 112 where they are register-renamed and dispatched in parallel. Advantageously, the IFU 106 is simplified by the fact that it can simply consume FBDs in program order, as received from the FBD FIFO 104, to fetch both architectural instructions from the instruction cache 101 or to fetch MOPs from the MOC 171 as indicated by the FSI 514, and by the fact that the IFU 106 can simply provide both the fetched architectural instructions and MOPs in program order the FB FIFO 108.

Many structures within the core 100 address, buffer, or store information for an instruction or MOP by reference to a FBlk identifier. In an embodiment, checkpoints for abort recovery are generated for and allocated to FBlks. In some instances, the abort recovery process may begin at the first instruction of the FBlk containing the abort-causing instruction. In other instances, the abort recovery process may begin at the first instruction of the next FBlk after the FBlk containing the abort-causing instruction. In other instances, the abort recovery process may begin at an instruction in the middle of the FBlk containing the abort-causing instruction.

The DEC 112 may decode AIs of the FBlks into MOPs. Early stages of the DEC 112 identify instruction boundaries within the FBlk FIFO 108 that contains the next group of architectural instruction bytes to be decoded and executed and extracts the architectural instructions at the identified boundaries. For example, for RISC-V instructions, the early DEC 112 stages mux out from the FBlk FIFO 108 the one or two halfwords of instruction bytes that correspond to each architectural instruction starting at an identified instruction boundary. Then, other early stages of the DEC 112 may identify consecutive pairs of architectural instructions that can be fused together. Then early DEC 112 stages may also decode each identified instruction or instruction pair into a corresponding MOP representation. In an embodiment, the DEC 112 includes a pre-decode stage, an extract stage, a rename stage, and a dispatch stage.

In an embodiment, the DEC 112 converts each FBlk into a series of MOPGroups. Each MOPGroup consists of either N sequential MOPs or, if there are fewer than N MOPs in the FBlk after all possible N-MOP MOPGroups for a FBlk have been formed, the remaining MOPs of the FBlk. In an embodiment, N is five for MOPs decoded from AIs fetched from the instruction cache 101, and N is six for MOPs fetched from the MOC 171. Because some MOPs can be fused by DEC 112 from two instructions, a MOPGroup may correspond to up to 2N instructions. The MOPs of the MOPGroup may be processed in simultaneous clock cycles through later DEC 112 pipe stages, including rename and dispatch to the EU pipelines. Instructions of a MOPGroup are also allocated into the ROB 122 in simultaneous clock cycles and in program order. The MOPs of a MOPGroup are not, however, necessarily scheduled for execution together.

The DEC 112 dispatches MOPs to the schedulers which schedule and issue the MOPs for execution to the EUs. The EUs receive operands for the MOPs from multiple sources including operands from the PRF and results produced by the EUs that are directly forwarded on bypass busses back to the EUs. In an embodiment, the EUs perform superscalar out-of-order speculative execution of multiple MOPs in parallel. The architectural instructions and MOPs are received by the DEC 112 from the FBIk FIFO 108 in program order, and entries in the ROB 122 are allocated for the associated MOPs of the instructions in program order. However, once dispatched by the DEC 112 to the EUs, the schedulers may issue the MOPs to the individual EU pipelines for execution out of program order.

The PCL 132 includes a ReOrder Buffer (ROB) 122 and exception-handling logic 134. The pipeline units may signal a need for an abort, e.g., in response to detection of a mis-prediction (e.g., by a branch predictor of a direction or target address of a branch instruction, or of a mis-prediction that store data should be forwarded to a load MOP in response to a store dependence prediction) or other microarchitectural exception, architectural exception, or interrupt. In response, the PCL 132 may assert flush signals to selectively flush instructions/MOPs from the various units of the pipeline.

The PCL 132 tracks instructions and the MOPs into which they are decoded throughout their lifetime. The ROB 122 supports out-of-order instruction execution by tracking MOPs from the time they are dispatched from DEC 112 to the time they retire. In one embodiment, the ROB 122 has entries managed as a FIFO, and the ROB 122 may allocate up to six new entries per cycle at the dispatch stage of the DEC 112 and may deallocate up to six oldest entries per cycle at MOP retire. In one embodiment, each ROB entry includes an indicator that indicates whether the MOP has completed its execution and another indicator that indicates whether the result of the MOP has been committed to architectural state. More specifically, load and store MOPs may be committed subsequent to completion of their execution. Still further, a MOP may be committed before it is retired.

The AFE 181 receives MOC build requests 177 from the PRU 102, receives MOPs 197 from the DEC 112, and provides MOPs 189 and MDR pointers 187, described below, to the MOC 171. Generally, when the PRU 102 predicts the presence of a FBIk in the program instruction stream that the PRU 102 deems to be a hot FBIk, the PRU 102 generates a true indicator (HFB indicator 318 of FIG. 3A) within the FBD 191 associated with the hot FBIk, and the true indicator proceeds through the microprocessor 100 pipeline (e.g., FBD FIFO 104, IFU 106, FBIk FIFO 108) to the DEC 112. Additionally, when the PRU 102 predicts the hot FBIk, the PRU 102 sends a MOC build request 177 to the AFE 181 for the hot FBIk. A MOC build request 177 is a request by the PRU 102 to the AFE 181 to build, or create, a new entry in the MOC 171. The MOC build request 177 specifies the fetch block start address (FBSA) of the hot FBIk for which the PRU 102 is requesting the AFE 181 to build an entry in the MOC 171 for the MOPs of the FBIk. When the DEC 112 fetches the hot FBIk from the FBIk FIFO 108 and decodes the fetched architectural instructions into MOPs, the DEC 112 sees from the true indicator that the FBIk is a hot FBIk and provides the decoded MOPs to the AFE 181. In response, the AFE 181 further fuses, where possible, the received MOPs into more highly fused MOPs. Then the AFE 181 communicates with the MOC 171 to build an entry in the MOC 171 for the possibly more highly fused MOPs using the FBSA received in the MOC build request 177.

Generally, building a new entry in the MOC 171 (e.g., MOC entry 350 of FIG. 3D) includes writing the MOPs of the FBIk to entries of the MDR 175 (e.g., MDR entries 340 of FIG. 3C) and writing a new tag entry (e.g., MTR entry 330 of FIG. 3B) in the MTR 173 that points to the entries of the MDR 175 to which the MOPs of the FBIk were written. In an embodiment, the new tag entry in the MTR 173 points to only the initial entries of the MDR 175, and the entries in the MDR 175 themselves point to subsequent entries of the MDR 175. Significantly, what triggers an allocation into the MOC 171 is the detection of a hot FBIk, not the mere decoding of architectural instructions into MOPs according to conventional methods. Indeed, in the embodiments described, a FBIk may appear in the program instruction stream and be decoded into MOPs many times (i.e., up to the threshold value) before a MOC allocation is performed. In this sense, the FBHC 217 serves as a filter for MOC allocations.

In an embodiment, the MOPs 199 dispatched by the DEC 112 to the back-end 130 are register-renamed, i.e., the MOPs 199 specify PRF registers as the source and destination operands. However, the MOPs 197 provided by the DEC 112 to the AFE 181 are not register-renamed, i.e., the MOPs 197 specify architectural registers as the source and destination operands. Similarly, the MOPs 189 provided by the AFE 181 to the MOC 171 are not register-renamed. Thus, the MOPs 194 fetched from the MOC 171 are not register-renamed as provided to the DEC 112, and the DEC 112 renames them before dispatching them as register-renamed MOPs 199 to the back-end 130.

In an embodiment, the AFE 181 includes a build request FIFO (not shown) that is configured to receive the MOC build requests 177 such that multiple MOC build requests 177 from the PRU 102 may be outstanding to the AFE 181 at any time. In an embodiment, the AFE 181 includes a MOP buffer that is configured to receive from the DEC 112 at least all the MOPs 197 of a FBlk. When the AFE 181 detects that the MOP buffer is not empty, the AFE 181 may begin to use the MOPs 197 in the MOP buffer to build an entry in the MOC 171 for the FBIk.

As shown in the embodiment of FIG. 1, the MOC 171 includes the MTR 173 in the PRU 102 and the MDR 175 in the IFU 106. In an embodiment, an entry in the MOC 171 comprises one or more entries in the MDR 175 that hold MOPs of the FBIk and an entry in the MTR 173 that points to the entries in the MDR 175 as will now be described. Thus, in the embodiment, allocation of a MOC entry includes both allocating the MDR entries and the MTR entry and populating them accordingly.

In an embodiment, the MDR 175 is organized as a one-dimensional array of entries each configured to store up to predetermined number of MOPs that are managed as a pool of entries. In an embodiment, the predetermined number of MOPs per entry is three, referred to as a triplet, although other embodiments are contemplated in which the number of MOPs per entry is different than three. In an embodiment, the pool of MDR entries is managed by control logic in the MTR 173. In an embodiment, each entry of the MDR 175 has an associated array index, referred to herein as an MDR pointer. An MDR entry is either available for allocation in which case it is included in a free list maintained by the MDR 175, or the MDR entry is already allocated for a FBlk in which case the MDR entry is pointed to by an entry of the MTR 173, as described in more detail below. When an MDR entry is deallocated, it is put back on the free list.

In an embodiment, the MTR 173 is arranged as a set associative structure having S sets and W ways (e.g., S may be 128 and W may be eight). Each valid entry in the MTR 173 includes a tag that corresponds to tag bits of the FBSA of the FBlk associated with the MOC entry. During allocation of a MOC 171 entry for a hot FBlk, the AFE 181 provides to the MOC 171 the FBSA of the hot FBlk (which the AFE 181 received earlier in the MOC build request 177), and the MTR 173 selects an entry to be replaced (e.g., using replacement information described below) and writes the tag bits of the FBSA to the tag of the MTR entry chosen for replacement. During PRU 102 prediction of the current FBlk, the MTR 173 looks up the current FBSA 412 of FIG. 4A to determine whether the current FBSA 412 hits in the MTR 173 (indicated by MOC hit 414 of FIG. 4A). Each entry of the MTR 173 also includes the MDR pointers (e.g., initial MDR pointers 336 of FIG. 3B) that point to the entries in the MDR 175 that hold the MOPs of the FBlk, as will now be described.

When the AFE 181 has generated the possibly more highly fused MOPs for a hot FBlk, the AFE 181 requests MDR pointers for the MOPs from the MDR 175. The MDR 175 grabs entries from its free list and provides MDR pointers to the grabbed entries back to the AFE 181. The AFE 181 then writes the MOPs to entries of the MDR 175 at the provided MDR pointers. After the AFE 181 has written all the MOPs to the MDR entries, the AFE 181 sends to the MTR 173 and to the MDR 175 the MDR pointers 187 the AFE 181 just used so that the MTR 173 can allocate an MTR entry for the FBlk. In the case of a subsequent hit of the FBSA 412 in the MTR 173, the MTR 173 outputs the MDR pointers of the hit entry (initial MDR pointers 336 of FIG. 3B as initial MDR pointers 436 of FIG. 4A) which are included in the FBD 191 (initial MDR pointers 316 of FBD 300 of FIG. 3A) that the PRU 102 outputs and which the IFU 106 uses to fetch the MOPs of the FBlk from the MDR 175 for provision to the DEC 112.

Advantageously, when the DEC 112 receives the MOPs (rather than architectural instructions) of the FBlk, the DEC 112 does not need to decode the MOPs but instead may register-rename them and dispatch them to the back-end 130. In an embodiment, the MDR 175 is configured to output two entries of three MOPs per clock cycle for storage of up to six MOPs into an entry of the FBlk FIFO 108 per clock cycle, and the DEC 112 is configured to receive up to six MOPs per clock cycle from the FBlk FIFO 108, to register-rename up to six MOPs per clock cycle, and to dispatch to the back-end 130 up to six MOPs per clock cycle.

In an embodiment, the MDR entries associated with a FBlk are effectively allocated as a linked list, or as multiple linked lists, depending upon the number of initial MDR pointers in an MTR entry, as discussed in more detail below. That is, each MDR entry, in addition to holding the up to three MOPs, also includes a next MDR pointer (e.g., next MDR pointer 344 of FIG. 3C) that points to the next MDR entry in the linked list. In an embodiment, each MTR entry holds the initial MDR pointer which is used to fetch the first MDR entries in the linked list, and the next MDR pointer in the first fetched MDR entry is used to fetch the next MDR entry in the linked list, and so forth until the last MDR entry in the linked list is fetched. In this manner, the MDR pointers are distributed between the MTR 173 and the MDR 175 which may provide advantages described herein. The AFE 181 requests MDR pointers from the MTR 173 as needed to build the linked lists of the MOC entry. In an embodiment, the maximum length of a FBlk is forty-eight MOPs, which may be stored in sixteen MDR entries of MOP triplets.

Each set of the MTR 173 includes replacement information that indicates usage history of the FBlk associated with the entry in each way. The replacement information is used to decide which way to replace in the set selected by the set index bits of the FBSA of the hot FBlk for which an entry in the MOC 171 is being allocated by the AFE 181. During prediction time by the PRU 102, the current FBSA (FBSA 412 of FIG. 4A) is looked up in the MTR 173 to detect a hit.

Although a single core 100 is shown, the embodiments described herein are not limited to a particular number of cores. Generally, the embodiments may be employed in a microprocessor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments are not limited to the RISC-V ISA.

As described below, each entry of a fetch block predictor (FBP) stores a small additional amount of information to facilitate shortening the instruction fetch pipeline of the processor. More specifically, the small amount of information cached in the FBP is the set index and way number that specify the entry of the instruction cache from which the desired instruction block was recently fetched. The FBP-predicted set index and way number are used to independently access the instruction cache data random access memory (RAM) to obtain the desired instruction block without needing to wait for the address translation and instruction cache way determination steps to be performed first. That is, in parallel with initiation of the instruction cache data RAM access using the FBP-predicted set index and way number, the instruction fetch pipeline initiates access to the instruction TLB (ITLB) and initiates access to the instruction cache tag RAM using the FBP-predicted set index. Thus, the physical fetch address, which includes the correct set index, and the correct way number are obtained in parallel with the fetch of the instruction block and used to check correctness of the predicted set index and way number. In this manner, the instruction fetch pipeline is effectively shortened, or folded as described more below, to the number of stages required to access the data RAM to obtain the instruction block.

The short instruction fetch pipeline operates in the parallel manner described above while the FBP continues to provide set index and way number predictions but dynamically lengthens/unfolds in response to a FBP miss such that the ITLB, tag RAM, and data RAM accesses are performed serially. In one embodiment, the instruction fetch pipeline dynamically folds back up when the FBP hits again. In the case of a FBP miss, a new entry in the FBP may be created after the correct set index and way number are determined.

Other events that cause the instruction fetch pipeline to unfold may include a set index misprediction by the FBP or a miss in the ITLB or instruction cache.

Each FBP entry stores only translated address bits of the instruction cache set index, and untranslated bits of the fetch block start address are used to provide the remainder of the set index. Advantageously, by storing a relatively small number of additional bits per FBP entry (e.g., in one embodiment, 5 bits of set index and 2 bits of way number), the instruction fetch pipeline may be folded, i.e., shortened (e.g., from 6 stages to 2 stages), for a significant percentage of time, i.e., approximately the FBP hit rate. The shortening of the instruction fetch pipeline may improve processor performance by reducing the latency and penalty associated with branch mispredictions or other causes of restart of the instruction fetch pipeline. Further advantageously, the instruction fetch pipeline may be shortened/folded while also obtaining the power saving benefit of reading out only a single way of the instruction cache data RAM per instruction block fetch. The power savings may be particularly significant in embodiments in which the number of bytes per data RAM entry is large.

FIG. 2 is an example block diagram of a FBP entry 200, i.e., an entry of the FBP 152 of FIG. 1, in accordance with embodiments of the present disclosure. The FBP entry 200 includes a FBP tag 202, a predicted set index 204, a predicted way number 206, a fetch block length 208, a PC-relative target address 212, a termination type 214, and a FBlk hotness counter (FBHC) 217. As described below with respect to FIG. 4A, a value of the program counter (PC) is used as a current fetch block start address (FBSA), e.g., FBSA 412 of FIG. 4A. The FBSA is a virtual address that is translated into a physical address by the ITLB that is looked up in the instruction cache 101 to fetch a FBlk of instructions from the instruction cache 101. Additionally, the virtual FBSA may be looked up in the MOC 171 to fetch a FBlk of MOPs from the MOC 171, as described below.

Prior to the fetch of the FBlk, the FBSA is used to access the FBP 152 (and BPs 154), as described below with respect to FIGS. 4A, 4B and 5. If the FBSA misses in the FBP 152, a new FBP entry 200 will be created for the associated FBlk and allocated into the FBP 152 based on the FBSA and on other information determined from decode and execution of the FBlk, such as the length and termination type of the FBlk and possibly the PC-relative target address of a PC-relative terminating branch instruction. In an embodiment, the FBP 152 may operate similarly to the manner described in U.S. patent application Ser. No. 18/093,643 (VENT.0130), filed Jan. 5, 2023, which is hereby incorporated by reference in its entirety for all purposes.

The FBP tag 202 of the new FBP entry 200 is based on the FBSA of the FBlk.

Figure 5:
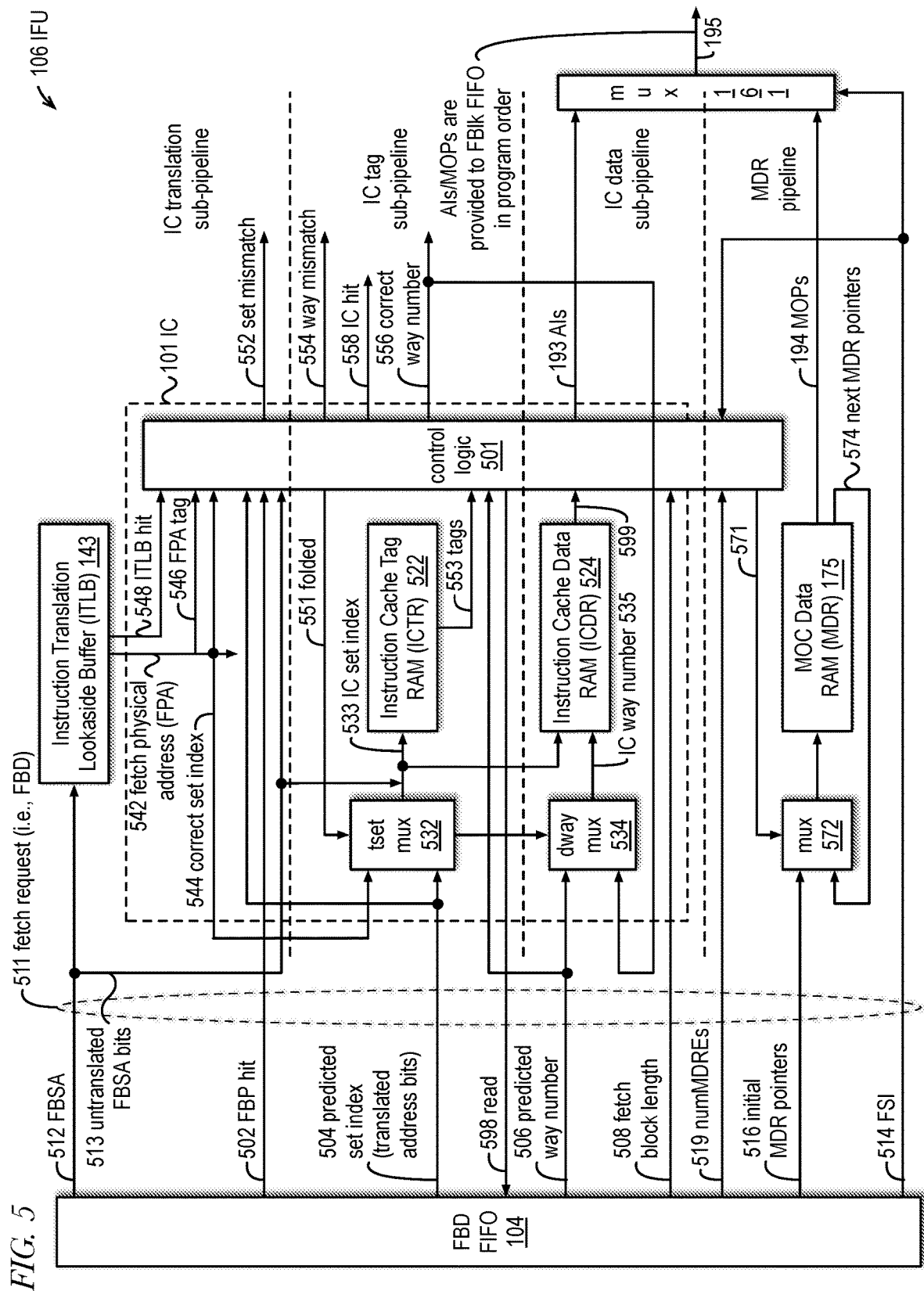
FIG. 5 is example block diagram of the instruction fetch unit (IFU) of FIG. 1 in accordance with embodiments of the present disclosure.

The predicted set index 204 is the value of the set index (e.g., correct set index 544 of FIG. 5) that was previously used to fetch a FBlk of architectural instructions from the instruction cache 101 at a fetch physical address (FPA) into which the FBSA was translated (e.g., FPA 542 of FIG. 5). That is, during a first instance of a fetch request (e.g., fetch request 511 of FIG. 5) that specifies the FBSA value, the FBlk is fetched from the instruction cache 101 and the correct set index 544 is written to the predicted set index 204 of the newly created FBP entry 200 to be used as a prediction of the set index during a subsequent instance of a fetch request that specifies the same FBSA value. In one embodiment, to save storage space, only translated address bits of the set index are stored in the predicted set index 204 field of the FBP entry 200, whereas the untranslated address bits of the set index are provided from the FBSA itself when accessing the instruction cache 101, e.g., as untranslated address bits 513 of FIG. 5.

The predicted way number 206 is the value of the way number (e.g., correct way number 556 of FIG. 5) that was previously used to fetch a FBlk of architectural instructions from the instruction cache 101 at a FPA into which the FBSA was translated. That is, during the first instance of a fetch request that specifies the FBSA value, the FBlk is fetched from the instruction cache 101 and the correct way number 556 is written to the predicted way number 206 of the newly created FBP entry 200 to be used as a prediction of the way number during a subsequent instance of a fetch request that specifies the same FBSA value.

The fetch block length 208 specifies the length in architectural instructions of a FBlk that starts at the FBSA. As described above with respect to FIG. 1, the FBlk may be up to the maximum length (e.g., 96 bytes in one embodiment), but may be shorter if a terminating instruction, e.g., a branch instruction, appears before the maximum FBlk length is reached. The PC-relative target address 212 specifies a target address of a PC-relative branch instruction that may be calculated, e.g., by the decode unit 112, by adding the FBSA and the immediate offset specified in the PC-relative branch instruction.

The termination type 214 specifies the reason for termination of the FBlk that starts at the FBSA. In one embodiment, the reasons may include: an unconditional branch instruction is present, a conditional branch instruction that is predicted taken is present, or the FBlk may terminate because the run of instructions reached a maximum sequential FBlk length, i.e., the FBlk continues sequentially into the next FBlk. In one embodiment, the type of the branch instruction may be more specifically indicated, e.g., conditional branch, direct branch, indirect branch, call, return.

The FBHC 217 is an indication of the worthiness of the MOPs of the FBlk to be allocated into the MOC based on a history of the FBlk being present in the program instruction stream. When a new FBP entry 200 is allocated into the FBP 152, the FBHC 217 is initialized to a default value. In an embodiment, the default value is one. Each time the FBP entry 200 is hit on when a FBSA is looked up in the FBP 152 and the hit entry 200 is used as a prediction that the FBlk is present again in the program instruction stream, the FBHC 217 is incremented to indicate an increased worthiness of the FBlk to have its MOPs allocated into the MOC 171. Preferably, incrementation of the FBHC 217 saturates at its maximum value. In an embodiment, if a MOC build request 177 fails for a subset of reasons, the AFE 181 informs the PRU 102, and the PRU 102 clears the FBHC 217 to zero, which is a special value that indicates a failed build request, which instructs the PRU 102 not to increment the FBHC 217 and not to ever attempt again to build a MOC entry for the FBlk, or at least not until the FBP entry 200 is replaced, which resets the FBHC 217 to the default value.

FIG. 3A is an example block diagram of a fetch block descriptor (FBD) 300, i.e., an entry of the FBD FIFO 104 of FIG. 1, in accordance with embodiments of the present disclosure. The FBD 300 describes a FBlk and may also describe some characteristics of a MOC entry 350 (of FIG. 3D) allocated for the MOPs into which the AIs of the FBlk have been decoded. The FBD 300 includes a FBP hit indicator 302, a predicted set index 304, a predicted way number 306, a fetch block length 308, a FBSA 312, a fetch source indicator (FSI) 314, initial MDR pointers 316, a hot FBlk (HFB) indicator 318, and a numMDREs indicator 319. As described below with respect to FIG. 4A, when the PRU 102 generates an FBD, e.g., FBD 191 of FIG. 4A, the FBD is written to the FBD FIFO 104 of FIG. 1 and later fetched from the FBD FIFO 104 for use by the IFU 106 to fetch a FBlk of architectural instructions from the instruction cache 101 or of MOPs from the MOC 171. The FBP hit indicator 302 indicates whether the lookup of the FBSA hit in the FBP 152.

The predicted set index 304 and predicted way number 306 are written with the corresponding predicted set index 204 and predicted way number 206 of the instruction cache 101 provided by the FBP 152 in the case of a hit of the FBSA in the FBP 152. As described herein, the predicted set index 304 and predicted way number 306 may be used to advantageously reduce the time required to fetch a block of instructions from the instruction cache 101 and facilitate operation of an instruction fetch pipeline in a folded manner.

The fetch block length 308 is written with the corresponding fetch block length 208 provided by the FBP 152 in the case of a hit of the FBSA in the FBP 152. The FBSA 312 is the current FBSA 412 of FIG. 4A that was used to access the FBP 152, the BPs 154, and the MTR 173.

Figure 4A:
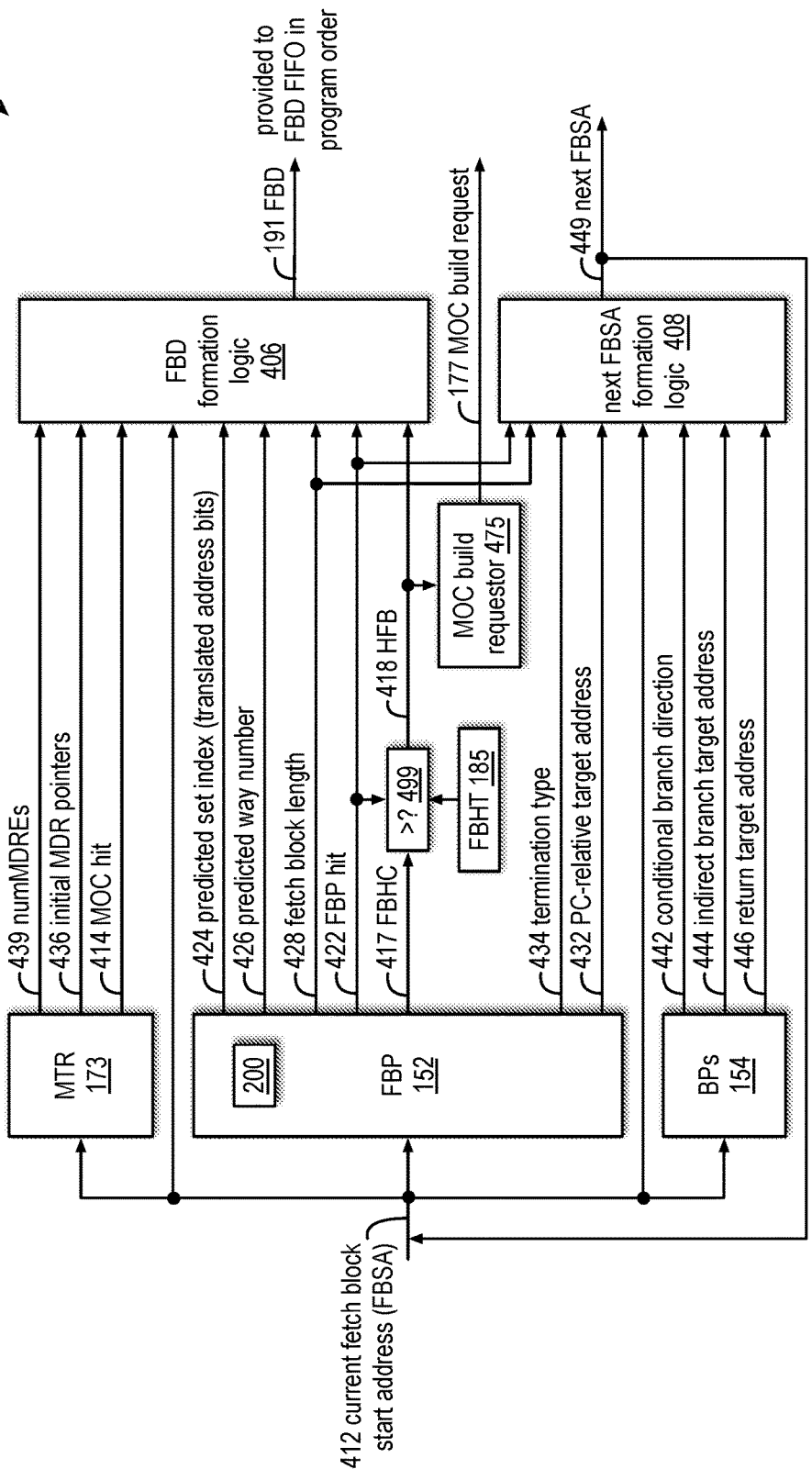
FIG. 4A is an example block diagram of the prediction unit (PRU) of FIG. 1 in accordance with embodiments of the present disclosure.
Figure 4B:
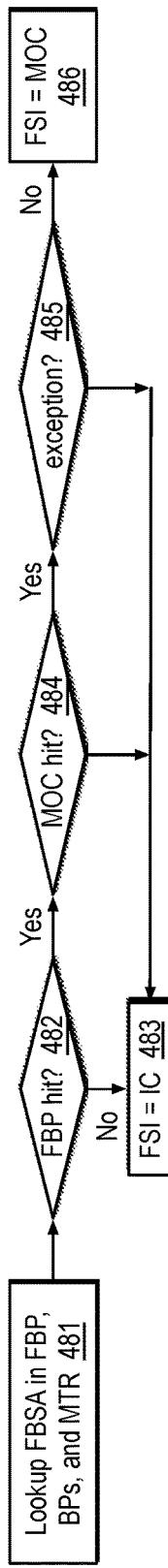
FIG. 4B is example flowchart illustrating operation of the PRU of FIG. 4A to populate the fetch source indicator (FSI) of a FBD in accordance with embodiments of the present disclosure.

The FSI 314 is populated (by the FBD formation logic 406 of FIG. 4A) as described with respect to FIG. 4B. Briefly, if the FBSA 412 misses in the FBP 152 or in the MTR 173, the FSI 314 is set to indicate to fetch from the instruction cache 101, or if a current attempted execution of the FBlk (more specifically, MOPs of a MOC entry 350) caused an exception, on re-fetch the FSI 314 is set to indicate to fetch from the instruction cache 101; otherwise, the FSI 314 is set to indicate to fetch from the MOC 171.

Generally, the FSI 314 is generated based on the MOC hit indicator 414 of FIG. 4A that is output by the MTR 173 of FIG. 1 during a lookup of the FBSA 412 in the MTR 173 and based on the FBP hit indicator 422 that is output by the FBP 152 during the lookup of the FBSA 412 in the FBP 152. As described above with respect to FIG. 1 and below with respect to FIG. 4A, the MOC hit indicator 414 indicates whether the current FBSA 412 hit in the MTR 173. Typically, if the MOC hit indicator 414 and the FBP hit indicator 422 are both true, then the FSI 314 is populated to instruct the IFU 106 to fetch from the MDR 175; otherwise, the FSI 314 is populated to instruct the IFU 106 to fetch from the instruction cache 101. However, in some cases the PRU 102 populates the FSI 314 to instruct the IFU 106 to fetch from the instruction cache 101 even if both the MOC hit indicator 414 and the FBP hit indicator 422 are true. For example, assume the execution of the MOPs of a FBlk causes an architectural exception or a microarchitectural exception that causes an abort process to be performed in which the front-end and mid-end are flushed and the MOPs of the FBlk in the back-end 130 are flushed and the PRU is signaled to restart prediction at the FBlk. In such case, depending upon the cause of the exception, the PRU may be signaled to instruct the IFU 106 to fetch the AIs of the FBlk from the instruction cache 101 even though the MOPs of the FBlk are present in the MOC 171. When the FBlk described by the FBD 191 is being fetched either from the instruction cache 101 or from the MOC 171, the FSI 514 (of FIG. 5) controls the mux 161, i.e., the mux 161 selects MOPs 194 fetched from the MDR 175 if the FSI 514 indicates the MDR 175, and the mux 161 selects AIs 193 fetched from the instruction cache 101 if the FSI 514 indicates the instruction cache 101.

The initial MDR pointers 316 are populated (by the FBD formation logic 406 of FIG. 4A) with the initial MDR pointers 436 of FIG. 4A that are output by a hit MTR entry 330 (of FIG. 3B) of the MTR 173 (i.e., initial MDR pointers 336 of FIG. 3B) during a lookup of the current FBSA 412 in the MTR 173. As described above with respect to FIG. 1 and below with respect to FIG. 4A, the initial MDR pointers 316 point to entries in the MDR 175 that hold MOPs of the FBlk and that are used by the IFU 106 to fetch MOPs of the FBlk from the MDR 175.

The hot FBlk (HFB) indicator 318 is populated (by the FBD formation logic 406 of FIG. 4A) with the HFB indicator 418 of FIG. 4A that is output by the comparator 499 of FIG. 4A during a lookup of the FBSA 412 in the FBP 152. As described above with respect to FIG. 1 and below with respect to FIG. 4A, a true value on the HFB indicator 318 indicates the PRU 102 has identified the FBlk as a hot FBlk because the FBHC 217 of the FBlk has exceeded the FBHT 185.

The numMDREs indicator 319 is populated (by the FBD formation logic 406 of FIG. 4A) with the numMDREs indicator 439 of FIG. 4A that is output by the MTR 173 (i.e., numMDREs indicator 339 of FIG. 3B) during a lookup of the current FBSA 412 in the MTR 173. The NumMDREs indicator 319 indicates the number of entries in the MDR 175 that hold MOPs of the FBlk.

FIG. 3B is an example block diagram of an MTR entry (MTRE) 330, i.e., an entry of the MTR 173 of FIG. 1, in accordance with embodiments of the present disclosure. The MTRE 330 includes an MTR tag 332, one or more initial MDR pointers 336, and a numMDREs indicator 339. When an MTRE 330 is allocated in the MTR 173, the MTR tag 332 is populated with tag bits of the FBSA 412 that missed in the MTR 173 and for which a MOC entry 350 is being allocated, and the numMDREs 339 is populated with the number of MDREs 340 of FIG. 3C that hold the MOPs of the MOC entry 350. In an embodiment, the MTR tag 332 also includes an address space identifier (ASID), virtual machine identifier (VMID), and/or translation regime (TR) of the process associated with the FBSA 412.

Each of the initial MDR pointers 336 points to an entry (MDRE 340 of FIG. 3C) in the MDR 175 that holds MOPs, as described in more detail below with respect to FIGS. 3C and 3D. As described above, the initial MDR pointers 336 are used to access the MDR 175 to fetch MOPs. As also described above, a goal of the IFU 106 is to keep the back-end 130 supplied with MOPs to execute. The number of MOPs that is desirable to fetch from the MDR 175 each clock cycle is largely dependent upon the width of the DEC 112 and the back-end 130, and the number of MOPs fetched from the MDR 175 each clock cycle is effectively determined by the number of MOPs held in an MDR entry 340 and the number of MDR entries that may be concurrently fetched. Thus, the initial MDR pointers 336 are grouped together such that one or more initial MDR pointer 336 is used to access the MDR 175 concurrently. In an embodiment, a single MDR entry 340 may be fetched per clock cycle such that a single initial MDR pointer 336 is used to access the MDR 175 per clock cycle, i.e., the group size (G) is one. However, in other embodiments, multiple MDR entries 340 may be fetched per clock cycle such that multiple initial MDR pointer 336 is used to access the MDR 175 per clock cycle, hence G is greater than one. For example, in an embodiment in which it is desirable to fetch up to six MOPs per clock cycle from the MDR 175 and the number of MOPs held in each MDR entry 340 is three, the initial MDR pointers 336 may be grouped into pairs (i.e., G is two) so that a group of two initial MDR pointers 336 are used to access the MDR 175 concurrently. Other embodiments are contemplated in which G is larger than two. Thus, the group size affects the number of initial MDR pointers 336.

In addition to group size, the number of groups (N) affects the number of initial MDR pointers 336. The number of groups may be selected based on the length of the MDR 175 pipeline to avoid pipeline bubbles. In an embodiment in which the MDR 175 pipeline has a single cycle fetch latency, the number of groups of initial MDR pointers 336 may be one, i.e., a single group such that N is 1. However, in embodiments in which the MDR 175 pipeline latency is multiple clock cycles, i.e., N clock cycles, to avoid pipeline bubbles there may be N groups of initial MDR pointers 336. That is, N may be chosen such that the N groups of initial MDR pointers 336 are used for N clock cycles to access the MDR 175 until the first group of next MDR pointers 344 of FIG. 3C can be fetched from the MDR 175 and forwarded back through mux 572 as next MDR pointers 574 of FIG. 5 to the input of the MDR 175 as described below. In an embodiment, such as described in the example of FIG. 15, the number of groups G is one, the MDR 175 pipeline latency N is two clocks, and the number of initial MDR pointers 336 is two to avoid pipeline bubbles. In another embodiment, such as described in the example of FIG. 17, G is two, N is two, and number of initial MDR pointers 336 is four. Other embodiments are also contemplated in which the number and grouping of initial MDR pointers 336 is different than two or four. Each initial MDR pointer 336 may point to the head of a linked list of MDREs as described below.

Figure 15:
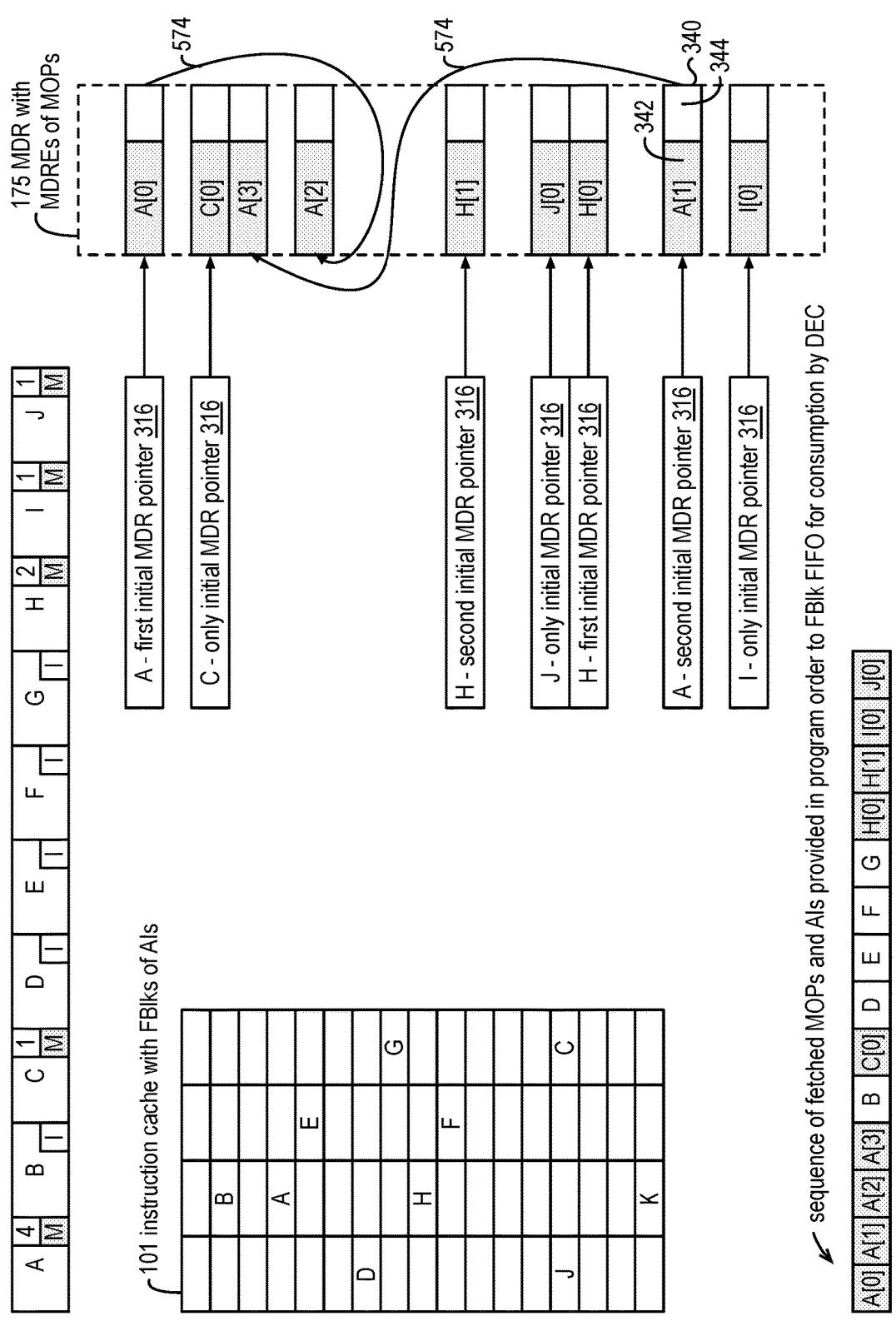
FIG. 15 is an example block diagram illustrating operation of the processor of FIG. 1 in accordance with embodiments of the present disclosure.

FIG. 3C is example block diagram of an MDR entry (MDRE) 340, i.e., an entry of the MDR 175 of FIG. 1, in accordance with embodiments of the present disclosure. The MDR entry 340 includes MOPs 342. In an embodiment, the number of MOPs held in an MDR entry 340 is three, referred to as a triplet. The MDR entry 340 also includes a next MDR pointer 344. The next MDR pointer 344 points to an MDR entry 340 that also holds MOPs of the MOC entry 350. As described above, during allocation of a MOC entry 350, the next MDR pointers 344 may be populated (along with the initial MDR pointers 336) to form linked lists of MDR entries 340 that hold MOPs based on the program order of instructions in the program instruction stream. The number of linked lists may be the number of initial MDR pointers 336. That is, each initial MDR pointer 336 points to an MDRE 340 that is the head of a linked list. In the example of FIG. 15 two linked lists are formed since there are two initial MDR pointers 336, whereas in the example of FIG. 17 four linked lists are formed since there are four initial MDR pointers 336. In an embodiment, the MDR entry 340 includes valid information that indicates which MOPs within the MDR entry 340 are valid. Although embodiments are described in which the number of MOPs held in an MDR entry 340 is three, other embodiments are contemplated in which the number of MOPs is different than three.

FIG. 3D is an example block diagram of a MOC entry (ME) 350, i.e., an entry of the MOC 171 of FIG. 1, in accordance with embodiments of the present disclosure. An ME 350 includes one MTRE 330 and one or more MDREs 340. The MDREs 340 are arranged as linked lists, as described above. The first MDRE 340 that holds the first MOPs in program order is pointed to by the initial MDR pointer 336 of the MTRE 330 of the ME 350, the next MDR pointer 344 of first MDRE 340 points to the second MDRE 340 of the linked list, and the next MDR pointer 344 of the second MDRE 340 points to the third MDRE 340 of the linked list, and so forth until the last MDRE 340 of the linked list. Assuming L multiple linked lists (i.e., L initial MDR pointers 336), each linked list includes every Nth MDRE 340. For example, if L is four, the MDREs are allocated and the MDR pointers are populated such that the first linked list includes MDREs 0, 4, 8, etc.; the second linked list includes MDREs 1, 5, 9, etc.; the third linked list includes MDREs 2, 6, 10, etc.; and the fourth linked list includes MDREs 3, 7, 11, etc. As described above, the multiple linked lists of MDREs facilitate concurrent fetching of multiple MDREs (e.g., in a dual-ported MDR 175 embodiment) and/or multi-stage MDR 175 pipelined fetching of MDREs.

An ME 350 may be one of two types: a single-FBlk ME (SF-ME) or a multi-FBlk ME (MF-ME). An SF-ME includes MOPs fused by the AFE 181 from a single FBlk worth of MOPs. In an embodiment, an SF-ME may include up to 48 MOPs. Additionally, the PRU 102 may detect a highly consistent sequence (HCS) of SF-MEs and instruct the AFE 181 to build an MF-ME from the MOPs of the SF-MEs of the HCS. Thus, since a FBlk is a sequential run of instructions, an MF-ME is a ME 350 that holds the MOPs associated with multiple sequential runs of instructions. An HCS of SF-MEs means each SF-ME in the HCS was consistently followed by the next SF-ME in the HCS with respect to the most recent history of the flow of the program. For example, assume the AFE 181 built an MF-ME that consists of FBlk A followed by FBlk B followed by FBlk C. In this example, the PRU 102 detected that FBlk A consistently followed FBlk B, and FBlk B consistently followed FBlk C in the program instruction stream. In an embodiment, to be considered a highly consistent sequence, the number of consecutive times that FBlk A followed FBlk B must exceed a threshold. In an embodiment, different thresholds may exist for different locations within the sequence of the HCS. For example, the threshold for A to follow B may be higher than the threshold for C to follow B. In an embodiment, the thresholds are programmable. The highly consistent sequences of SF-MEs may include loops of the same SF-ME.

Advantageously, when the AFE 181 builds an MF-ME, because the AFE 181 is given the opportunity to fuse the MOPs of more than one FBlk, the AFE 181 may be able to fuse the MOPs more highly than it was able to do when building an SF-ME. That is, the AFE 181 has a larger window of MOPs to choose from and may therefore be able to make more optimizations than it could when building an SF-ME. Furthermore, the distributed MDRE pointer embodiments described herein may be particularly advantageous with respect to MF-MEs since MF-MEs will be longer on average than SF-MEs.

FIG. 3E is an example block diagram of an entry 360 of the FBlk FIFO 108 of FIG. 1 in accordance with embodiments of the present disclosure. Each entry 360 includes a Valid bit 362, a Type bit 364, and a Data field 366. The Valid bit 362 indicates whether or not the entry 360 contains valid AIs/MOPs written by the IFU 106. The Type bit 364 indicates whether the Data field 366 holds AIs or MOPs, which enables the DEC 112 to know whether the entry 360 holds AIs or MOPs. In an embodiment, the IFU 106 populates the Type bit 364 with the FSI 514 of FIG. 5 of the corresponding FBD 511 that was used to fetch the AIs 193 or MOPs 194 from the instruction cache 101 or the MDR 175, respectively. If the IFU 106 reads AIs 193 from the instruction cache 101, the IFU 106 writes the AIs 193 to the Data field 366 of an entry 360; or if the IFU 106 reads MOPs from the MDR 175, the IFU 106 writes the MOPs 194 to the Data field 366 of the entry 360. In the case of AIs, preferably the IFU 106 reads an entire FBlk of AIs and writes it to the Data field 366 of an entry 360. In the case of MOPs, preferably the IFU 106 reads a group of MDREs 340 and writes the corresponding MOPs to the Data field 366 of an entry 360. Thus, in the case of a MOC entry 350 that includes multiple (J) groups of MDREs 340, the IFU 106 writes the J groups of MOPs corresponding to the J groups of MDREs 340 to J successive entries 360 of the FBIk FIFO 108. For example, in the embodiment of FIG. 17, the MOC entry 350 contains ten MDREs, and the group size G is two in the example embodiment; hence, the IFU 106 fetches five groups of MDRE pairs, and writes the MOPs of the five groups of MDRE pairs to five FBIk FIFO entries 360.

FIG. 4A is an example block diagram of the PRU 102 of the microprocessor core 100 of FIG. 1 in accordance with embodiments of the present disclosure. The PRU 102 includes the FBP 152, BPs 154, MTR 173, and FBHT 185 of FIG. 1, as well as FBD formation logic 406, next FBSA formation logic 408, a MOC build requestor 475, and a comparator 499. The PRU 102 receives a current FBSA 412, which is a virtual address that is the start address of the current FBlk whose presence, length, termination type and other characteristics are being predicted by the PRU 102. In response to the current FBSA 412, the PRU 102 provides a FBD 191 and a next FBSA 449, which is the predicted virtual start address of the next FBlk following the current FBlk. The FBD 191 is pushed into the FBD FIFO 104 and includes signals corresponding to the fields of the FBD 300 of FIG. 3A. The next FBSA 449 is fed back to become the current FBSA 412 of a subsequent clock cycle.

In the embodiment of FIG. 4A, the current FBSA 412 is looked up in the FBP 152, the BPs 154, and the MTR 173. In response, the FBP 152 generates a FBP hit indicator 422 that indicates whether the current FBSA 412 hits in the FBP 152, e.g., whether a tag portion of the current FBSA 412 matches the FBP tag 202 of a valid FBP entry 200 in the set of the FBP 152 selected by a set index portion of the current FBSA 412. If so, the FBP 152 outputs the contents of the hit FBP entry 200 as a corresponding predicted set index 424, predicted way number 426, fetch block length 428, PC-relative target address 432, termination type 434, and FBHC 417. Concurrently, the BPs 154 output a conditional branch direction 442, an indirect target address 444, and a return target address 446. Concurrently, the MTR 173 outputs a MOC hit indicator 414 that indicates whether the current FBSA 412 hits in the MTR 173 and, if so, the initial MDR pointers 336 and the numMDREs indicator 339 of the hit entry of the MTR 173 are output as initial MDR pointers 436 and numMDREs indicator 439, respectively, associated with the FBIk specified by the current FBSA 412.

The comparator 499 compares the FBHC 417 to see if it is greater than the FBHT 185 and, if so and the FBP hit indicator 422 is true, then the comparator 499 generates a true value on a hot FBIk (HFB) indicator 418, which is also provided to the FBD formation logic 406 and to the MOC build requestor 475, and otherwise generates a false value.

The FBD formation logic 406 receives the FBP hit indicator 422, the predicted set index 424, the predicted way number 426, the fetch block length 428, the current FBSA 412, the initial MDR pointers 436, the numMDREs indicator 439, and the HFB indicator 418 from the comparator 499 and writes them into the respective fields of FIG. 3A to form a FBD 191 to push into an entry 300 of the FBD FIFO 104. The FBD formation logic 406 also receives the MOC hit indicator 414 and writes the FSI 314 with a true value if the MOC hit indicator 414 and the FBP hit indicator 422 are both true (possibly inverted as described above based on whether an abort was needed for the FBlk and the exception cause) and otherwise writes the FSI 314 with a false value.

The next FBSA formation logic 408 receives the FBP hit indicator 422, the fetch block length 428, the PC-relative target address 432, the termination type 434, the conditional branch direction 442, the indirect target address 444, the return target address 446, and the current FBSA 412 and uses them to generate the next FBSA 449. If FBP hit 422 is false, the next FBSA formation logic 408 predicts a maximum length sequential termination type FBlk. That is, the next FBSA formation logic 408 generates a value of the next FBSA 449 that is the sum of the FBSA 412 and the maximum fetch block length. If FBP hit 422 is true, the next FBSA formation logic 408 generates the next FBSA 449 based on the termination type 434 and the remaining inputs. For example, if the termination type 434 indicates a PC-relative branch, then if the conditional branch direction 442 indicates "taken," the next FBSA formation logic 408 outputs the sum of the current FBSA 412 and the PC-relative target address 432 as the next FBSA 449 and otherwise outputs the sum of the FBSA 412 and the fetch block length 428. If the termination type 434 indicates an indirect branch, the next FBSA formation logic 408 outputs the indirect branch target address 444 as the next FBSA 449. If the termination type 434 indicates a return instruction, the next FBSA formation logic 408 outputs the return target address 446 as the next FBSA 449.

If the HFB 418 is true indicating the current FBIk is a hot FBlk, i.e., that its FBHC 217 is greater than the FBHT 185, then the MOC build requestor 475 sends a MOC build request 177 to the AFE 181. As described above with respect to FIG. 1, the MOC build request 177 includes the FBSA of the hot FBlk. In an embodiment, the MOC build request 177 also includes the number of architectural instructions in the FBlk. In an embodiment, each entry in the build request FIFO (described above with respect to FIG. 1) may also include status bits that are used by the PRU 102 and the AFE 181 to communicate with one another regarding the status of a MOC build request 177.

The PRU 102 uses the FBHC 217 of the entries 200 of the FBP 152 to filter allocations into the MOC 171 as follows. First, the FBSA 412 is looked up in the FBP 152, the BPs 154, and the MTR 173. If a miss occurs in the FBP 152, the PRU 102 generates a FBD 191 based on a default prediction that the FBlk is a maximum length sequential FBlk. Specifically, the FSI 314 is populated to instruct the IFU 106 to fetch the FBlk from the instruction cache 101 rather than from the MOC 171 and the HFB indicator 318 is also set to false.

However, if a hit occurs in the FBP 152 and the hit entry is used to predict that the FBlk corresponding to the hit entry 200 of the FBP 152 is present again in the program instruction stream, the FBHC 217 of the hit FBP entry 200 is incremented. In an alternate embodiment, the FBHC 217 is incremented non-speculatively, i.e., only if the architectural instructions of the FBlk are executed and committed by the back-end 130. In an alternate embodiment, the FBHC 217 is incremented after the comparison at block 512 is performed.

If the value of the FBHC 217 of the hit entry 200 is less than or equal to the FBHT 185, a false value is generated on the HFB indicator 418 to indicate the FBlk is not a hot FBlk, and the PRU 102 generates a FBD 191 using the hit FBP entry 200. Specifically, the FSI 314 is populated to instruct the IFU 106 to fetch the FBlk from the instruction cache 101 rather than from the MOC 171 and the HFB indicator 318 is also set to false.

If the value of the FBHC 217 of the hit entry 200 is greater than the FBHT 185, a true value is generated on the HFB indicator 418 to indicate the FBlk is a hot FBlk.

If a hit occurs in the MOC 171, since the MOPs of the FBIk are already in the MOC 171, the PRU 102 generates a FBD 191 using the hit FBP entry 200 and the hit MTR 173 entry. Specifically, the FSI 314 is populated to instruct the IFU 106 to fetch the FBIk from the MOC 171 rather than from the instruction cache 101 and the initial MDR pointers 316 are populated with the initial MDR pointers 436 output by the MTR 173 from the hit MTR 173 entry.

If a miss occurs in the MOC 171, since the HFB indicator 418 indicates the FBlk is a hot FBlk, the PRU 102 generates a MOC build request 177 for the FBIk and sends it to the AFE 181. The PRU 102 also generates a FBD 191 using the hit FBP entry 200. Specifically, the FSI 314 is populated to instruct the IFU 106 to fetch the FBIk from the instruction cache 101 rather than from the MOC 171.

The microprocessor 100 of FIG. 1 operates to filter the allocation of MOC 171 entries using the FBHC 217 of the entries 200 of the FBP 152 as follows. The DEC 112 receives a FBlk from the FBIk FIFO 108 for which the HFB indicator 318 is true. In response, the DEC 112 decodes the architectural instructions of the FBIk into MOPs. In an embodiment, the DEC 112 performs simple fusion of the architectural instructions where possible, e.g., by fusing two adjacent architectural instructions into a single MOP. The DEC 112, before register renaming the decoded MOPs, sends the un-renamed MOPs to the AFE 181. The AFE 181 receives from the DEC 112 the MOPs of the FBIk-sent at block 602. The AFE 181 previously received from the PRU 102 the MOC build request 177 for the FBIk. The AFE 181 more highly fuses the received MOPs where possible and sends the possibly more highly fused MOPs to the MOC 171 for allocation into an entry of the MOC 171 as described in detail above, e.g., with respect to FIG. 1. The MOC 171 allocates an entry for the FBIk of possibly more highly fused MOPs received from the AFE 181. The MOC 171 selects the entry to replace based on the replacement information in the set of the MOC 171 selected by the set index portion of the FBSA 412. In particular, the FBlk was determined to be a hot FBlk because its corresponding FBHC 217 had exceeded the FBHT 185, i.e., the FBlk was determined to be worthy for allocation into the MOC 171. As a result, the MOC 171 allocates an entry for the MOPs of the FBIk independent of the worthiness or unworthiness of any of the entries of the selected set of the MOC 171 based on the replacement information, including the entry selected for replacement. In other words, the allocation decision is driven by the PRU 102 based on the usage history held in the FBP 152 for the FBIk being allocated into the MOC 171 rather than being driven by the MOC 171 itself based on the usage history of its current entries.

In an alternate embodiment, the microprocessor 100 is absent the AFE 181 of FIG. 1. That is, the DEC 112 provides the MOPs 197 directly to the MOC 171 if the HFB 418 indicates the FBIk of the MOPs 197 is a hot FBIk. In the embodiment, the MOC 171 includes control logic that receives the MOPs 197 and allocates them into the MDR 175 and MTR 173 without further fusing of the MOPs 197.

As described above, many conventional approaches always allocate into the micro-op cache new micro-ops as they are decoded from fetched architectural instructions of the program instruction stream. Always allocating into the micro-op cache may result in replacing more useful micro-ops already in the micro-op cache, since it is not known how soon nor how frequently the new micro-ops will appear again in the program instruction stream-indeed it is not known if they will even appear again at all. Similarly, a policy of allocating based on the unworthiness of micro-ops already in the micro-op cache does not consider how soon/ frequently the new micro-ops will appear again, if at all, in the program instruction stream.

Embodiments are described that filter allocations into the micro-op cache based on a fetch block's usage history before the fetch block is allocated into the micro-op cache. That is, the embodiments allocate into the micro-op cache based on the worthiness of the new fetch block of micro-ops, in contrast to a conventional method that always attempts to allocate each time the micro-ops are decoded and in contrast to a conventional method that filters based on the unworthiness of micro-ops already in the micro-op cache. The worthiness of a fetch block to be allocated into the micro-op cache based on its history of appearance in the program instruction stream is typically referred to herein as the "hotness" of the fetch block. Stated alternatively, in each instance that the fetch block is predicted to be present in the program instruction stream, the appearance history of the fetch block itself, rather than the appearance history of other fetch blocks already in the micro-op cache, is considered when making the decision whether or not to allocate the fetch block into the micro-op cache.

In an embodiment, the usage history of fetch blocks is held in corresponding entries of a fetch block predictor in a prediction unit at the beginning of the microprocessor pipeline. The usage history is in the form of a hotness counter that is incremented when an entry in the fetch block predictor is hit upon and used as a prediction that the corresponding fetch block is present again in the program instruction stream. The new micro-ops of the fetch block are not allocated into the micro-op cache unless the hotness counter has exceeded a hotness threshold, indicating the fetch block is sufficiently worthy, based on its prior usage history, to be allocated into the micro-op cache. This contrasts with conventional designs that simply always allocate or that decide whether to allocate based on unworthiness (e.g., infrequently, or un-recently used) of all the micro-ops already in the implicated set of the micro-op cache. Essentially, the prediction unit drives the allocation decision rather than an "always allocate" policy or rather than a replacement policy of the micro-op cache. The embodiments may result in a higher micro-op cache hit rate, e.g., by avoiding replacing proven useful fetch blocks with unproven useful fetch blacks. Therefore, the embodiments may have the advantage of improving performance of the microprocessor and reducing its power consumption. The hotness threshold may be configurable by software running on the microprocessor, which may enable the software (e.g., operating system) to tailor the "hotness" required of a fetch block before it is considered worthy for allocation into the micro-op cache based on characteristics of application software running on the microprocessor and/or other system parameters.

FIG. 4B is an example flowchart illustrating operation of the PRU 102 of FIG. 4A to populate the FSI 314 of a FBD 191 in accordance with embodiments of the present disclosure. Operations begins at block 481.

At block 481, the FBSA 412 is looked up in the FBP 152, the BPs 154, and the MTR 173. Operation proceeds to decision block 482.

At decision block 482, if a hit occurs in the FBP 152 operation, proceeds to decision block 484; otherwise, operation proceeds to block 483.

At block 483, the FSI 314 is populated to indicate the instruction cache 101.

At decision block 484, if a hit occurs in the MTR 173, operation proceeds to decision block 485; otherwise, operation proceeds to block 483.

At decision block 485, if execution of the FBIk caused an exception within a predetermined subset of exceptions, operation proceeds to block 483; otherwise, operation proceeds to block 486. In an embodiment, the subset of exceptions includes but is not limited to a need to raise an architectural exception on a MOP within a MOC entry 350.

At block 486, the FSI 314 is populated to indicate the MOC 171.

FIG. 5 is an example block diagram of the IFU 106 of FIG. 1 in accordance with embodiments of the present disclosure. The IFU 106 includes the FBD FIFO 104, the MDR 175, the instruction cache 101, and the mux 161 of FIG. 1. The IFU 106 also includes an instruction translation lookaside buffer (ITLB) 143 and a mux 572. The instruction cache 101 includes an instruction cache tag RAM (ICTR) 522, an instruction cache data RAM (ICDR) 524, a tset mux 532, a dway mux 534, and control logic 501. The FBD FIFO 104 outputs the FBD 300 at its head to provide a FBP hit indicator 502, predicted set index 504, predicted way number 506, fetch block length 508, FBSA 512, FSI 514, initial MDR pointers 516, HFB (not shown), and numMDREs indicator 519, which are referred to collectively as a fetch request 511. In an embodiment, the control logic 501 asserts a read signal 598 to the FBD FIFO 104 to read the FBD 511, which results in the FBD 511 being popped from the FBD FIFO 104.

The instruction cache 101 is a set-associative cache. In one embodiment, the instruction cache 101 is configured as having four ways, and the predicted way number 206 is two bits, although other embodiments are contemplated in which the instruction cache 101 is configured with other numbers of ways. In contrast to the MTR 173 which is arranged as a set-associative cache, the MDR 175 is managed as a pool of MDR entries 340. A variable number of MDR entries 340 may be allocated to a MOC entry 350 from the pool, and MDR entries 340 for a MOC entry 350 may be allocated from anywhere in the pool as long as the MDR entry 340 is free, i.e., is not currently allocated to another MOC entry 350. In an embodiment, the MDR 175 includes 1,024 MDR entries 340 each capable of holding three MOPs such that the initial MDR pointers 336 and the next MDR pointers 344 are each 10 bits and have values zero through 1,023. In an embodiment, the MDR 175 may be dual-ported such that two MDREs 340 may be fetched concurrently from the MDR 175 each clock cycle.

The FSI 514 is provided to the control logic 501 to indicate the fetch source. The configuration of the IFU 106 to fetch architectural instructions from the instruction cache 101 in response to the FSI 514 of a fetch request 511 (i.e., of an FBD 511) that indicates the instruction cache 101 will first be described followed by a description of the IFU 106 to fetch MOPs from the MDR 175 in response to the FSI 514 of the fetch request 511 that indicates the MOC 171.

The ITLB 143 translates the FBSA 512 into a fetch physical address (FPA) 542, assuming the FBSA 512 hits in the ITLB 143, that is used to fetch a line of instructions from the instruction cache 101. An ITLB hit indicator 548 indicates whether the FBSA 512 hit in the ITLB 143 and is provided to the control logic 501. The FPA 542 includes a correct set index 544 portion and a FPA tag 546 portion, each of which is provided to the control logic 501. The control logic 501 also receives the predicted set index 504. In one embodiment, the ITLB 143 is a single-ported RAM structure. The correct set index 544, like the predicted set index 504, includes only translated address bits. The control logic 501 compares the correct set index 544 and the predicted set index 504 and generates a true value on a set mismatch indicator 552 if they do not match and otherwise generates a false value. The ITLB 143 and the portion of the control logic 501 that generates the set mismatch indicator 552 are shown in FIG. 5 as an IC translation sub-pipeline portion of the IC pipeline.

The control logic 501 generates a folded 551 control signal that controls the tset mux 532 and the dway mux 534. The folded 551 signal determines whether the IC pipeline operates in a folded mode or in an unfolded mode. Generally, the control logic 501 generates a true value on the folded 551 signal if FBP hit 502 is true and otherwise generates a false value, although other circumstances are described below in which the control logic 501 may generate a true value on the folded 551 signal.

The tset mux 532 receives the correct set index 544 and the predicted set index 504 and selects the predicted set index 504 if the folded 551 signal is true and selects the correct set index 544 otherwise. The output of the tset mux 532 is combined with untranslated FBSA bits 513 to form an IC set index 533 used to select a set of tags 522 of the ICTR 522 that are provided to the control logic 501. In one embodiment, the ICTR 522 is a single-ported RAM structure. The control logic 501 compares each of the tags 522 with the FPA tag 546 and generates a true value on an IC hit indicator 558 if a valid match is found and otherwise generates a false value. If the IC hit indicator 558 is true, the control logic 501 also generates a correct way number 556 that indicates the way of the instruction cache 101 that was hit. Additionally, the control logic 501 compares the correct way number 556 with the predicted way number 506 and generates a true value on a way mismatch indicator 554 if they do not match and otherwise generates a false value. The ICTR 522, tset mux 532 and the portion of the control logic 501 that generates the way mismatch indicator 554, the correct way number 556, and the IC hit indicator 558 are shown in FIG. 5 as an IC tag sub-pipeline portion of the IC pipeline.

The dway mux 534 receives the correct way number 556 and the predicted way number 506 and selects the predicted way number 506 if the folded 551 signal is true and selects the correct way number 556 otherwise. The selected input is provided as an IC way number 535 that is used, along with the IC set index 533, to select an entry of the ICDR 524 that provides a cache line of data 599. The control logic 501 receives the cache line of data and uses the untranslated BFSA bits 513 and the fetch block length 508 to select from the fetched cache line the architectural instructions 193 of the FBIk that are provided, via mux 161 as controlled by the FSI 514, to the FBIk FIFO 108 of FIG. 1. More specifically, even though the ICDR 524 is arranged in a set-associative fashion (i.e., having multiple ways), only a single way (i.e., only a single cache entry) of the selected set is read out. Advantageously, by reading out only a single way of the ICDR 524, significant power savings may be enjoyed over a conventional design that reads out all N ways, i.e., the cache lines of all the N entries, of a selected set of a data structure and then selects one of the cache lines after the correct way number has been determined from the lookup in the tag structure.

As described herein, the power saving advantage just described is also enjoyed along with the low latency advantage of a folded pipeline since the described embodiments do not have to wait for the correct way number to be determined but instead immediately access the ICDR 524 using the predicted way number 506 predicted by the FBP 152. Additionally, in one embodiment the ICDR 524 comprises multiple adjacent RAM macros, e.g., each of four RAM macros is 16 bytes wide to provide instruction 64-bytes, and the fetch block length 508 may be used to save additional power by reading out from only the necessary one or more RAM macros. For example, assume the offset into the cache line indicated by the untranslated lower bits of the FBSA 512 are at byte 3 and the fetch block length 508 is 11 bytes, then only a single RAM macro (i.e., the first RAM macro) is read out and the other three RAM macros are not read out, which may save power relative to an embodiment that reads out all four of the RAM macros without regard for the fetch block length 508. In one embodiment, the ICDR 524 is a single-ported RAM structure. The ICDR 524 and the dway mux 534 are shown in FIG. 5 as an IC data sub-pipeline portion of the IC pipeline.

As described herein, when the FBP hit indicator 502 indicates that the FBP 152 has provided a predicted set index and a predicted way number, the IC pipeline may operate in a folded pipeline mode such that the translation sub-pipeline, the tag sub-pipeline, and the data sub-pipeline operate in parallel to significantly reduce the latency of the IC pipeline. More specifically, in the data sub-pipeline the architectural instructions 193 are advantageously immediately fetched from the ICDR 524 using the predicted set index 504 and the predicted way number 506, while in parallel in the translation sub-pipeline the ITLB 143 translates the FBSA 512 into the FPA 542 and the control logic 501 generates the set mismatch 552 signal, and in parallel in the tag sub-pipeline the ICTR 522 determines the correct way number 556 and generates the way mismatch 554 signal. However, in other circumstances, e.g., a miss in the FBP 152, the IC pipeline may briefly operate in an unfolded pipeline mode as needed such that the translation sub-pipeline, the tag sub-pipeline, and the data sub-pipeline operate sequentially. The IC pipeline may also include staging registers (not shown) that stage various signals as needed. For example, when operating in unfolded mode, the correct set index 544 may be staged down from the translation sub-pipeline to the tag sub-pipeline, and the IC set index 533 may be staged down from the tag sub-pipeline to the data sub-pipeline.

A description of the IFU 106 to fetch MOPs from the MDR 175 in response to an FSI 514 of the fetch request 511 that indicates the MOC 171 is now provided. The MDR 175 and the mux 572 are shown in FIG. 5 as an MDR pipeline portion of the IFU 106, which is activated in response to the FSI 514 of the fetch request 511 indicating the MOC 171. The control logic 501 controls the mux 572 via control signal 571 each clock cycle to select either the initial MDR pointers 516 of the fetch request 511 or the next MDR pointers 574 from the MDR 175 output. The next MDR pointers 574 are the next MDR pointers 344 of fetched MDR entries 340. In an embodiment, although the MDR 175 employs a single-cycle RAM, the latency through the MDR 175 is two clock cycles because an extra clock cycle is needed for the feedback path from the RAM output through the mux 572 to the RAM input. In particular, the RAM setup and clock to data out times may be sufficiently long to require the extra clock cycle. In an embodiment, the group size G is two such that the initial MDR pointers 516 comprise two pairs of initial MDR pointers, i.e., four linked lists. The control logic 501 controls the mux 572 based on the number of groups N of initial MDR pointers 336 described above and based on the numMDREs 519 of the MOC entry 350.

The MDR pipeline may also include a buffer (not shown) that buffers the initial MDR pointers 516 in embodiments in which the number of groups N of initial MDR pointers 336 (i.e., MDR pipeline latency) is greater than one. The first group of initial MDR pointers 516 may be provided immediately to the mux 572 upon the read of the FBD 511, and the buffer may receive the remaining groups of initial MDR pointers 516 for provision to the mux 572 in program order upon the next N-1 clock cycles. For example, in an embodiment in which the MDR 175 latency N is two and the group size G is two (i.e., there are four initial MDR pointers 516 arranged as two groups of two), during a first clock cycle the first pair of initial MDR pointers 516 is provided directly to the mux 572 to access the MDR 175, and the second pair of initial MDR pointers 516 is received by the buffer which provides the second pair of initial MDR pointers 516 to the mux 572 to access the MDR 175 on the next clock cycle.

The MDR pointers 336/34 are populated when the MOC entry 350 is allocated such that the MOPs of the MDREs are fetched and provided to the FBIk FIFO 108 in program order. That is, the groups of MDREs fetched in a clock cycle are immediately older in program order than the groups of MDREs fetch in the next clock cycle. Additionally, in embodiments in which the group size G is greater than one, the MDREs within a group are in program order according to the order of the MDR pointers 336/344 that point to them. For example, assuming the group size G is two, the first MDR pointer 336/344 in a group points to the oldest MDRE in the group, and the second MDR pointer 336/344 in a group points to the next oldest MDRE in the group.

With respect to each linked list of a MOC entry 350, on the first fetch from the MDR 175, the control logic 501 controls the mux 572 to select the initial MDR pointers 516 to access the MDR 175 to fetch the MOPs 194 of the youngest in program order MDRE of the linked list for provision to the FBIk FIFO 108 via mux 161. Then, on subsequent fetches from the MDR 175 for the linked list, the control logic 501 controls the mux 572 to select the next MDR pointers 574 to access the MDR 175 to fetch the MOPs 194 of subsequently older in program order MDREs of the linked list for provision to the FBIk FIFO 108 via mux 161. Again, assuming an embodiment in which N is two and G is two, the first pair of initial MDR pointers 516 is provided to the MDR 175 on a clock cycle to fetch the first two MDR entries of the linked list, and the second pair of MDR pointers 516 is provided to the MDR 175 on the next clock cycle to fetch the next two MDR entries of the linked list. In this manner, the MOPs of the MOC entry 350 are pushed into the FBIk FIFO 108 in program order. Furthermore, the MOPs of the MOC entry 350 are pulled from the FBIk FIFO 108 in program order by the DEC 112.

In an embodiment, the IFU 106 also writes the corresponding FSI 514 into each entry of the FBIk FIFO 108 (e.g., into the Type bit 364 of FIG. 3E), which enables the DEC 112 to know whether the entry holds AIs or MOPs. In an embodiment, the ICDR 524 and the MDR 175 have read enable inputs (not shown, e.g., generated by the control logic 501) that must be asserted to read from them. If the read enable input is not asserted, then the RAM may be said to be in a lower power mode because it is drawing very little power. Advantageously, when architectural instructions are not being fetched from the ICDR 524 (e.g., when MOPs are being read from the MDR 175) the read enable input to the ICDR 524 is not asserted to save power and conversely when MOPs are not being fetched from the MDR 175 (e.g., when architectural instructions are being read from the ICDR 524) the read enable input to the MDR 175 is not asserted to save power.

Advantageously, according to embodiments described herein, the penalty for switching between fetching via the MDR pipeline to fetching via the folded IC pipeline and vice versa may be reduced and even eliminated in some embodiments by the generation of the FSI 314 by the PRU 102 and the inclusion of the FSI 314 in the FBDs 191 that are provided in program order to the IFU 106. Further advantageously, the inclusion of the FSI 314 in the FBDs 191 may simplify the design of the IFU 106 relative to more complex conventional designs that employ a micro-op cache. Still further, the fetching of MOPs via distributed MDRE pointers may improve performance and efficiency of the MOC 171.

Figure 6A:
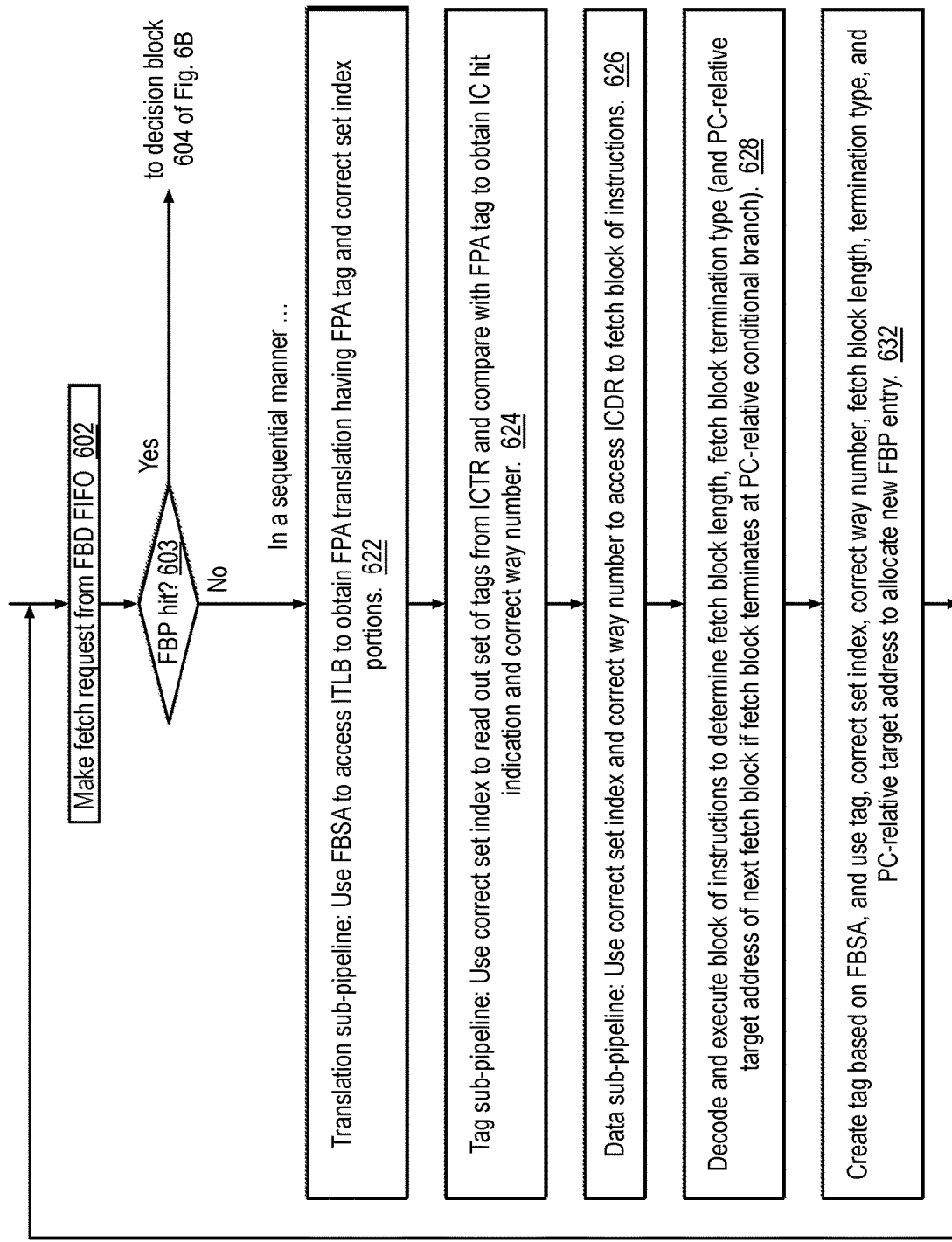
FIGS. 6A and 6B, referred to collectively as FIG. 6, is an example flowchart illustrating operation of the PRU of FIG. 4A and the IFU of FIG. 5 in accordance with embodiments of the present disclosure.
Figure 6B:
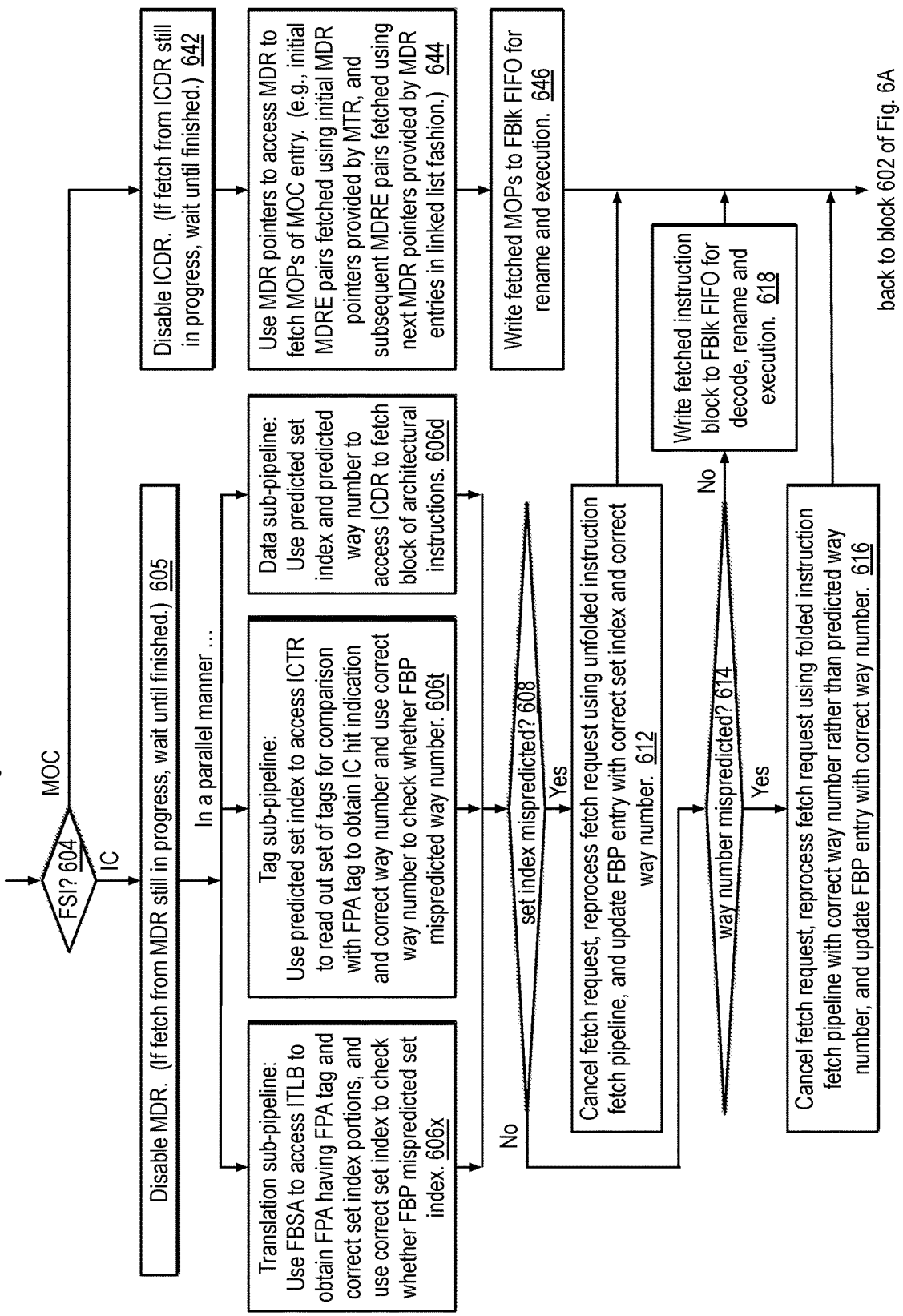

FIGS. 6A and 6B, referred to collectively as FIG. 6, is an example flowchart illustrating operation of the PRU 102 of FIG. 4A and the IFU 106 of FIG. 5 in accordance with embodiments of the present disclosure. Operation begins at block 602.

At block 602, a fetch request 511 of FIG. 5 is made from the FBD FIFO 104. Operation proceeds to decision block 603.

At decision block 603, if the FBP hit indicator 502 is true, operation proceeds to decision block 604; otherwise, operation proceeds to block 622, and blocks 622, 624, and 626 are performed in a sequential manner, e.g., the control logic 501 generates a false value on the folded signal 551.

At decision block 604, if the FSI indicator 514 indicates the MOC 171, operation proceeds to block 642 of FIG. 6B; whereas, if the FSI indicator 514 indicates the instruction cache 101, operation proceeds to block 605.

At block 605, once all pending fetch requests to the MDR 175 are completed, the IFU 106 ceases to assert the enable input to the MDR 175 which may result in a power saving. Operation proceeds from block 605 to blocks 606*x*, 606*t*, and 606*d*, which are performed in a parallel manner, e.g., the control logic 501 generates a true value on the folded signal 551.

At block 606*x*, in the IC translation sub-pipeline, the FBSA 512 is used to access the ITLB 143 to obtain the translation of the FBSA 512, i.e., FPA 542, which includes the FPA tag 546 and the correct set index 544. In one embodiment, the IC set index 533 is a hash of lower bits of the FPA 542 (e.g., FPA[16:7]) with higher bits of the FPA 542. Additionally, the correct set index 544 is used by the control logic 501 to check whether the FBP 152 mis-predicted the set index, i.e., whether the predicted set index 504 does not match the correct set index 544. Operation proceeds from block 606*x* to decision block 608.

At block 606*t*, in the IC tag sub-pipeline, the predicted set index 504 is used to access the ICTR 522 to read out a set of tags 553 for comparison with the FPA tag 546 to obtain the IC hit indicator 558 and correct way number 556. Additionally, the correct way number 556 is used by the control logic 501 to check whether the FBP 152 mis-predicted the way number, i.e., whether the predicted way number 506 does not match the correct way number 556. Operation proceeds from block 606*t* to decision block 608.

At block 606*d*, in the IC data sub-pipeline, the predicted set index 504 and the predicted way number 506 are used to access the ICDR 524 to fetch a FBlk of architectural instructions 193. Operation proceeds from block 606*d* to decision block 608.

At decision block 608, if the set mismatch 553 indicator is true, operation proceeds to block 612; otherwise, operation proceeds to decision block 614.

At block 612, because the set index was mis-predicted by the FBP 152, the current fetch request 511 is canceled, i.e., none of the bytes of the fetched architectural instructions 193 are written into the FBIk FIFO 108. Furthermore, the IC pipeline reprocesses the fetch request 511 in the unfolded mode, i.e., in a sequential manner, similar to the manner described with respect to blocks 622, 624 and 626. In an alternate embodiment, the IC pipeline reprocesses the fetch request 511 in a partially folded manner. That is, the control logic 501 controls the tag sub-pipeline to use the correct set index 544 obtained from the first/canceled processing instance of the fetch request 511 to, during the second processing instance of the fetch request 511, initiate access of the ICTR 522 in parallel with the initiation of the lookup of the FBSA 512 in the ITLB 143, and the control logic 501 controls the data sub-pipeline to, in a sequential manner, wait and use the correct set index 544 obtained from the translation sub-pipeline and the correct way number 556 obtained from the tag sub-pipeline to access the ICDR 524 to fetch the architectural instructions 193. In both embodiments, because the FBP 152 mis-predicted the set index in the first/canceled processing instance, the IC pipeline was not able to determine the correct way number during the first/canceled processing instance, so it is assumed that the FBP 152 also mis-predicted the way number. Finally, after the second processing instance, the FBP entry 200 that mis-predicted is updated with the correct set index 544 and correct way number 556. Operation returns to block 602 to process the next fetch request 511.

At decision block 614, if the way mismatch 554 indicator is true, operation proceeds to block 616; otherwise, operation proceeds to block 618.

At block 616, because the way number was mis-predicted by the FBP 152, the current fetch request 511 is canceled. Furthermore, the IC pipeline reprocesses the fetch request 511 in the folded mode, i.e., in a parallel manner, similar to the manner described with respect to blocks 606*x*, 606*t* and 606*d* but using the correct set index 544 and correct way number 556 obtained during the first/canceled processing instance of the fetch request 511. Finally, after the second processing instance, the FBP entry 200 that mis-predicted is updated with the correct way number 556. Operation returns to block 602 to process the next fetch request 511.

At block 618, because the set index and way number were correctly predicted by the FBP 152, the fetched FBlk is written to the FBIk FIFO 108 for subsequent decode by the decode unit 112 and execution by the execution units 114. Operation returns to block 602 to process the next fetch request 511.

At block 622, in the translation sub-pipeline, the FBSA 512 is used to access the ITLB 143 to obtain the translation of the FBSA 512, i.e., FPA 542, which includes the FPA tag 546 and the correct set index 544. Additionally, the correct set index 544 is used by the control logic 501 to check whether the FBP 152 mis-predicted the set index. Operation proceeds to block 624.

At block 624, in the tag sub-pipeline, the correct set index 544 provided by the translation sub-pipeline at block 622 is used to access the ICTR 522 to read out a set of tags 553 for comparison with the FPA tag 546 to obtain the IC hit indicator 558 and correct way number 556. Additionally, the correct way number 556 is used by the control logic 501 to check whether the FBP 152 mis-predicted the way number. Operation proceeds to block 626.

At block 626, in the data sub-pipeline, the correct set index 544 provided by the translation sub-pipeline at block 622 and the correct way number 556 provided by the tag sub-pipeline at block 624 are used to access the ICDR 524 to fetch a FBlk that is written to the FBIk FIFO 108. That is, blocks 622, 624, and 626 are performed in a sequential manner according to an unfolded mode of the IC pipeline. Operation proceeds to block 628.

At block 628, the FBlk written to the FBlk FIFO 108 at block 626 is subsequently fetched from the FBlk FIFO 108 and decoded by the decode unit 112, and the decoded instructions are dispatched to the execution units 114 for execution. During the decode and execution of the instructions, the fetch block length, the termination type, and the PC-relative target address of the next fetch block (in the case the fetch block terminates in a PC-relative conditional branch instruction) may be determined. Operation proceeds to block 632.

At block 632, a FBP tag is generated based on the FBSA 512, e.g., a hash as described above with respect to FIG. 2. The generated FBP tag, the correct set index 544 determined at block 622, the correct way number 556 determined at block 624, and the fetch block length, the termination type, and the PC-relative target address determined at block 628, are used to create and allocate a new FBP entry 200 into the FBP 152. Operation returns to block 602 to process the next fetch request 511.

At block 642, once all pending fetch requests to the ICDR 524 are completed, the IFU 106 ceases to assert the enable input to the ICDR 524 which may result in a power saving. Operation proceeds to block 644.

At block 644, the IFU 106 uses the MDR pointers to access the MDR 175 to fetch the MOPs of the MOC entry, i.e., the MOPs of the FBlk. In an embodiment, a first pair of initial MDR pointers 516 provided by the MTR 173 that point to a first pair of MDR entries 340 is used to access the MDR 175 to fetch a first pair of MDREs and first pair of next MDR pointers 574, then a second pair of initial MDR pointers 516 provided by the MTR 173 that point to a second pair of MDR entries 340 is used to access the MDR 175 to fetch a second pair of MDREs and a second pair of next MDR pointers 574, then the first pair of next MDR pointers 574 that point to a third pair of MDR entries 340 is used to access the MDR 175 to fetch a third pair of MDREs and a third pair of next MDR pointers 574, then the second pair of next MDR pointers 574 that point to a fourth pair of MDR entries 340 is used to access the MDR 175 to fetch a fourth pair of MDREs and a fourth pair of next MDR pointers 574, and so forth until all the MDREs indicated by the numMDREs indicator 519 have been fetched. Such an example is described below with respect to FIG. 17. Operation proceeds to block 646.

At block 646, the IFU 106 writes the fetched MOPs of the MFBlk to the FBlk FIFO 108 from which they are fetched by the DEC 112 to be renamed and dispatched for execution. In an embodiment, the IFU 106 also writes the corresponding FSI 514 into each entry of the FBlk FIFO 108, which enables the DEC 112 to know whether the entry holds AIs or MOPs.

As described above, advantageously the instruction fetch pipeline may be shortened/folded while also obtaining the power saving benefit of reading out only a single way of the instruction cache data RAM per instruction block fetch. The power savings may be particularly significant in embodiments in which the amount of bytes per data RAM entry is large, e.g., 64 bytes per entry as in one embodiment and 128 bytes per entry as in another embodiment. Further advantageously, the described embodiments may enable the processor 100 to have a single first-level instruction cache 101 that is large relative to a conventional design that has multiple levels of instruction cache and in which the first-level instruction cache is relatively small in order to facilitate single-clock cycle accesses since the conventional instruction fetch pipeline does not operate in a folded manner. In one embodiment, the instruction cache 101 is arranged as 2048 sets and 4 ways for a total of 8192 entries each holding a 64-byte cache line of instructions, and the ICDR 524 is a 512 KB RAM such that the instruction cache 101 (i.e., the IC data sub-pipeline) has a latency of two clock cycles when operating in folded mode, whereas in contrast a first-level instruction cache of a conventional multi-level instruction cache hierarchy design in a similar semiconductor technology may be a 32 KB or 64 KB cache, which may result in a lower hit rate than the larger first-level instruction cache 101 of the described embodiments. Further advantageously, the described embodiments may enable the processor 100 to have an ITLB 143 that is large relative to a conventional design in which the instruction TLB is/are relatively small in order to facilitate single-clock cycle accesses since the conventional instruction fetch pipeline does not operate in a folded manner. In one embodiment, the ITLB 143 comprises three TLBs that respectively support three different page sizes (e.g., 4 KB, 2 MB, and 1 GB pages) and collectively comprise more than three thousand entries such that the IC translation sub-pipeline has a two-clock cycle access latency.

Still further advantageously, as described herein, the penalty for switching between fetching via the MDR pipeline to fetching via the folded IC pipeline and vice versa may be reduced and even eliminated in some embodiments, and the design of the IFU 106 may be simplified relative to more complex conventional designs that employ a micro-op cache.

FIG. 7A is three example pipeline diagrams illustrating the MDR pipeline and dynamic operation of the IC pipeline of the IFU 106 of FIG. 5 in both a folded mode and in an unfolded mode in accordance with embodiments of the present disclosure. In the example embodiment of FIG. 7A, the MDR 175 is fully pipelined and the MDR pipeline effectively comprises two pipeline stages. The two MDR pipeline stages are designated MD1 and MD2, as shown in the top pipeline diagram of FIG. 7A. The MD1 stage processes a portion of the fetch request 511 during a first clock cycle, and the MD2 stage processes a portion of the fetch request 511 during a next clock cycle. In an embodiment, the MD1 stage reads the MDR 175, and the MD2 stage writes the MOPs fetched from the MDR 175 into the FBlk FIFO 108. Also, the MD2 stage feeds back the fetched next MDR pointer 574 through the mux 572 to the input of the MDR 175 to setup the MDR 175. In an embodiment, in an MDS stage (of FIG. 7B), which precedes the MD1 stage, sets up the MDR pointer 516/574 in the MDR 175 to select the desired MDRE 340. The MDS overlaps with the last stage PR5 of the PRU 102 in the case of an initial MDR pointer 516 access and overlaps with the MD2 stage in the case of a next MDR pointer 574 access. That is, in the case of an initial MDR pointer 516 access, the MDR 175 setup overlaps with the read of the initial MDR pointer 516 of the FBD 511 from the FBD FIFO 104, and in the case of a next MDR pointer 574 access, the MDR 175 setup overlaps with the feedback of the next MDR pointer 574. In this manner, the effective fetch latency of the MDR pipeline is only two clock cycles.

In the example embodiment of FIG. 7A, each of the IC translation, tag, and data sub-pipelines comprises two pipeline stages. The two translation sub-pipeline stages are designated IX1 and IX2; the two tag sub-pipeline stages are designated IT1 and IT2; and the two data sub-pipeline stages are designated ID1 and ID2. Similar to the MDR pipeline, an IDS setup stage of the IC data sub-pipeline overlaps with the PR5 stage.

The folded mode of operation of the IC pipeline is shown in the middle pipeline diagram of FIG. 7A in which each of the three sub-pipelines operate in parallel. More specifically, the IX1, IT1 and ID1 stages each process a portion of the fetch request 511 during a first clock cycle, and the IX2, IT2 and ID2 stages each process a portion of the fetch request 511 during a next clock cycle. The ID2 stage writes the AIs fetched from the ICDR 524 into the FBIk FIFO 108. In this manner, the effective latency of the IC pipeline incurred by the three sub-pipelines during folded mode operation is only two clock cycles, in contrast to the six clock cycles incurred by the three sub-pipelines in the unfolded mode, as will now be described.

The unfolded mode of operation of the IC pipeline is shown in the bottom pipeline diagram of FIG. 7A in which each of the three sub-pipelines operate sequentially. More specifically, the IX1 stage processes the fetch request 511 during a first clock cycle, then the IX2 stage processes the fetch request 511 during a second clock cycle, then the IT1 stage processes the fetch request 511 during a third clock cycle, then the IT2 stage processes the fetch request 511 during a fourth clock cycle, then the ID1 stage processes the fetch request 511 during a fifth clock cycle, then the ID2 stage processes the fetch request 511 during a sixth clock cycle. In this manner, the effective latency of the IC pipeline during unfolded mode operation incurred by the three sub-pipelines is six clock cycles.

In one embodiment, as described above, the MDR 175, the ITLB 143, the ICTR 522, and the ICDR 524 are all single-ported RAM structures. As described herein, the IC pipeline may dynamically switch back and forth between the folded and unfolded modes, an embodiment of which is described below with respect to FIG. 8. For example, the IC pipeline may switch to unfolded mode if the fetch request 511 indicates a miss in the FBP 152, e.g., via FBP hit indicator 502, or there is a miss in the ITLB 143 or instruction cache 101, as described below with respect to FIG. 8. In one embodiment, the switch back to the folded pipeline operation occurs right after processing of the current fetch request that requires unfolded pipeline operation. That is, the pipeline unfolds only for one fetch request and then refolds unless the next fetch request requires processing via an unfolded pipeline, e.g., FBP miss. In this manner, sub-pipeline conflicts, e.g., between the data sub-pipeline stages of the unfolded pipeline and the data sub-pipeline stages of the folded pipeline, are avoided. As a result, the start of processing of the next fetch request is delayed until the current fetch request is in the ID1 sub-pipeline stage. Thus, in the embodiment of FIG. 7A, there is a four-cycle delay for switching from an unfolded pipeline back to a folded pipeline if the next fetch request is immediately ready behind the current fetch request, whereas the delay is reduced if there is a gap between current and next fetch requests. In an alternate embodiment, the pipeline refolds for the next fetch request independent of the FBP hit indicator 502 (although as described above, depending upon when the next fetch request is ready behind the current fetch request, a delay may be incurred for switching from an unfolded pipeline back to a folded pipeline in order to avoid sub-pipeline conflicts). In yet another embodiment, the pipeline may remain unfolded and continue to operate in an unfolded manner for subsequent fetch requests until one or more events occur, e.g., the FBD FIFO 104 is empty, a branch misprediction is detected that causes the front-end 110 to be flushed, etc. In such an embodiment, the pipeline may continue to operate in a fully pipelined manner as long as the FBD FIFO 104 is not empty.

Since the MDR pipeline is also two stages in the embodiment of FIG. 7A, there is a four-cycle delay for switching from an unfolded IC pipeline back to the MDR pipeline if the next fetch request is immediately ready behind the current fetch request. However, if the next fetch request is immediately ready behind the current fetch request, advantageously there is no delay when switching from a folded IC pipeline back to the MDR pipeline nor is there delay when switching from the MDR pipeline back to a folded IC pipeline. The lack of switch penalty is enabled by the FSI 314/514 which is enabled by the separation of the MOC 171 into the MTR 173 in the PRU 102 and the MDR 175 in the IFU 106 as described in more detail herein.

FIG. 7B is an example pipeline diagram illustrating the front-end and mid-end pipeline of the processor 100 of FIG. 1 in accordance with embodiments of the present disclosure. More specifically, FIG. 7B illustrates the pipeline stages of the PRU 102, IFU 106, and DEC 112.

The PRU pipeline includes successive pipeline stages PR1, PR2, PR3, PR4, and PR5. The PRU pipeline stages of an embodiment are described in more detail below with respect to FIG. 12 and correspond to the pipeline stages of the embodiment of the PRU 102 of FIG. 11. The PR4 stage produces the FBD 191 that describes the FBIk that will be fetched by the IFU 106 either from the ICDR 524 or from the MDR 175 as indicated by the FSI 514. The PR5 stage is also referred to as the IDS stage or the MDS stage because, although it operates to check for mis-predictions made by the PRU 102, it also operates as the RAM setup stage for the ICDR 524 and the MDR 175, respectively, of the IFU 106, as described above. The IDS/MDS stage is followed by the IFU pipeline.

In the embodiment of FIG. 7B, the IFU pipeline includes two parallel 2-stage fetch pipelines: the folded IC pipeline and the MDR pipeline of FIG. 7A. When the FSI 514 specifies the MDR 175, MOPs 194 are fetched via the MD1 and MD2 stages of the MDR pipeline. When the FSI 514 specifies the instruction cache 101 and the IFU 106 is operating in folded mode, architectural instructions 193 are fetched via the ID1 and ID2 stages of the IC folded pipeline. As shown, the IX1 and IX2 stages and the IT1 and IT2 stages also operate in parallel with the ID1 and ID2 stages per the folded IC pipeline. Although not shown in FIG. 7B, when necessary, the IFU pipeline may also operate as the unfolded IC pipeline of FIG. 7A as described herein.

The DEC pipeline includes successive pipeline stages DPD, DXE, DRN, and DDS. The DPD stage is a pre-decode stage that identifies instruction boundaries within the FBIk FIFO 108 that contains the next group of architectural instruction bytes to be decoded and executed. The DPD may also identify consecutive pairs of architectural instructions that can be fused together. The DXE stage is an extract stage that extracts the architectural instructions at the identified boundaries. The DXE also decodes each identified instruction or instruction pair into a corresponding MOP representation. The DRN stage is a rename stage that takes the MOPs produced by the DXE stage or fetched from the MOC 171 and renames the architectural registers specified by the MOPs to physical registers of the PRF of the back-end 130. The DDS stage is a dispatch stage that dispatches register-renamed MOPs to the back-end 130.

Since the MOPs, unlike architectural instructions, do not need to be decoded but instead have already been decoded during a previous fetch instance of the corresponding architectural instructions and cached in the MOC 171, when the MOPs are fetched from the FBIk FIFO 108 rather than architectural instructions, the DPD and DXE stages may operate at largely reduced power consumption as the MOPs pass through since the MOPs do not need to be decoded.

Figure 8:
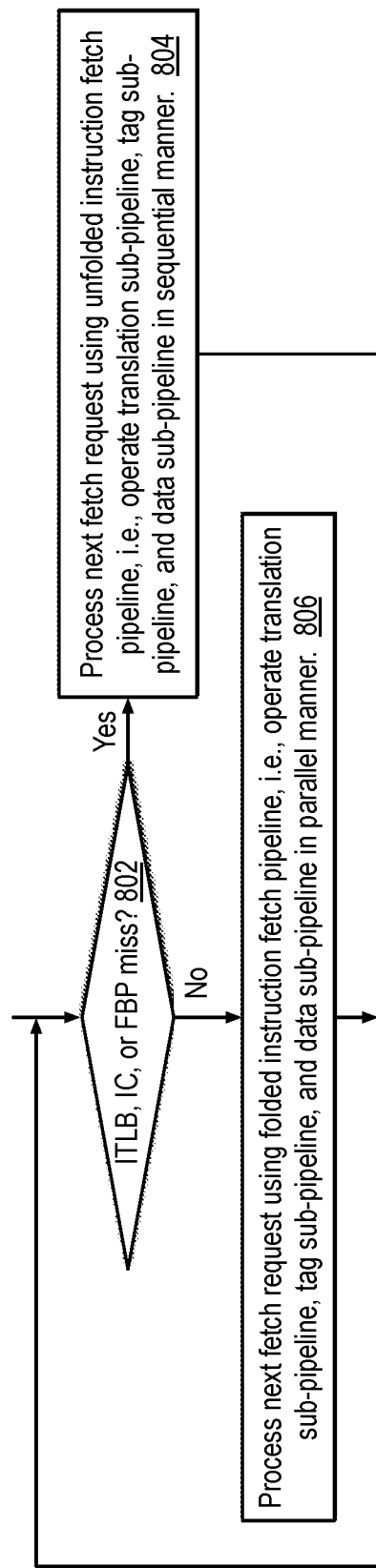
FIG. 8 is example flowchart illustrating operation of the IFU of FIG. 5 in accordance with embodiments of the present disclosure.

FIG. 8 is an example flowchart illustrating operation of the IFU 106 of FIG. 5 in accordance with embodiments of the present disclosure. Operation begins at decision block 802.

At block 802, if there is a miss in the ITLB 143, instruction cache 101, or FBP 152 (e.g., as determined at decision block 603 of FIG. 6), operation proceeds to block 804; otherwise, operation proceeds to block 806.

At block 804, the IFU 106 processes the next fetch request 511 in an unfolded manner, i.e., the translation, tag, and data sub-pipelines operate in a sequential manner, e.g., as described above with respect to block 622, 624, and 626 of FIG. 6. Operation returns to decision block 802 to process the next fetch request 511.

At block 806, the IFU 106 processes the next fetch request 511 in a folded manner, i.e., the translation, tag, and data sub-pipelines operation in a parallel manner, e.g., as described above with respect to block 606x, 606t, and 606d of FIG. 6. Operation returns to decision block 802 to process the next fetch request 511.

As described above, a goal of the front-end 110 is to avoid starvation of the DEC 112. Stated alternatively, a goal of the front-end 110 is to keep the mid-end 120 as fully supplied as possible with MOPs and with architectural instructions to decode into MOPs to dispatch to the back-end 130 in order to keep the back-end 130 as fully supplied as possible-given instruction-level parallelization limitations the program may impose—with MOPs to execute in order to optimize performance of the processor 100. Because the back-end 130 may execute MOPs out-of-order and in a superscalar fashion, the back-end 130 may require a significant number of MOPs per clock cycle to be highly utilized and achieve high performance. Although the FBD FIFO 104 and FBIk FIFO 108 may dampen the effect of instruction stream peaks and troughs for a relatively short number of clock cycles, for workloads in which the mid-end 120 and the back-end 130 can sustain a high instruction per clock rate for a significant number of clock cycles, the front-end 110 will also need to sustain the high instruction per clock rate.

As also described above, in one embodiment a cache line fetched from the instruction cache 101 may be up to 64 bytes, for example. For an embodiment in which the size of an instruction is four bytes, for example, up to sixteen instructions may be fetched in a clock cycle. However, as also described above, groups of instructions are written to the FBIk FIFO 108 at the granularity of a FBIk. As also described above, a FBIk may be anywhere from one instruction to the maximum number of instructions in a cache line, depending upon where in the FBIk the terminating instruction, if any, appears in the FBIk. Assume for example that, for a given lengthy instruction stream, the typical number of instructions per FBIk is four and the typical number of instructions the mid-end 120 can dispatch per clock and the back-end 130 can execute per clock is four. In such an example, the front-end 110 is likely to be able to provide the needed instruction rate to the mid/back-ends 120/130 if the PRU 102 provides FBDs 191 to the IFU 106 (via the FBD FIFO 104) at a rate of one FBD per clock so that the IFU 106 can fetch from the instruction cache 101 at a rate of one FBIk per clock. However, if the PRU 102 provides FBDs at a rate of less than one per clock, the instruction cache 101 will not be able to fetch at a rate of one FBIk per clock, and the back-end 130 may experience starvation.

Given the demands of high-performance processors for a short clock cycle and high fetch prediction accuracy, it may be difficult to design a PRU 102 that is configured to produce at a rate of one FBD per clock and achieve a high clock rate. More specifically, as may be illustrated by the example embodiment of FIG. 4A, the PRU 102 uses the fetch address (e.g., current FBSA 412) of the current FBIk (first FBIk) to produce a FBD 191 for the current FBIk and to produce a fetch address (e.g., next FBSA 449) of the next FBIk (second FBIk) which is fed back for use by the PRU 102 to produce a FBD 191 for the second FBIk and a fetch address for a third FBIk, and so forth. Thus, a fetch address loop around the PRU 102 exists in which FBDs are produced at the rate that next fetch addresses are produced by the PRU 102. In order to produce at the desired rate of one FBD per clock as discussed above, the PRU 102 must produce at a rate of one next fetch address per clock.

One solution is to design a PRU 102 that takes no more than a single clock cycle to generate the next FBSA 449 using the current FBSA 412 and feed the next FBSA 449 back around the loop as the current FBSA 412 for use in generating the next FBSA 449 for the next FBIk. However, this may be difficult to achieve given the desired short clock cycles of high-performance microprocessors and the complex and/or large predictors (FBP 152 and BPs 154) required to achieve high fetch prediction accuracy and that may require large lookup times as well as the time required by the next FBSA formation logic 408 to take in the predictor outputs and form the next FBSA 449 (as well as muxing, not shown, to select the current FBSA 412 from among the next FBSA 499 and other fetch addresses, e.g., correction fetch address for misprediction correction) as well as hashing logic (not shown) used to generate an index and tag used to access the FBP 152, for example. Given the fetch address loop, if the PRU 102 takes N clock cycles to receive the current FBSA 412 and feed the next FBSA 449 back, then a rate of 1/N FBD's per clock may be produced, which for some instruction streams may result in starvation of the back-end 130.

Advantageously, embodiments are described in which the fetch address loop is effectively broken into two pieces by the employment of a single-cycle predictor (SCP) at the front end of the PRU 102 and checking logic at the end of the PRU 102 that checks the SCP prediction against a more accurate prediction, generally speaking, made by the other predictors (e.g., the FBP 152 and the branch predictors (BPs) 154) that trains the SCP if necessary. The SCP is a simple predictor, relative to the other predictors, that is incapable of providing a FBD 191 (e.g., incapable of providing a full fetch address), but is capable of outputting the information needed by the other predictors to enable them to initiate their lookups. And, the SCP is fast enough to receive its input, output the needed information selected by the input, and feedback the output through a mux to its input in a single clock cycle. That is, the SCP uses information associated with a previous FBIk to predict a small amount of information, relative to the other predictors, associated with a current FBIk each clock cycle that is used by the other predictors to initiate their lookups in order to make a full prediction associated with a next FBIk that is hopefully more accurate, and in some embodiments made over multiple clock cycles. That is, the input used to access the SCP in a given clock cycle is at least a portion of the output of the SCP associated with the previous FBIk (i.e., the FBIk immediately preceding the current FBIk in program execution order) from the previous clock cycle that is fed back around to form a single-clock cycle loop around the SCP.

Viewed from another perspective, the multi-clock cycle fetch address loop around the PRU 102 of FIG. 4A is replaced with the single-cycle SCP loop followed by a fetch stream prediction unit (FSPU), e.g., the FBP 152, the BPs 154, the MTR 173, the next FBSA formation logic 408, and the fetch block descriptor formation logic 406. That is, the FSPU is preceded by the single-cycle loop around the SCP that, every clock cycle, provides another output of information to the FSPU that the uses to produce FBDs 191 and next FBSAs 449 at the rate of one per clock cycle, as described below in more detail. More specifically, each clock cycle, the FSPU produces a FBD 191 that describes the current FBlk and a prediction of the next fetch address, branch direction, and indirect branch indicator produced by the current FBlk. In one embodiment, the FSPU is a fully pipelined multi-cycle prediction unit.

The small amount of information output by the SCP that is needed by the other predictors to initiate their lookups may include a hashed index (e.g., 13 bits), a hashed tag (e.g., 9 bits), a branch direction (1 bit), and an indirect branch indicator (1 bit). The SCP output is a prediction of information that will be produced by a previous FBlk when subsequently fetched-either from the instruction cache and decoded or from the MOC 171—and executed. The hashed index and hashed tag comprise respective first and second hashes of a prediction of a next fetch address produced by the previous FBlk. A different combination of bits of the next fetch address is hashed to generate the hashed index than the combination of bits of the next fetch address hashed to generate the hashed tag. The hashed index and hashed tag may also be hashed with a virtual machine identifier and may also be hashed with a privilege level. The hashed index may be used to initiate lookups in random access memories (RAMs) of the predictor structures of the FSPU, and the hashed tag may be used to perform comparisons with tags of some of the FSPU predictor structures. The branch direction indicator predicts whether the previous FBlk is terminated by a Taken branch instruction. The indirect branch indicator predicts whether the previous FBlk is terminated by an indirect branch instruction. The branch direction and indirect branch indicator, along with one or more bits of the hashed index, are used to create an updated branch history based on a current branch history. The hashed index and hashed tag provided by the SCP may be hashed with the various lengths of the updated branch history to generated indexes and tags used to access some of the FSPU predictor structures.

As described above, a portion of the SCP output associated with a previous FBlk of the previous clock cycle is fed back and used as the input to the SCP on the current clock cycle to obtain information associated with the current FBlk. In one embodiment, a portion of the hashed index that is output by the SCP is fed back as the input to the SCP. Hence, when training the SCP, the fetch address of the previous FBlk is hashed and the hash result (i.e., the portion corresponding to the SCP input) is used to select the entry of the SCP to be trained. The trained SCP entry is written with a first hash of the next fetch address produced by the previous FBlk (hashed index), a second hash of the next fetch address produced by the previous FBlk (hashed tag), the direction bit produced by the previous FBlk, and the indirect branch indicator produced by the previous FBlk.

The training of an SCP entry may be performed in response to detection of a misprediction. For example, after the FSPU makes its prediction using the SCP prediction (i.e., the SCP output), the SCP and FSPU predictions may be compared, and if the predictions mismatch, then the mispredicting SCP entry may be trained using the FSPU prediction. For another example, after the instruction fetch unit fetches a FBlk predicted by the FSPU and the DEC 112 and execution units 114 decode and execute the FBlk, the prediction made by the FSPU may be compared with the execution results, and if they mismatch, then the FSPU, as well as the SCP, may be trained using the execution results.

Advantageously, the SCP, by breaking the fetch address loop and providing a new output each cycle that is usable by the FSPU to initiate its lookups each cycle, facilitates a higher clock rate and/or larger predictors—e.g., fetch block predictor, conditional branch predictor, indirect branch predictor, return address predictor—that may take a long time (multiple clock cycles in some embodiments) to make very accurate branch predictions relative to smaller single-cycle branch predictors. For example, in one embodiment the FBP 152 has 12K entries (2K sets of 6 ways each), the CBP 1142 of FIG. 11 has 16K entries (one 8K-entry bimodal table and four 2K-entry tagged tables), and the IBP 1144 of FIG. 11 has 2K entries (four 512-entry tagged tables).

FIG. 9 is an example block diagram of a SCP entry 900 in accordance with embodiments of the present disclosure. SCP entries 900 are held in the SCP 1001 of FIGS. 10A and 10B that provides an SCP entry 900 each clock cycle to the FSPU 1102 of FIG. 11, as described in more detail below. Each SCP entry 900 is associated with a FBlk, and each FBlk has an associated fetch address. Each SCP entry 900 is populated using training information generated either based on execution of the FBlk (e.g., by the DEC 112 and/or the execution units 114) or based on a prediction of the FBlk by the FSPU 1102 that takes more clock cycles and tends to be more accurate in its predictions than the SCP 1001, depending upon the workload of the program being executed. In one embodiment, the prediction accuracy of the SCP 1001 for some workloads tends to be approximately seventy percent or better, whereas the prediction accuracy of the FSPU 1102 for the workloads tends to be approximately ninety five percent or better, although the accuracy percentages may vary with workload. Thus, the SCP entry 900 may be viewed as a primitive prediction that enables the FSPU 1102 to begin its process of making a full and more accurate prediction each clock cycle. Even though the FSPU 1102, unlike the SCP 1001, may (or may not) require multiple clock cycles to provide its prediction, the FSPU 1102 is able to make a prediction each clock cycle because the SCP 1001 breaks the fetch address loop (and is fully pipelined in embodiments in which it has multiple stages), as described above, and provides each clock cycle the information the FSPU 1102 needs to initiate its lookups. The SCP entry 900 includes a hashed next fetch address index (HNFAI) 902, a hashed next fetch address tag (HNFAT) 904, a branch direction SCP (BrDir-S) indicator 906, an indirect branch SCP (IndBr-S) indicator 908, and a useful indicator 912. The BrDir-S indicator 906 and the IndBr-S indicator 908, along with one or more bits of the HNFAI 902, are collectively referred to as branch history update information (BHUI) 919.

The HNFAI 902 is a value that is the result of a hash of a fetch address of a current FBlk, which is a prediction of the hash of the next fetch address to be produced by the previous FBlk, i.e., the FBlk that immediately precedes in program execution order the current FBlk with which the SCP entry 900 is associated. Thus, the HNFAI 902 functions as a proxy for the fetch address of the current FBlk. The previous FBlk is the FBlk whose hashed fetch address is used to select the entry 900. The current FBlk is the FBlk for which the FSPU 1102 will make a prediction using the entry 900. In one embodiment, the hash comprises a Boolean exclusive-OR (XOR) of different sets of bits of the fetch address. For example, in one embodiment the HNFAI 902 is 13 bits wide, and different sets of 13 bits of the fetch address are hashed with one another to generate the 13-bit HNFAI 902. In another embodiment, bits of the VMID are also hashed along with the fetch address to generate the HNFAI 902. In another embodiment, the privilege mode is also hashed along with the fetch address and the VMID to generate the HNFAI 902. The HNFAI 902 is used to index into the FBP 152 and therefore may also be referred to as a "FBP set index." This is one sense in which the HNFAI 902 functions as a proxy for the fetch address of a FBlk. The HNFAI 902 is subsequently hashed with one or more branch histories (e.g., global branch history (GHist), conditional path history (CPHist), indirect path history (IPHist)) to generate indexes (1131, 1133 of FIG. 11) used to index some of the branch predictors 154, e.g., CBP 1142, IBP 1144, as described below with respect to FIG. 11. This is another sense in which the HNFAI 902 functions as a proxy for the fetch address of a FBlk. Advantageously, by providing the HNFAI 902 each clock cycle, the SCP 1001 enables initiation of lookups in the FBP 152 and the branch predictors 154 each clock cycle, as described in more detail below. One or more bits of the HNFAI 902 are combined with the current CPHist to provide an updated CPHist that is subsequently hashed with the HNFAI 902 and HNFAT 904 used to access the CBP 1142 and IBP 1144, as described below. Additionally, the one or more bits of the HNFAI 902 are shifted into the current CPHist, as described below.

The HNFAT 904, similar to the HNFAI 902, is a value that is the result of a hash of the fetch address of the current FBlk. However, the sets of bits of the fetch address used in the hash to generate the HNFAT 904 are at least partially different than the sets of bits of the fetch address that are used in the hash to generate the HNFAI 902. For example, in one embodiment the HNFAT 904 is 9 bits wide, and different sets of 9 bits of the fetch address are hashed with one another to generate the 9-bit HNFAT 904. In another embodiment, bits of the VMID are also hashed along with the fetch address to generate the HNFAT 904. In another embodiment, the privilege mode is also hashed along with the fetch address and the VMID to generate the HNFAT 904. The HNFAT 904 is used in tag comparisons with the FBP 152 to select a FBP entry 200. The HNFAT 904 is subsequently hashed with the one or more branch histories to generate tags (1132, 1134 of FIG. 11) used in tag comparisons with tags of the CBP 1142 and IBP 1144, as described below with respect to FIG. 11.

The BrDir-S indicator 906 indicates a prediction of the branch direction, i.e., Taken or Not Taken, to be produced by execution of the previous FBlk. In one embodiment, if the previous FBlk is a sequential FBlk (e.g., included no branch instructions), the BrDir-S indicator 906 value indicates a Not Taken branch direction. The BrDir-S indicator 906 prediction is combined with the current GHist to provide an updated GHist that is subsequently hashed with the HNFAI 902 and HNFAT 904 used to access the CBP 1142 and IBP 1144, as described below. Additionally, the BrDir-S 906 is shifted into the current GHist, as described below.

The IndBr-S indicator 908 indicates whether the previous FBlk is terminated by an indirect branch instruction. The IndBr-S indicator 908 is used to selectively generate an updated IPHist. More specifically, if the IndBr-S indicator 908 indicates the previous FBlk is terminated by an indirect branch instruction, one or more bits of the HNFAI 902 are combined with the current IPHist to provide the updated IPHist that is subsequently hashed with the HNFAI 902 and HNFAT 904 used to access the CBP 1142 and IBP 1144, as described below.

The useful bit 912 is a replacement control bit that provides hysteresis to avoid needless training of the SCP entry 900, e.g., in a program execution pattern in which the FBlk is continually Taken, then changes to Not Taken for one execution instance, then returns back to being continually Taken. In one embodiment, if the SCP entry 900 made a misprediction, the SCP entry 900 is trained only if the useful bit 912 is false, whereas if the useful bit 912 is true, then the useful bit 912 is set to false such that the SCP entry 900 may be trained if it makes another misprediction.

In the set-associative embodiment of FIG. 10B, the SCP entry 900 also includes a tag field 914. The tag 914 may be a hash of the fetch address of the previous FBlk, i.e., the FBlk whose fetch address is hashed and used as the index 1093 into the SCP 1001 to select an entry 900 to be written or read, as described in more detail below. The tag 914 may be a hash of at least partially different bits of the fetch address of the previous FBlk than the bits of the fetch address of the previous FBlk hashed to generate the index 1093 into the SCP 1001.

Advantageously, each SCP entry 900 holds a relatively small number of bits (e.g., 25 in one embodiment) such that the SCP 1001 is small and fast enough to provide a SCP entry 900 each clock cycle, as described below. More specifically, the HNFAI 902, being a hash of the fetch address of the FBlk and not the full fetch address of the FBlk, is not sufficient for the IFU 106 to fetch the FBlk from the instruction cache 101 nor from the MOC 171. In other words, the nature of a hash function is such that the full fetch address cannot be regenerated from the hash of the fetch address. Rather, only the full fetch address of the FBlk, which is generated by the FSPU 1102 (i.e., current FBSA 412 that is included in the FBD 191 of the FBlk, which is the next FBSA 449 generated on the previous clock cycle), is sufficient to fetch the FBlk from the instruction cache 101 or from the MOC 171. However, advantageously, the HNFAI 902 is sufficient to initiate the accesses to the FBP 152 and BPs 154 and the MTR 173, and the information output by the SCP 1001 is small enough such that the SCP 1001 may generate a new output each clock cycle, as described below.

FIG. 10A is an example block diagram of an SCP 1001 in accordance with embodiments of the present disclosure. In one embodiment, the SCP 1001 comprises a random-access memory (RAM) whose locations hold SCP entries 900. The SCP 1001 receives an input 1003 and provides an output 1005 that is the entry 900 selected by the input 1003. Thus, the embodiment of FIG. 10A is arranged similar to a tag-less direct-mapped cache memory. As shown, and as described below in more detail with respect to FIG. 11, at least a portion of the output 1005 is fed back to the input 1003 (e.g., through a multiplexer 1171 of FIG. 11) to use for performing the next access during the next clock cycle. The SCP 1001 is designed to include only as many entries as possible to remain a single-cycle predictor, i.e., to support a total round-trip time that is less than a clock cycle. In one embodiment, the SCP 1001 comprises a RAM with 2048 entries 900. However, other embodiments are contemplated with a different number of SCP 1001 entries. In one embodiment, the HNFAI 902 of the output 1005 (shown as HNFAI [J-1] in FIG. 11) is thirteen bits, and the input 1003 comprises the lower eleven bits of the HNFAI 902. However, other embodiments are contemplated in which the portion of the HNFAI 902 used as the input 1003 is different.

As shown, the output 1005 includes the HNFAT, HNFAI, BrDir-S, IndBr-S, and useful bit of the SCP entry 900 of FIG. 9. The input 1003 includes at least a portion of the HNFAI, which is shown in FIG. 10A as a hashed current fetch address index (HCFAI) because the HNFAI, the hash of the next fetch address produced by the previous FBlk, on the next clock cycle becomes the fetch address of the current FBlk, which is the FBlk that immediately succeeds the previous FBlk.

FIG. 10B is an example block diagram of an SCP 1001 in accordance with alternate embodiments of the present disclosure. The SCP 1001 of FIG. 10B is similar in some respects to the SCP 1001 of FIG. 10A, but also includes tag compare logic 1097 and a mux 1099. Additionally, the input 1003 to the SCP 1001 of FIG. 10B comprises an index 1093 and a tag 1095. The SCP 1001 of FIG. 10B is arranged similar to a set-associative cache memory that includes multiple ways. The embodiment of FIG. 10B includes two ways such that the input 1003 selects a set of two entries 900. However, other embodiments are contemplated that include more than two ways. As described above, in the set-associative embodiment of FIG. 10B, each SCP entry 900 also includes a tag field 914. The tag 914 of each of the two selected entries 900 is provided to the tag compare logic 1097 which compares each of them with the input tag 1095. Based on the comparison, the tag compare logic 1097 controls the mux 1099 to select the entry 900 with a matching tag 914 for provision on the output 1005. In one embodiment, if neither tag 914 matches the input tag 1095, then one of the entries 900 of the selected set if provided on the output 1005, e.g., way 0 as a default.

The set-associative embodiment of FIG. 10B may reduce, relative to a direct-mapped embodiment such as FIG. 10A, the detrimental effect on prediction accuracy caused by aliasing of the hashed index of multiple FBlks to the same entry 900 of the SCP 1001. That is, a set-associative embodiment having N ways may result in less conflict misses since predictions associated with N different FBlks can concurrently reside in the same set of the set-associative SCP 1001 without one FBlk pushing the other FBlk out of the SCP 1001, and the used entry 900 is based on a tag match. The set-associative embodiment may result in less conflict misses but may require fewer entries 900 relative to a direct-mapped embodiment in order to accommodate the additional latency associated with tag comparisons and muxing and still remain a single-cycle predictor. That is, as in the embodiment of FIG. 10A, the SCP 1001 of FIG. 10B is designed to include only as many entries as possible to remain a single-cycle predictor, i.e., to support a total round-trip time that is less than a clock cycle. With respect to the overall prediction accuracy of the SCP 1001, the improvement attributed to the reduced aliasing effects of set-associative embodiments may or may not be offset by the fewer entries 900 of the set-associative embodiment relative to the direct-mapped embodiments.

Figure 11:
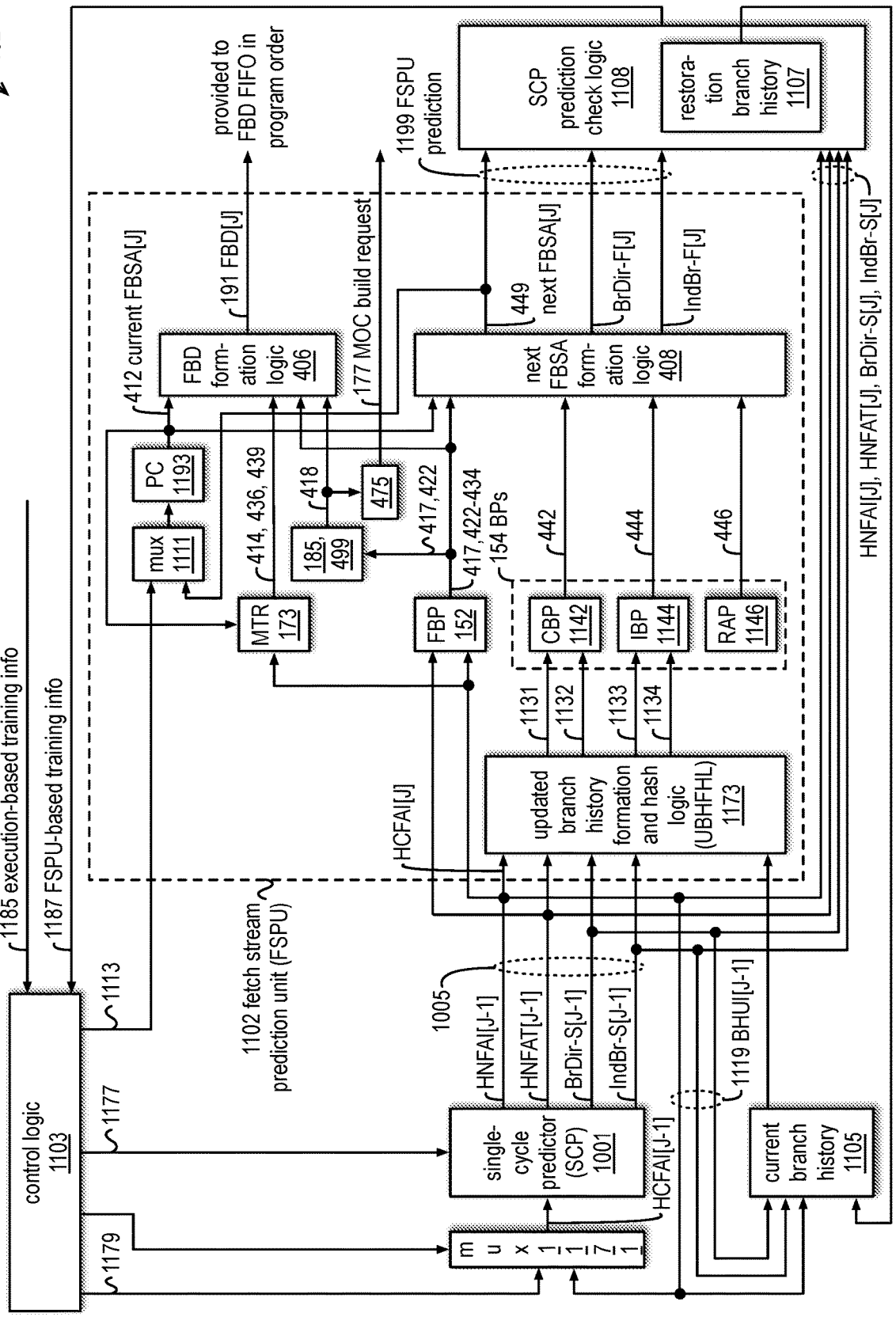
FIG. 11 is an example block diagram of the PRU of FIG. 1 in accordance with embodiments of the present disclosure.

FIG. 11 is an example block diagram of the PRU 102 of FIG. 1 in accordance with embodiments of the present disclosure. The PRU 102 includes the SCP 1001, the FSPU 1102, a mux 1171 that provides the input 1003 to the SCP 1001, control logic 1103, current branch history 1105, and SCP prediction check logic 1108. The SCP prediction check logic 1108 includes a restoration branch history 1107. In the embodiment of FIG. 11, the SCP 1001 is a direct-mapped type described with respect to FIG. 10A. The FSPU 1102 includes updated branch history formation and hash logic (UBHFHL) 1173, the MTR 173, the FBP 152, the FBHT 185, the comparator 499 and the MOC build requestor 475 of FIG. 4A, a return address predictor (RAP) 1146 that predicts the target address of return instructions (return target address 446), a conditional branch predictor (CBP) 1142 that predicts the direction (Taken or Not Taken) of conditional branch instructions (conditional branch direction 442), an indirect branch predictor (IBP) 1144 that predicts the target address of indirect branch instructions (indirect branch target address 444), the PC register 1193 of FIG. 1, a mux 1111 whose output is coupled to the input of a PC register 1193, and the next FBSA formation logic 408 and the FBD formation logic 406 of FIG. 4A.

As described above, the SCP 1001 holds SCP entries 900, e.g., of FIG. 9. In response to its input 1003 (i.e., the output of the mux 1171), the SCP 1001 selects one of its SCP entries 900 and provides the selected SCP entry 900 on its output 1005, shown in FIG. 11 as HNFAI[J-1], HNFAT [J-1], BrDir-S [J-1], and IndBr-S [J-1], which respectively refer to a first hash (used as an index) of the next fetch address produced by a FBlk denoted [J-1], a second hash (used as a tag) of the next fetch address produced by FBlk [J-1], the branch direction produced by FBlk [J-1], and the indicator of whether FBlk [J-1] is terminated by an indirect branch instruction. The BrDir-S [J-1], IndBr-S [J-1], and one or more bits of the HNFAI[J-1] are shown collectively as BHUI 1119. The mux 1171 receives as one input at least a portion of the HNFAI[J-1] fed back from the output 1005 of the SCP 1001. The mux 1171 receives as another input a training and restart index 1179 provided by the control logic 1103. In one embodiment, for example, the HNFAI[J-1] is a thirteen-bit value, and eleven bits of the HNFAI[J-1] are used as the input to the mux 1171.

During normal operation, the mux 1171 selects the HNFAI[J-1] output by the SCP 1001 on the current clock cycle, which becomes the HCFAI[J-1], shown as the output of mux 1171, on the next clock cycle. However, when the SCP 1001 is being trained (i.e., updated), the control logic 1103 may control the mux 1171 to select the training and restart index 1179 so that the control logic 1103 may write the selected SCP entry 900 with training information 1177. Additionally, after training of the SCP 1001 and/or correction of the PC 1193, the control logic 1103 may control the mux 1171 to select the training and restart index 1179 to re-start the SCP 1001 at a different SCP entry 900 than would have been selected by the fed-back HNFAI[J-1].

The training information 1177 is generated by the control logic 1103 using either execution-based training information 1185 or FSPU-based training information 1187. The execution-based training information 1185 may be received from the DEC 112, the execution units 114, and/or the PCL 132, whereas the FSPU-based training information 1187 may be received from the SCP prediction check logic 1108. The training information 1185/1187 may include the next fetch address produced by the previous FBlk, the branch direction produced by the previous FBlk, and an indication of whether the previous FBlk is terminated by an indirect branch instruction. The training information 1185/1187 may also include the fetch address of the previous FBlk, which the control logic 1103 hashes to generate the training index 1179 that selects the SCP entry 900 is to be written, i.e., the entry 900 that made the misprediction. The control logic 1103 hashes the next fetch address produced by the previous FBlk for writing into the HNFAI 902 and hashes the next fetch address produced by the previous FBlk, in at least a partially different manner, for writing into the HNFAT 904. The control logic 1103 writes the branch direction produced by the previous FBlk into the BrDir-S 906 and writes the indirect branch instruction indication to the IndBr-S 908.

The current branch history 1105 and the restoration branch history 1107 each hold three different branch histories related to prior executions of FBlks: a global branch history (GHist), a path history (CPHist), and an indirect branch path history (IPHist). In one embodiment, the different branch histories are held in respective shift registers. For example, in one embodiment the current GHist and the restoration GHist are held in respective 128-bit shift registers, the current CPHist and the restoration CPHist are held in respective 15-bit shift registers, and the current IPHist and the restoration IPHist are held in respective 24-bit shift registers.

In one embodiment, each time the SCP 1001 makes a prediction, the BrDir-S [J-1] is shifted into the current GHist, a bit of the HNFAI[J-1] (which reflects the fetch address of the current FBlk, e.g., bit 1) is shifted into the current CPHist, and three bits of the HNFAI[J-1] (which also reflects the fetch address of the current FBlk, e.g., bits 3:1) are shifted into the current IPHist if the IndBr-S [J-1] indicates the previous FBlk is terminated by an indirect branch instruction. Additionally, each time the FSPU 1102 makes a prediction, the BrDir-F [J] (described in more detail below) output by the next FBSA formation logic 408 is shifted into the restoration GHist, a bit of a hash of the next FBSA 449 (e.g., bit 1) is shifted into the restoration CPHist, and three bits of a hash of the next FBSA 449 (e.g., bits 3:1) are shifted into the restoration IPHist if the IndBr-F [J] (described in more detail below) output by the next FBSA formation logic 408 indicates the previous FBlk is terminated by an indirect branch instruction. When a misprediction by the SCP 1001 is detected, the current branch history 1105 may be updated from the restoration branch history 1107.

The UBHFHL 1173 receives the current branch history 1105: GHist, CPHist, and IPHist. The UBHFHL 1173 forms the updated branch history using the current branch history 1105 and the BHUI 1119. More specifically, the UBHFHL 1173 strips off the oldest bit of the received current GHist and appends in the BrDir-S [J-1]; the UBHFHL 1173 strips off the oldest bit of the received current CPHist and appends in a bit of the HNFAI[J-1] (e.g., bit 1); and the UBHFHL 1173 strips off the three oldest bits of the received current IPHist and appends in three bits of the HNFAI[J-1] (e.g., bits 3:1) if the IndBr-S [J-1] indicates the previous FBlk is terminated by an indirect branch instruction. The results are referred to collectively as the updated branch history (not shown) and are referred to individually as the updated GHist, updated CPHist, and updated IPHist. In one embodiment, in a given clock cycle, the updated branch history is formed by the UBHFHL 1173 with the state of the current branch history 1105 early in the clock cycle before being updated using the output 1005 provided by the SCP 1001 later in the clock cycle.

The UBHFHL 1173 hashes the HNFAI[J-1] with varying lengths of combined updated GHist and CPHist (e.g., 0, 5, 15, 43, 128 bits) to generate indexes 1131 that are provided to the CBP 1142. The UBHFHL 1173 hashes the HNFAT [J-1] with varying lengths of combined updated GHist and CPHist (e.g., 5, 15, 43, 128 bits) to generate tags 1132 that are provided to the CBP 1142. In one embodiment, the CBP 1142 comprises a bimodal table and four tagged tables that are respectively indexed by the indexes 1131, and tags of the four tagged tables are compared with the tags 1132. In one embodiment, the CBP 1142 may be a predictor that employs any of various well-known tagged table-based history length branch prediction methods. When accessed, the CBP 1142 provides a conditional branch direction 442 that is provided to the next FBSA formation logic 408. Advantageously, because the SCP 1001 provides a HNFAI[J-1] each clock cycle which the UBHFHL 1173 hashes into the index 1131, an access to the CBP 1142 may be initiated each clock cycle, which enables the CBP 1142 to provide a conditional branch direction 442 each clock cycle, which may be used by the FBD formation logic 406 to provide a FBD 191 each clock cycle.

The UBHFHL 1173 hashes the HNFAI[J-1] with varying lengths of combined updated GHist and IPHist (e.g., 5, 15, 43 bits) to generate indexes 1133 that are provided to the IBP 1144. The UBHFHL 1173 hashes the HNFAT [J-1] with varying lengths of combined updated GHist and IPHist (e.g., 5, 15, 43 bits) to generate tags 1134 that are provided to the IBP 1144. In one embodiment, the IBP 1144 comprises three tagged tables that are respectively indexed by the indexes 1133, and tags of the three tagged tables are compared with the tags 1134. In one embodiment, the IBP 1144 may also employ tagged table-based history length branch prediction methods. In one embodiment, the IBP 1144 only handles demonstrated polymorphic branches, whereas monomorphic branches are handled by the FBP 152 that effectively serves as a bimodal table. When accessed, the IBP 1144 provides an indirect branch target address 444 that is provided to the next FBSA formation logic 408. Advantageously, because the SCP 1001 provides a HNFAI[J-1] each clock cycle which the UBHFHL 1173 hashes into the index 1133, an access to the IBP 1144 may be initiated each clock cycle, which enables the IBP 1144 to provide an indirect branch target address 444 each clock cycle, which may be used by the FBD formation logic 406 to provide a FBD 191 each clock cycle.

The FBP 152 is indexed by the HNFAI[J-1], and tags of the set selected by the HNFAI[J-1] are compared with the HNFAT [J-1] to determine whether the lookup results in a hit in the FBP 152 and, if so, the hit FBP entry 200 is provided as outputs 422-434 of FIG. 4A. The outputs 422-434 of the FBP 152 are also provided to the FBD formation logic 406 and to the next FBSA formation logic 408. Advantageously, because the SCP 1001 provides a HNFAI[J-1] each clock cycle, an access to the FBP 152 may be initiated each clock cycle, which enables the FBP 152 to provide a FBP entry 200 each clock cycle, which may be used by the FBD formation logic 406 to provide a FBD 191 each clock cycle.

The MTR 173 is indexed by bits of the HNFAI[J-1], which is the HCFAI[J]. In an embodiment, the MTR tags 332 of the set of MTR entries 330 selected by the HCFAI[J] are compared with the tag bits of the current FBSA[J] to determine whether the lookup results in a hit in the MTR 173 and, if so, the MOC hit indicator 414 is true and the hit MOC entry 330 is provided as outputs initial MDR pointers 436 and numMDREs 439 of FIG. 4A. The MOC hit 414, initial MDR pointers 436 and numMDREs 439 are also provided to the FBD formation logic 406. Advantageously, because the SCP 1001 provides a HNFAI[J-1] each clock cycle, an access to the MTR 173 may be initiated each clock cycle, which enables the MTR 173 to provide an instance of the MOC hit 414, initial MDR pointers 436 and numMDREs 439 each clock cycle, which may be used by the FBD formation logic 406 to provide a FBD 191 each clock cycle.

The RAP 1146 provides a return target address 446 that is provided to the next FBSA formation logic 408. If the termination type 434 predicted by the FBP 152 indicates the current FBlk is terminated by a return instruction, the RAP 1146 provides the top entry of its stack as the return target address 446 to the next FBSA formation logic 408. Conversely, if the termination type 434 predicted by the FBP 152 indicates the current FBlk is terminated by a call instruction, the current FBSA 412 is used to compute the return address, which is the address of next instruction after the call instruction, and the computed return address is pushed onto the stack of the RAP 1146. An access to the RAP 1146 may be initiated each clock cycle, which enables the RAP 1146 to provide a return target address 446 each clock cycle, which may be used by the FBD formation logic 406 to provide a FBD 191 each clock cycle.

The PC register 1193 holds the current FBSA 412 that is provided as an input to the FBD formation logic 406 and the next FBSA formation logic 408. In one embodiment, the instruction set architecture (ISA) of the processor 100 supports instructions that are either two bytes long or four bytes long, and the ISA requires instructions to be aligned on two-byte address boundaries. Thus, the size of the PC 1193, as well as the size of fetch addresses (e.g., the current FBSA 412 and next FBSA 449), are N-1 bits, where N is the size of a virtual address. In the case of an event that requires the PC 1193 to be corrected, e.g., the DEC 112 or execution units 114 detect a misprediction by the FSPU 1102 (which may result in a micro-architectural abort process) or the SCP prediction check logic 1108 detects a misprediction by the SCP 1001, the control logic 1103 provides a correction PC 1113 to the mux 1111, which selects the correction PC 1113 for writing into the PC 1193. In this case, the execution-based training information 1185 or the FSPU-based training information 1187 may be provided to the control logic 1103 to train the SCP 1001. Additionally, in the case that the DEC 112 or execution units 114 detect a misprediction by the FSPU 1102, the FBP 152, RAP 1146, CBP 1142, and/or IBP 1144 may also be trained using the execution-based training information 1185. The FSPU 1102 may be stalled until the SCP 1001 is trained and the PRU 102 is restarted.

However, during normal operation the mux 1111 selects the next FBSA 449 that is provided by the next FBSA formation logic 408 for writing into the PC register 1193. In this manner, a single-cycle fetch address loop advantageously exists around the next FBSA formation logic 408 within the FSPU 1102, rather than a multi-cycle fetch address loop around the PRU 102 as in the embodiment of FIG. 4A as described above. The single-cycle hashed fetch address loop around the SCP 1001 and the single-cycle full fetch address loop around the next FBSA formation logic 408 operate in a pipelined fashion to facilitate the production of an FBD 191 each clock cycle, which facilitates the fetching by the pipelined IFU 106 each clock cycle of a FBlk of architectural instructions or a group of MDREs of MOPs (e.g., a pair of MOP triplets), as described above, to increase the likelihood that the back-end 130 is not starved.

As described above, the FBD formation logic 406 receives the current FBSA 412, the FBP hit indicator 422, the predicted set index 424, the predicted way number 426, and the fetch block length 428 and gathers them to form a FBD 191 to push into an entry 300 of the FBD FIFO 104. During normal operation, e.g., as long as the FBD FIFO 104 is not full and no misprediction is detected that requires update of the PC 1193 (which may also involve training of the SCP 1001 and/or FSPU 1102), the FBD formation logic 406 provides a FBD 191 to the FBD FIFO 104 each clock cycle.

As described above, the next FBSA formation logic 408 receives the FBP hit indicator 422, the fetch block length 428, the PC-relative target address 432, the termination type 434, the conditional branch direction 442, the indirect target address 444, the return target address 446, and the current FBSA 412 and uses them to generate the next FBSA 449. During normal operation, e.g., as long as the FBD FIFO 104 is not full and no misprediction is detected that requires update of the PC 1193 (which may also involve training of the SCP 1001 and/or FSPU 1102), the next FBSA formation logic 408 provides a next FBSA 449 each clock cycle. If FBP hit 422 is false, the next FBSA formation logic 408 predicts a maximum length sequential termination type instruction fetch block. That is, the next FBSA formation logic 408 generates a value of the next FBSA 449 that is the sum of the FBSA 412 and the maximum fetch block length (e.g., 64 bytes). If FBP hit 422 is true, the next FBSA formation logic 408 generates the next FBSA 449 based on the termination type 434 and the remaining inputs. For example, if the termination type 434 indicates a PC-relative branch, then if the conditional branch direction 442 indicates "Taken," the next FBSA formation logic 408 outputs the PC-relative target address 432 as the next FBSA 449 and otherwise outputs the sum of the FBSA 412 and the fetch block length 428. If the termination type 434 indicates an indirect branch, the next FBSA formation logic 408 outputs the indirect branch target address 444 as the next FBSA 449. If the termination type 434 indicates a return instruction, the next FBSA formation logic 408 outputs the return target address 446 as the next FBSA 449. If the termination type 434 indicates a stop type instruction, the next FBSA formation logic 408 outputs the sum of the FBSA 412 and the fetch block length 428 as the next FBSA 449.

Additionally, the next FBSA formation logic 408 generates the BrDir-F indicator and the IndBr-F indicator each clock cycle. In one embodiment, the next FBSA formation logic 408 generates a value on the BrDir-F indicator that indicates Taken if the termination type 434 indicates a stop instruction, an unconditional branch instruction (e.g., call, return, indirect branch, unconditional jump), or a conditional branch instruction and the conditional branch direction 442 indicates Taken. Otherwise, the next FBSA formation logic 408 generates a value on the BrDir-F indicator that indicates Not Taken. In one embodiment, the next FBSA formation logic 408 generates a true value on the IndBr-F indicator if the termination type 434 indicates an indirect branch instruction, and otherwise generates a false value on the IndBr-F indicator. The next FBSA 449, the BrDir-F indicator, and the IndBr-F indicator are provided to the SCP prediction check logic 1108 each clock cycle and are used to update the restoration branch history 1107, as described above. Collectively, the next FBSA 449, the BrDir-F indicator, and the IndBr-F indicator are referred to as the FSPU prediction 1199, as shown in FIG. 11. In one embodiment, the next FBSA 449, the BrDir-F [J], the IndBr-F [J], and the termination type 434 are also provided to the mid-end 120 and the back-end 130 to enable them to detect a misprediction by the FSPU 1102.

The SCP prediction check logic 1108 also receives a HNFAI[J], a HNFAT [J], a BrDir-S [J], and a IndBr-S [J] from the SCP 1001 each clock cycle. Each clock cycle, the SCP prediction check logic 1108 compares the BrDir-F [J] and the IndBr-F [J] generated by the next FBSA formation logic 408 for a FBlk [J] against the BrDir-S [J] and the IndBr-S [J], respectively, that were output by the SCP 1001 earlier in the PRU 102 pipeline, e.g., 3 clock cycles earlier, as predictions of what will be produced by FBlk [J], as described in more detail below with respect to FIGS. 12 and 13. If the comparison indicates a mismatch, the SCP prediction check logic 1108 provides FSPU-based training information 1187 to the control logic 1103 for training of the SCP 1001 as described above. Additionally, the SCP prediction check logic 1108 hashes the next FBSA 449 produced by FBlk [J] to generate a hashed index and a hashed tag which it compares against the HNFAI[J] and the HNFAT [J], respectively, that were output by the SCP 1001 as a prediction of a hash of the next fetch address produced by FBlk [J] earlier in the PRU 102 pipeline. If the comparison indicates a mismatch, the SCP prediction check logic 1108 provides FSPU-based training information 1187 to the control logic 1103 for training of the SCP 1001 as described above. In one embodiment, the HNFAT [J] need not be checked because a check of the HNFAI[J] suffices as a check of the HNFAT [J].

As described, the SCP 1001 is designed to provide a new prediction 1005 (e.g., HNFAI[J-1], HNFAT [J-1], BrDir-S [J-1], and IndBr-S [J-1]) associated with a new FBlk each clock cycle. The total round-trip time associated with the loop around the SCP 1001 is less than a clock cycle, e.g., setup time for the SCP 1001 input, the latency of the SCP 1001 from input to output of the entry 900 specified by the input (including tag comparison and muxing time in a set-associative embodiment), and the latency associated with the travel time around and through the mux 1171 back to the input of the SCP 1001.

FIG. 12 is an example block diagram illustrating stages of the pipeline of the PRU 102 of FIG. 11 in accordance with embodiments of the present disclosure. In the embodiment of FIG. 12, there are five stages of the PRU 102 pipeline, denoted PR1 1201, PR2 1202, PR3 1203, PR4 1204, and PR5 1205. However, other embodiments are contemplated in which the number of stages is different than five. Regardless of the number of stages, the SCP 1001 is a single-cycle predictor, although the FSPU 1102 may be a single-cycle or a multi-cycle predictor. That is, one or more clock cycles may be required from the time that the FSPU 1102 receives the SCP 1001 output 1005 until the next FBSA 449, BrDir-F [J], and IndBr-F [J] are generated and the next FBSA 449 is written to the PC 1193 and available as the current FBSA 412 to the next FBSA formation logic 408 and a FBD 191 is produced for writing into the FBD FIFO 104. Thus, the PRU 102 includes at least two stages, one for operation of the SCP 1001 and one or more for operation of the FSPU 1102.

In the PR1 1201 stage, an access is made to the SCP 1001 to obtain the HNFAI, HNFAT, BrDir-S, and IndBr-S produced by a previous FBlk, e.g., FBlk [J-1] as shown in FIG. 11. The SCP 1001 is accessed using at least a portion of the output 1005 generated by the SCP 1001 in the immediately previous clock cycle (e.g., eleven bits of the HNFAI[J-1]) that is fed back to the input 1003 of the SCP 1001. As described above, HNFAI and HNFAT are hashes of the next fetch address produced by the previous FBlk that are written into the SCP entry 900 during its training, and the BrDir-S and IndBr-S indicate values produced by the previous FBlk that are written into the SCP entry 900 during its training. The training of the SCP 1001 is also described below with respect to FIG. 14. During training, the next fetch address, the branch direction, and indirect branch indicator produced by the previous FBlk may be provided by the FSPU 1102, e.g., next FBSA 449, BrDir-F, and IndBr-F. Or, the next fetch address, branch direction, and indirect branch indicator produced by the previous FBlk may be provided by the DEC 112, execution units 114, or PCL 132. The fetch address of the previous FBlk may also be provided and hashed in order to generate the input 1003 to the SCP 1001 for selecting the SCP entry 900 to be written, e.g., indicated on training index 1179.

In the PR2 1202 stage, the BrDir-S, IndBr-S, bits of the HNFAI, and the current branch history 1105 are used by the UBHFHL 1173 to produce an updated branch history, as described above with respect to FIG. 11. The UBHFHL 1173 then hashes the updated branch history with the HNFAI and the HNFAT to generate indexes 1131 and 1133 and tags 1132 and 1134 used to access the CBP 1142 and the IBP 1144, as described above with respect to FIG. 11. PR2 1202 is also used as setup time for accesses to the FSPU 1102 structures, e.g., RAMs of the MTR 173, the FBP 152, CBP 1142, and IBP 1144. In one embodiment, the RAP 1146 is a flip-flop-based structure, and PR2 1202 is also used as setup time for the flip-flops. Additionally, the current branch history 1105 is updated using the BrDir-S, IndBr-S, and bits of the HNFAI, as described above, e.g., the BrDir-S is shifted into the current GHist, a bit of the HNFAI is shifted into the current CPHist, and three bits of the HNFAI are shifted into the current IPHist if the IndBr-S indicates the previous FBlk was terminated by an indirect branch instruction.

In the PR3 1203 stage, the access to the MTR 173 and to the FBP 152 is initiated using the HNFAI, the access to the CBP 1142 is initiated using the index 1131, the access to the IBP 1144 is initiated using the index 1133, and the access to the top entry of the RAP 1146 stack is initiated. The accesses are initiated in order to obtain, in PR4 1204, the MOC hit indicator 414, the initial MDR pointers 436, the numMDREs 439, the FBP hit indicator 422, the predicted set index 424, the predicted way number 426, the fetch block length 428, the PC-relative target address 432, the termination type 434, the conditional branch direction 442, the indirect target address 444, and the return target address 446. In one embodiment, FBP tag comparisons may be started using the HNFAT obtained in PR1 1201 to select a FBP entry 200 to obtain the FBP hit indicator 422, the predicted set index 424, the predicted way number 426, the fetch block length 428, the PC-relative target address 432, and the termination type 434 for provision to the FBD formation logic 406 and the next FBSA formation logic 408. Additionally, the tags 1132 and 1134 generated in PR2 1202 may be used to start tag comparisons and table selections in the CBP 1142 and IBP 1144, respectively, to obtain the respective conditional branch direction 442 and the indirect target address 444 for provision to the next FBSA formation logic 408.

In the PR4 1204 stage, the tag comparisons and table selections started in PR3 1203 are completed to obtain the FBP 152, CBP 1142 and IBP 1144 outputs, and the return target address 446 is obtained from the RAP 1146 all for provision to the next FBSA formation logic 408. Furthermore, the tag comparison of the tag portion of the current FBSA 412 with the MTR tags 332 is made to obtain the MOC hit indicator 414, the initial MDR pointers 436 and the numMDREs 439 for provision to the FBD formation logic 406. Also, the current FBSA 412—i.e., the full fetch address of the current FBlk, which is the next FBSA 449 generated by PR4 1204 in the previous clock cycle and fed back to PR4 in this clock cycle—is read from the PC 1193 by the FBD formation logic 406 and next FBSA formation logic 408. The next FBSA formation logic 408 uses its received inputs to predict the next FBSA 449, BrDir-F, and IndBr-F produced by the current FBlk, i.e., the FBlk whose fetch address was hashed for use as an index (HCFAI) to initiate accesses to the FSPU 1102 in PR3 1203 and whose fetch address was hashed for use as a tag (HCFAT) to perform tag compares completed in PR4 1204. Additionally, the FBD formation logic 406 uses its received inputs to form a FBD 191 that describes the current FBlk, including the FSI 314, and pushes the formed FBD 191 into the FBD FIFO 104.

Still further, the restoration branch history 1107 is updated using the next FBSA 449, BrDir-F, and IndBr-F as described above. Finally, the RAP 1146 is updated as needed, i.e., if the instruction terminating the current FBlk is a return instruction then the top entry of the RAP 1146 is popped, and if the instruction terminating the current FBlk is a call instruction then a return address is computed and pushed onto the top entry of the RAP 1146.

In the PR5 1205 stage, the SCP prediction check logic 1108 checks for a misprediction by the SCP 1001. More specifically, the SCP prediction check logic 1108 compares the "correct" BrDir-F and IndBr-F that in the previous clock cycle in PR4 1204 the FSPU 1102 predicted will be produced by the current FBlk against the BrDir-S and IndBr-S, respectively, that 3 clock cycles earlier in PR1 1201 the SCP 1001 predicted will be produced by the current FBlk and that were fed forward to PR5 1205 to be checked this clock cycle. Additionally, the SCP prediction check logic 1108 hashes (in one embodiment the VMID and privilege mode are also hashed, as described above) the next FBSA 449 that in the previous clock cycle in PR4 1204 the FSPU 1102 predicted will be produced by the current FBlk to generate a "correct" HNFAI and HNFAT. The SCP prediction check logic 1108 then compares the "correct" HNFAI and HNFAT against the HNFAI and HNFAT, respectively, that 3 clock cycles earlier in PR1 1201 the SCP 1001 predicted will be produced by the current FBlk and that were fed forward to PR5 1205 to be checked this clock cycle. If the SCP prediction check logic 1108 determines that the SCP 1001 mis-predicted: the PRU 102 pipeline is flushed, the SCP 1001 is trained, the current branch history 1105 is restored from the restoration branch history 1107, and the PRU 102 is restarted using the "correct" next FBlk information, as described in more detail below with respect to FIG. 14. In one embodiment, the PR5 1205 stage overlaps with the first stage of the IFU 106 of FIG. 5 such that the first stage of the IFU 106 may start its process of fetching the current FBlk based on the FBD 191 that describes the current FBlk and that was generated the previous clock cycle.

Figure 13:
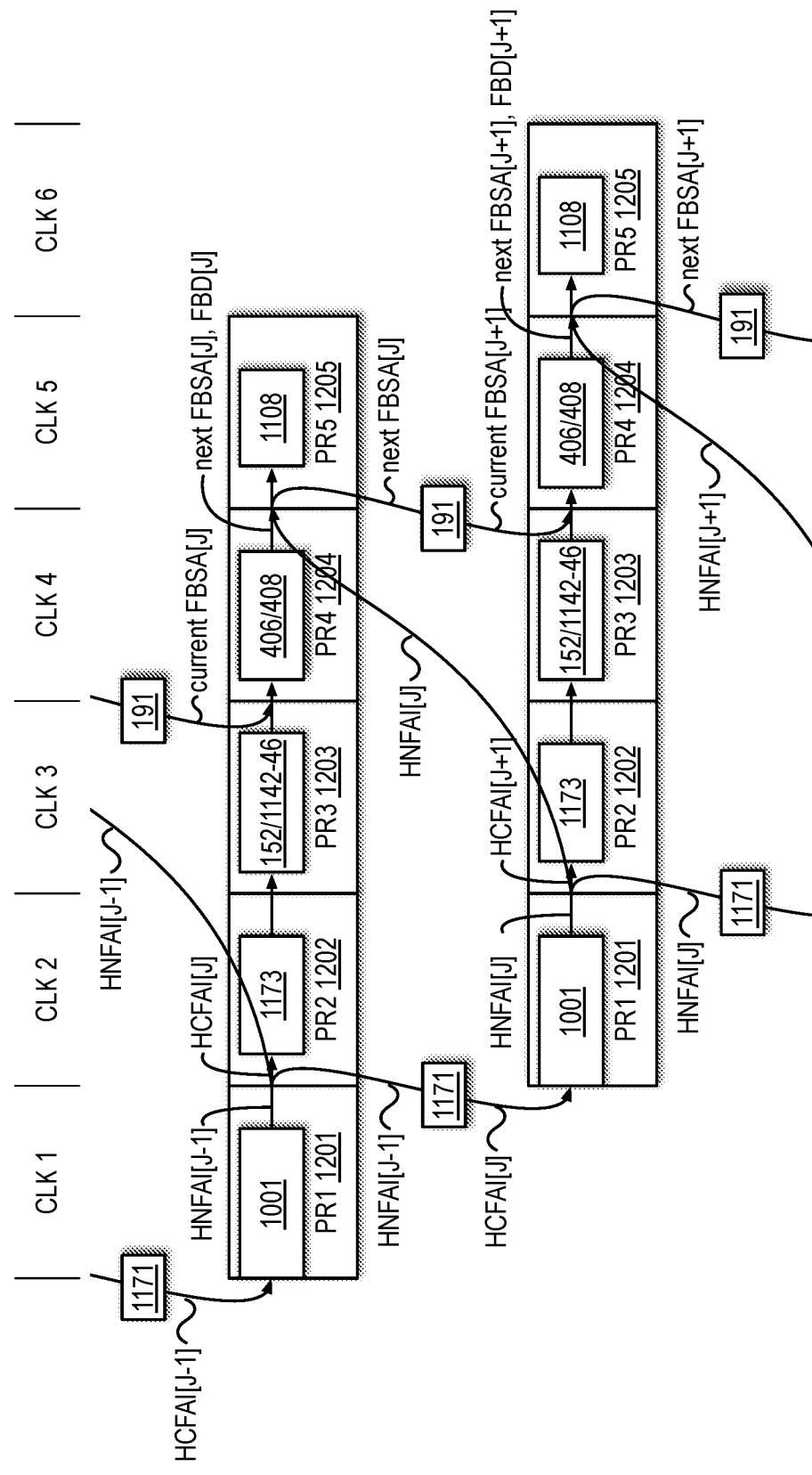
FIG. 13 is example pipeline timing diagram illustrating operation of the PRU of FIG. 11 and its pipeline of FIG. 12 in accordance with embodiments of the present disclosure.

As may be understood from FIGS. 12 and 13, although not shown, the PRU 102 may include pipeline stage registers or other sequential logic circuits that form the PRU 102 pipeline stages. For example, in one embodiment, the mux 1171 may be a muxed-register. Alternatively, the SCP 1001 RAM may include sequential logic circuits that receive the HCFAI during the setup time and latch in the value at the rising edge of the clock cycle. For another example, staging registers may be included at the input to the UBHFHL 1173, the FBD formation logic 406, the next FBSA formation logic 408, and the SCP prediction check logic 1108. For another example, a series of staging registers may feed forward the HNFAI, HNFAT, BrDir-S, and IndBr-S to the SCP prediction check logic 1108. Finally, the PC 1193 may operate as a staging register.

As may be observed from the description of FIG. 11, as well as from the description of the remaining Figures, for a first series of clock cycles the SCP 1001 provides to the FSPU 1102 a first series of predictions (e.g., HNFAI, HNFAT, BrDir-S, and IndBr-S) associated with a series of FBlks. The first series of predictions includes the information needed by the FSPU 1102 to initiate its lookups during a second series of clock cycles that follows the first series of clock cycles (e.g., by two clock cycles between the PR1 and PR3 stages in the example of FIG. 12) and to provide a second series of predictions and a series of FBDs 191 during a third series of clock cycles that follows the first series of clock cycles by a latency of the FSPU 1102, e.g., 3 clock cycles in the embodiment of FIG. 12, to facilitate a fetch of a FBlk each clock cycle from the instruction cache 101 to reduce the likelihood that the back-end 130 is starved.

In one embodiment, depending upon the contents of the FBlk, the branch history update information may be determined by the DEC 112 at instruction decode time, rather than by the EUs 114 at instruction execution time. For example, in the case of an FBlk having no branch instructions, the DEC 112 may be able to determine, without the need to execute the instructions in the FBlk, the length of the FBlk, that the termination type is sequential, that the branch direction is not taken, and that there is no indirect branch instruction present in the FBlk. Thus, in the context of SCP embodiments, the terms execution or executing should be understood to include decode or decoding and/or execution or executing.

FIG. 13 is an example pipeline timing diagram illustrating operation of the PRU 102 of FIG. 11 and its pipeline of FIG. 12 in accordance with embodiments of the present disclosure. Operation of the PRU 102 pipeline is illustrated in FIG. 13 by describing the processing of a series of predictions associated with a series of successive FBlks in program execution order during a series of six successive clock cycles to provide a series of successive FBDs 191. The series of successive FBlks are referred to as FBlk [J−1], FBlk [J], and FBlk [J+1]. The series of six successive clock cycles are denoted CLK1 through CLK6. The series of successive FBDs 191 are referred to as FBD [J] and FBD [J+1]. More specifically, during a first series of successive clock cycles CLK1 and CLK2 that continues on until a terminating event (e.g., a misprediction is detected, or an abort occurs), the SCP 1001 provides a series of outputs associated with the series of FBlks. Each of the outputs includes a HNFAI, as well as a HNFAT, a BrDir-S, and a IndBr-S which are not shown in FIG. 13. The FSPU 1102 uses the series of SCP 1001 outputs to provide the series of FBDs on a second series of successive clock cycles CLK4 and CLK5 that continues on until a terminating event.

The series of FBDs are used by the IFU 106 to fetch successive FBlks from the instruction cache 101 or from the MDR 175. In one embodiment, as described above with respect to FIG. 12, the first stage of the IFU 106 overlaps with the PR5 1205 stage of the PRU 102 pipeline, i.e., the prediction check stage. Therefore, advantageously the first stage of the IFU 106 may start its process of fetching previous FBlk [J] described by FBD [J] during CLK5 and may start its process of fetching current FBlk [J+1] described by FBD [J+1] during CLK6.

The operation of each pipeline stage is described with respect to FIG. 12. Therefore, the description of FIG. 13 is focused on the interactions between pipeline stages with respect to the predicting of different FBlks in the series of FBlks rather than describing the operation of each pipeline stage in detail.

In FIG. 13, various signals/outputs/values of FIG. 11 are referred to with a suffix in square brackets. For example, HCFAI[J−1] refers to the hashed current fetch address index of FBlk [J−1], which is also the prediction made by the SCP 1001 of the HNFAI produced by FBlk [J−2]; HNFAI[J−1] refers to the prediction made by the SCP 1001 of the hashed next fetch address index produced by FBlk [J−1], which is also the HCFAI of FBlk [J], denoted HCFAI[J]; HNFAI[J] refers to the prediction made by the SCP 1001 of the hashed next fetch address index produced by FBlk [J], which is also the HCFAI of FBlk [J+1], denoted HCFAI[J+1]; HNFAI[J+1] refers to the prediction made by the SCP 1001 of the hashed next fetch address index produced by FBlk [J+1], which is also the HCFAI of FBlk [J+2], denoted HCFAI[J+2] (not shown); current FBSA[J] refers to the current FBSA 412 of FBlk [J] provided by PC 1193; next FBSA[J] refers to the prediction made by the FSPU 1102 of the next FBSA 449 produced by FBlk [J], which is also the current FBSA 412 of FBlk [J+1], denoted current FBSA[J+1], after being piped through PC 1193, as shown.

As illustrated by the example, the second series of successive clock cycles CLK4 through CLK5 in which the series of FBD [J] and FBD [J+1] are provided follows the first series of successive clock cycles CLK1 through CLK2 in which the series of SCP 1001 outputs 1005 are provided by a three-clock pipeline latency of the FSPU 1102. Although the PRU 102 pipeline embodiment of FIG. 12 includes a three-clock pipeline latency of the FSPU 1102, other embodiments are contemplated in which the pipeline latency of the FSPU 1102 is different than three clocks, although the pipeline latency is at least one clock. For example, as described above, the access to the SCP 1001 in PR1 1201 in CLK1 provides the information for (1) setting up and starting the lookups in the FBP 152, CBP 1142, and IBP 1144 for FBlk [J] and for (2) setting up the next SCP 1001 access in PR1 1201 in CLK2 for FBlk [J]. The latter is a single-cycle loop timing path from the SCP 1001 output 1005 back around to the SCP 1001 input 1003 after passing through the input mux 1171. Whereas the former, in the embodiment of FIGS. 12 and 13, requires an extra clock cycle of timing from SCP 1001 output 1005 to the inputs of the RAMs of the FBP 152, CBP 1142, and IBP 1144, which is provided by PR2 1202. However, other embodiments are contemplated in which the timing is such that the PR2 1202 stage may be omitted, e.g., the SCP 1001 output 1005 occurs soon enough in the PR1 1201 cycle and/or the setup time of the RAMs is small enough and/or the propagation delay through the UBHFHL 1173 is small enough and/or the lookup time in the RAMs is fast enough such that the lookups in the FBP 152, CBP 1142, and IBP 1144 could be started in the immediately next clock cycle in the immediately next stage after PR1 1201, i.e., the PR2 1202 stage is not needed, such that the pipeline latency is only two clocks. Finally, other embodiments are contemplated in which the pipeline latency is only one clock.

During CLK1, PR1 1201 uses HCFAI[J-1] to access the SCP 1001 to obtain HNFAI[J-1] produced by FBlk [J-1] (as well as HNFAT [J-1], BrDir [J-1], and IndBr [J-1], not shown). HCFAI[J-1] is the HNFAI[J-2] (not shown) produced by FBlk [J-2] that was output by the SCP 1001 on the clock cycle previous to CLK1 and fed back through mux 1171 to the input of the SCP 1001 for use by PR1 1201 in CLK1. HNFAI[J-1] is fed back through mux 1171 as HCFAI [J] to the input of the SCP 1001 for use by PR1 1201 during CLK 2. HNFAI[J-1] is also fed forward through pipeline staging registers (not shown) for use by PR5 1205 during CLK 4 (not shown). HNFAI[J-1] is also fed forward for use by PR2 1202 during CLK 2, in which HNFAI[J-1] is denoted HCFAI[J] having passed through a pipeline staging register (not shown).

During CLK2, PR1 1201 uses HCFAI[J] to access the SCP 1001 to obtain HNFAI[J] produced by FBlk [J] (as well as HNFAT [J], BrDir [J], and IndBr [J], not shown). HNFAI [J] is fed back through mux 1171 as HCFAI[J+1] (not shown) to the input of the SCP 1001 for use by PR1 1201 during CLK 3. HNFAI[J-1] is also fed forward through pipeline staging registers (not shown) for use by PR5 1205 during CLK 5. HNFAI[J-1] is also fed forward for use by PR2 1202 during CLK 3, in which HNFAI[J] is denoted HCFAI[J+1] having passed through a pipeline staging register (not shown). Additionally, in CLK2, PR2 1202 uses HCFAI[J] (as well as HCFAT [J], BrDir-S [J-1], IndBr-F [J-1], and current branch history 1105, not shown) to generate the updated branch history with which to hash the HCFAI[J] and HCFAT [J] to generate indexes 1131 and 1133 and tags 1132 and 1134 of FIG. 11 that are piped forward for use by PR3 1203 in CLK3.

In CLK3, PR2 1202 uses HCFAI[J+1] (as well as HCFAT [J+1], BrDir-S [J], IndBr-F [J], and current branch history 1105, not shown) to generate the updated branch history with which to hash the HCFAI[J+1] and HCFAT [J+1] to generate indexes 1131 and 1133 and tags 1132 and 1134 of FIG. 11 that are piped forward for use by PR3 1203 in CLK4. Additionally, in CLK3, PR3 1203 uses indexes 1131 and 1133 generated in CLK 2 by PR2 1202 to initiate lookups in the FBP 152, CBP 1142 and IBP 1144, and uses the tags 1132 and 1134 generated in CLK 2 by PR2 1202 to start tag comparisons.

In CLK4, PR3 1203 uses indexes 1131 and 1133 generated in CLK 2 by PR2 1202 to initiate lookups in the FBP 152, CBP 1142 and IBP 1144, and uses the tags 1132 and 1134 generated in CLK 2 by PR2 1202 to start tag comparisons. Additionally, in CLK4, PR4 1204 uses the current FBSA[J] received from PC 1193 (which the PC 1193 received as next FBSA[J-1] predicted by the FSPU 1102 in CLK3, not shown) along with the outputs of the FBP 152, CBP 1142, IBP 1144, and RAP 1146 to form the next FBSA[J] (and the BrDir-F [J] and the IndBr-F [J], not shown) and to form the FBD [J]. The next FBSA[J] predicted in CLK4 by PR4 1204 is forwarded through PC 1193 and received as current FBSA[J+1] by PR4 1204 for use in CLK5.

In CLK5, PR4 1204 uses the current FBSA[J+1] received from PC 1193 along with the outputs of the FBP 152, CBP 1142, IBP 1144, and RAP 1146 to form the next FBSA[J+1] (and the BrDir-F [J+1] and the IndBr-F [J+1], not shown) and to form the FBD [J+1]. The next FBSA[J+1] predicted in CLK5 by PR4 1204 is forwarded through PC 1193 and received as current FBSA[J+2] (not shown) by PR4 1204 for use in CLK6 (not shown). Additionally, in CLK5, PR5 1205 uses the next FBSA[J] predicted by the FSPU 1102 in CLK4 to check the HNFAI[J] predicted by the SCP 1001 in PR1 1201 during CLK2 and fed forward (via pipeline staging registers, not shown) to PR5 1205 for use during CLK5. Additionally, although not shown, in CLK5, PR5 1205 uses the BrDir-F [J] and IndBr-F [J] predicted by the FSPU 1102 in CLK4 to check the BrDir-S [J] and IndBr-S [J] predicted by the SCP 1001 in PR1 1201 during CLK2 and fed forward to PR5 1205 for use during CLK5.

In CLK6, PR5 1205 uses the next FBSA[J+1] predicted by the FSPU 1102 in CLK5 to check the HNFAI[J+1] predicted by the SCP 1001 in PR1 1201 during CLK3 and fed forward (via pipeline staging registers, not shown) to PR5 1205 for use during CLK6. Additionally, although not shown, in CLK6, PR5 1205 uses the BrDir-F [J+1] and IndBr-F [J+1] predicted by the FSPU 1102 in CLK5 to check the BrDir-S [J+1] and IndBr-S [J+1] predicted by the SCP 1001 in PR1 1201 during CLK3 and fed forward to PR5 1205 for use during CLK6.

As shown in FIG. 11, the next FBSA[J] 449 output by the next FBSA formation logic 408 is fed back to its input through the PC 1193 register as current FBSA[J] 412. This is illustrated in FIG. 13. For example, next FBSA[J] predicted by PR4 1204 in CLK4 is fed back as an input current FBSA[J+1] to PR4 1204 in CLK5, for example, to be used to form next FBSA[J+1]. Thus, rather than a multi-cycle fetch address loop as exists in the embodiment of FIG. 4A, there effectively exists a single-cycle fetch address loop within the FSPU 1102, which is made possible by the presence of the SCP 1001 single-cycle hashed index loop, as described above.

Figure 14:
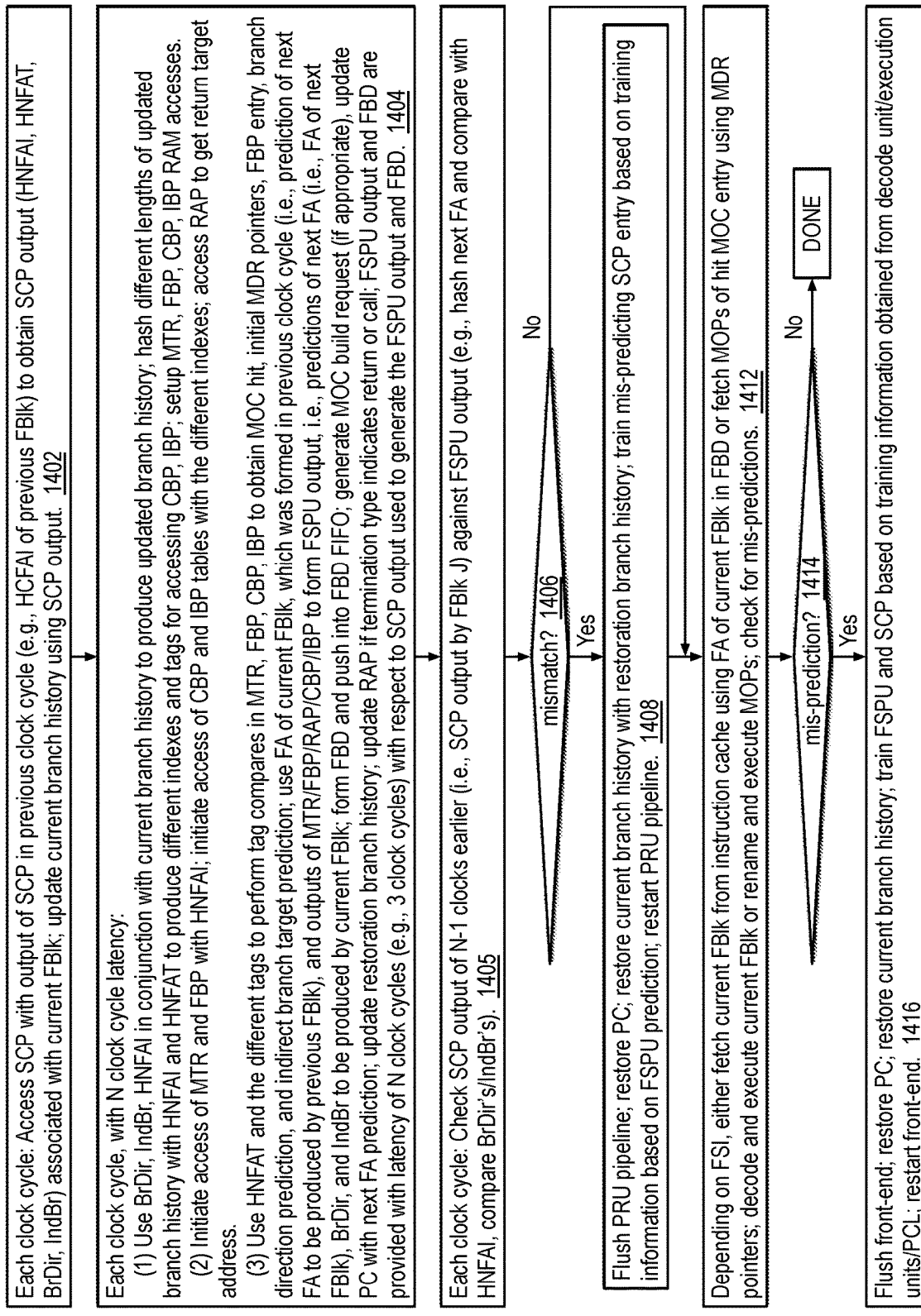
FIG. 14 is an example flow diagram illustrating operation of the PRU of FIG. 11 and its pipeline of FIG. 12 in accordance with embodiments of the present disclosure.

FIG. 14 is an example flow diagram illustrating operation of the PRU 102 of FIG. 11 and its pipeline of FIG. 12 in accordance with embodiments of the present disclosure. Operation begins at block 1402.

At block 1402, each clock cycle the SCP 1001 is accessed with the output 1005 of the SCP 1001, or at least a portion thereof, in the previous clock cycle, to obtain the output 1005 associated with a current FBlk, i.e., produced by the previous FBlk that immediately precedes the current FBlk in program execution order. The obtained output is referred to in FIG. 11 as HNFAI[J-1], HNFAT [J-1], BrDir-S [J-1], and IndBr-S [J-1]. In one embodiment, eleven bits of thirteen bits of the HNFAI are fed back to mux 1171. That is, the SCP 1001 is accessed with a hash of the fetch address of the previous FBlk. Additionally, each clock cycle, the current branch history 1105 is updated using the SCP 1001 output 1005, as described above. Operation proceeds to block 1404.

At block 1404, each clock cycle, the FSPU 1102 performs the following operations with a latency of N clock cycles, where N is at least one. First, the FSPU 1102 uses the HNFAI[J-1], BrDir-S [J-1], and IndBr-S [J-1], in conjunction with the current branch history 1105, to generate an updated branch history, as described above. Additionally, different lengths of the updated branch history are hashed with the HNFAI[J-1] and HNFAT [J-1] to produce different indexes (e.g., 1131 and 1133 of FIG. 11) and tags (e.g., 1132 and 1134 of FIG. 11) for accessing the CBP 1142 and IBP 1144. Still further, the MTR 173 and FBP 152 RAMs are setup using the HNFAI[J-1], and the CBP 1142 and IBP 1144 RAMs are setup using the different indexes. Second, the accesses to the MTR 173, FBP 152, CBP 1142, and IBP 1144 setup earlier are initiated. Additionally, the RAP 1146 is accessed to obtain the prediction of the return target address 446. Third, the HNFAT [J-1] and the different tags are used to perform tag comparisons in the FBP 152, CBP 1142, and IBP 1144 to obtain the FBP entry 422-434, the branch direction prediction 442, and the indirect branch target address prediction 444. Furthermore, the MTR 173 tag comparisons are made to generate the MOC hit indicator 414, the initial MDR pointers 436 and the numMDREs 439 for provision to the FBD formation logic 406. Additionally, the fetch address of the current FBlk (e.g., current FBSA 412 of FIG. 11) formed in the previous clock cycle (e.g., as next FBSA 449 of FIG. 11, which is a prediction of the next fetch address produced by the previous FBlk) and the predictions made by the FBP 152, CBP 1142, IBP 1144, and RAP 1146 are used to form the FSPU 1102 output (e.g., 1199 of FIG. 11). The FSPU 1102 output includes predictions of a next fetch address (e.g., next FBSA[J] 449), branch direction (e.g., BrDir-F [J]), and indirect branch indicator (e.g., IndBr-F [J]) to be produced by the current FBlk when subsequently fetched and executed. Still further, a FBD (e.g., FBD 191 of FIG. 11) that includes the FSI 314 is formed (e.g., by FBD formation logic 406 of FIG. 11) and pushed into the FBD FIFO 104. If the HFB indicator 318 is true, the MOC build requestor 475 generates a MOC build request 177 as described above. Additionally, the program counter (e.g., PC 1193 of FIG. 11) is updated with the predicted next fetch address, the restoration branch history 1107 is updated as described above, and the RAP 1146 is updated if the current FBlk is terminated by a return or call instruction. The FSPU 1102 output 1199 and the FBD 191 are provided with a latency of N clock cycles relative to the SCP 1001 output 1005 that was used to generate the FSPU 1102 output 1199 and the FBD 191. Operation proceeds to block 1405.

At block 1405, each clock cycle, the FSPU 1102 prediction 1199 generated in a given clock cycle is used to check the SCP 1001 prediction 1005 generated N-1 clock cycles earlier. More specifically, the prediction of the next FBSA 449 produced by a FBlk is hashed (in the same manner that a fetch address is hashed for writing into the HNFAI 902 of an SCP entry 900) and the result is compared against prediction made by the SCP 1001 N-1 clock cycles earlier of the HNFAI produced by the FBlk; the prediction of the BrDir-F produced by the FBlk is compared against the prediction made by the SCP 1001 N-1 clock cycles earlier of the BrDir-S produced by the FBlk; and the prediction of the IndBr-F produced by the FBlk is compared against the prediction made by the SCP 1001 N-1 clock cycles earlier of the IndBr-S produced by the FBlk. Operation proceeds to decision block 1406.

At decision block 1406, if a mismatch was detected in block 1405, operation proceeds to block 1408; otherwise, operation proceeds to block 1412.

At block 1408, the PRU 102 pipeline is flushed in response to the detection of the misprediction by the SCP 1001 at block 1406. That is, results flowing down the pipeline are invalidated, and the pipeline is stalled until its restart, which is described below. The PC 1193 is restored (e.g., by the control logic 1103 of FIG. 11) with the correction PC 1113 of FIG. 11. In one embodiment, previous values of the PC 1193 are saved by the SCP prediction check logic 1108 to facilitate restoration of the PC 1193. The current branch history 1105 is restored with the restoration branch history 1107. The SCP entry 900 that made the misprediction is trained-assuming the useful bit 912 is false, as described above—with training information based on the FSPU 1102 prediction 1199 (e.g., FSPU-based training information 1187 of FIG. 11), which is assumed to be more accurate than the SCP 1001 prediction 1005. The FSPU-based training information 1187 includes the BrDir-F and IndBr-F predicted by the FSPU 1102 used to check the SCP 1001 prediction at block 1405, and the next FBSA 449 predicted by the FSPU 1102 that may be hashed (i.e., a HNFAI and a HNFAT) by the control logic 1103 and written into the mis-predicting SCP entry 900. The FSPU-based training information 1187 also includes the current FBSA 412, which is the current FBlk fetch address that may be hashed to generate the HCFAI that may be used as the input 1003 to the SCP 1001 (e.g., provided on training index 1179 of FIG. 11) to select the mis-predicting SCP entry 900. In an alternate embodiment, the hashes themselves of the next FBSA 449 and current FBSA 412 are included in the FSPU-based training information. In an alternate embodiment, the SCP prediction check logic 1108 receives a piped-down version of the HCFAI that was used to perform the lookup in the SCP 1001 and includes the HCFAI in the FSPU-based training information 1187 for use by the control logic 1103 to output on the training index 1179 to train the mis-predicting entry 900 of the SCP 1001. Finally, the PRU 102 pipeline is restarted as follows. In one embodiment, the PRU 102 also includes a mux (not shown in FIG. 11) whose output is coupled to the input of the FSPU 1102. The mux receives the output 1005 of the SCP 1001 and also receives a restart output (not shown in FIG. 11) from the control logic 1103. The restart output includes the HNFAI, HNFAT, BrDir-F and IndBr-F included in the FSPU-based training information 1187. The control logic 1103 provides the restart output to the mux (not shown) and causes the mux to select the restart output for provision to the FSPU 1102 (rather than the output 1005 of the SCP 1001). In one embodiment, the SCP 1001 is effectively skipped on the first clock cycle when restarting the PRU 102 pipeline, and the restart HNFAI provided to the mux as part of the restart output in the first restart clock cycle is fed back through mux 1171 as the SCP 1001 input 1003 for the second restart clock cycle.

At block 1412, the FBlk described by the FBSA 312 of the FBD pushed into the FBD FIFO in block 1404 is fetched from the MDR 175 if the FSI 514 indicates the MOC 171 or is fetched from the instruction cache 101 if the FSI 514 indicates the instruction cache 101. More specifically, if the FSI 514 indicates the MOC 171, MDREs 340 pointed to by the initial MDR pointers 436 of the hit MTR 173 entry 330 are fetched from the MDR 175, and MDREs 340 pointed to by the next MDR pointers 344 of entries fetched from the MDR 175 are fetched from the MDR 175 until all the MDREs 340 specified by the numMDREs 439 have been fetched; and if the FSI 514 indicates the instruction cache 101, the architectural instructions of the FBlk are fetched from the instruction cache 101. Subsequently, the MOPs fetched from the MDR 175 or the MOPs into which the fetched architectural instructions are decoded are executed (e.g., by DEC 112 and execution units 114). Finally, the results of the execution of the MOPs of the FBlk are used to check whether the FSPU 1102 predictions made in block 1404 were incorrect. Operation proceeds to decision block 1414.

At decision block 1414, if a misprediction at block 1412 was detected, operation proceeds to block 1416.

At block 1416, the front-end 110 is flushed. Additionally, the PC 1193 and the current branch history 1105 are restored using values provided by the DEC 112, execution units 114, or PCL 132 (e.g., execution-based training information 1185 of FIG. 11). Still further, the SCP entry 900 implicated by the mis-predicted FBlk is trained using the execution-based training information 1185, and relevant predictors of the FSPU 1102 implicated by the mis-predicted FBlk (e.g., FBP 152, CBP 1142, IBP 1144, RAP 1146) are trained using the execution-based training information 1185. Finally, the front-end 110 is restarted, which includes restarting the PRU 102 similar to the manner described above with respect to block 1408.

In one embodiment, the FSPU misprediction penalty (e.g., 25 clock cycles) is much larger than the SCP misprediction penalty (e.g., 4 clocks). So, even though the SCP misprediction rate may be higher than the FSPU misprediction rate, as long as the SCP misprediction rate is not too much higher than the FSPU misprediction rate, the embodiments that include the SCP may achieve higher instructions per clock (IPC) than conventional solutions that have a high prediction accuracy but only generate fetch block descriptors at a rate of 1/N per clock cycle where N is greater than one, or that generate fetch block descriptors at a rate of 1 per clock cycle but as a result have a relatively low prediction accuracy.

FIG. 15 is an example block diagram illustrating operation of the processor 100 of FIG. 1 in accordance with embodiments of the present disclosure. As described above, in the example of FIG. 15, the initial MDR pointer 336 group size (G) is one, and the MDR 175 pipeline latency is two such that the number of initial MDR pointers 336 is two, which are designated first initial MDR pointer and second initial MDR pointer in FIG. 15 according to program order, i.e., the first initial MDR pointer points to the first MDRE in program order of the ME 350, and the second initial MDR pointer points to the second MDRE in program order of the ME 350.

FIG. 15 shows at the top a sequence of FBDs 191 provided by the PRU 102 in program order to the FBD FIFO 104 and which are consumed from the FBD FIFO 104 in program order by the IFU 106. In the example of FIG. 15, ten FBDs 191 are shown in the sequence and are referred to as A through J. In the example of FIG. 15, the value of the FSI 314 of each of the ten FBDs is shown either by an "M" indicating the MOC 171 or by an "I" indicating the instruction cache 101. More specifically, the FSI 314 indicates the MOC 171 in FBDs A, C, H, I, and J, whereas the FSI 314 indicates the instruction cache 101 in FBDs B, D, E, F, and G. In the example of FIG. 15, the value of numMDREs 319 in each of FBDs A, C, H, I, and J is also shown.

FIG. 15 also shows at the left side the instruction cache 101 of FIG. 1 as a 4-way set associative cache with entries holding the architectural instructions of FBlks A through J, i.e., the FBlks described by FBDs A through J. Each of FBlks A through J is described by its corresponding FBD 191 A through J. Additionally, because the FSI 314 indicates the MOC 171 in FBDs A, C, H, I, and J, the corresponding FBDs 191 A, C, H, I, and J also describe some characteristics of a MOC entry 350 associated with the corresponding FBlks A, C, H, I, and J such as the initial MDR pointers 316 and the number of MDREs 340 of the MOC entry 350 (indicated by the numMDREs 319). As shown, the number of MDREs of MOC entry A is 4, the number of MDREs of MOC entry C is 1, the number of MDREs of MOC entry H is 2, the number of MDREs of ME 1 is 1, the number of MDREs of MOC entry J is 1.

FIG. 15 also shows at the right side the MDR 175 of FIG. 1 with MDREs 340 holding the MOPs of the MEs 350 that are described by FBDs A, C, H, I, and J. In the example of FIG. 15, the four MDREs of the ME 350 associated with FBlk A are denoted A[0], A[1], A[2], and A[3] in program order in FIG. 15. The two MDREs of the ME 350 associated with FBlk H are denoted H[0] and H[1] in program order in FIG. 15. The one MDRE of the ME 350 associated with each of FBlks C, I, and J are denoted respectively C[0], I[0], and J[0]. As shown, the first initial MDR pointer 316 of the FBD 191 associated with FBlk A points to MDRE A[0], the second initial MDR pointer 316 of the FBD 191 associated with FBlk A points to MDRE A[1], the next MDR pointer 344 of A[0] points to A[2], and the next MDR pointer 344 of A[1] points to A[3] such that the MOPs of the ME 350 associated with FBlk A are fetched in program order for provision to the FBlk FIFO 108 in program order. More specifically, during a first clock cycle MDRE A[0] is fetched using the first initial MDR pointer of FBlk A, during a second clock cycle MDRE A[1] is fetched using the second initial MDR pointer of FBlk A, during a third clock cycle MDRE A[2] is fetched using the next MDR pointer of MDRE A[0], and during a fourth clock cycle MDRE A[3] is fetched using the next MDR pointer of MDRE A[1], as described in more detail below with respect to FIG. 16. Furthermore, the first initial MDR pointer 316 of the FBD 191 associated with FBlk H points to MDRE H[0], and the second initial MDR pointer 316 of the FBD 191 associated with FBlk H points to MDRE H[1] such that the MOPs of the ME 350 associated with FBlk H are fetched in program order for provision to the FBlk FIFO 108 in program order. The only initial MDR pointer 316 of the FBD 191 associated with each of FBlks C, I, and J points respectively to MDRE C[0], I[0], and J[0]. As shown in the example of FIG. 15, the MDREs 340 are managed as a pool, and any MDRE 340 of the pool may be pointed to by the initial MDR pointer 336 of any MTRE 330 or by the next MDR pointer 344 of any MDRE 340.

FIG. 15 also shows at the bottom a sequence of fetched FBlks A through J, more specifically either the fetched MDREs 340 of MOPs of the respective FBlk or the fetched AIs of the FBlk. As shown, fetched in program order for provision to the FBIk FIFO 108 for consumption by the DEC 112 are the MOPs of MDREs A[0], A[1], A[2], A[3] followed by the AIs of FBIk B, followed by the MOPs of MDRE C[0], followed by the AIs of FBlks D through G, followed by the MOPs of MDRES H[0], H[1], I[0], J[0].

In an embodiment in which the AFE 181 builds MF-MEs, when the PRU 102 detects the presence of an MF-ME in the program instruction stream, because the MF-ME holds the MOPs associated with multiple (M) FBlks, the PRU 102 produces only one FBD 191 for the MF-ME. Thus, for the next M-1 clock cycles, the PRU 102 does not produce an FBD 191. In an embodiment, the PRU 102 nevertheless performs the other operations described during the M-1 clock cycles, e.g.: the SCP 1001 continues to provide single-cycle predictions 1005; the current branch history 1105 continues to be updated; the FBP 152, the MTR 173, and the BPs 154 continue to be accessed and provide predictions; and the FSPU predictions 1199 continue to be generated and checked. Thus, unlike in the example of FIG. 15, there is not a one-to-one correspondence between FBDs and MOC entries 350 when the MOC entry 350 is an MF-ME since an MF-ME corresponds to multiple FBlks, i.e., the AIs of multiple FBlks are decoded and fused into the MOPs of the MF-ME.

Figure 16:
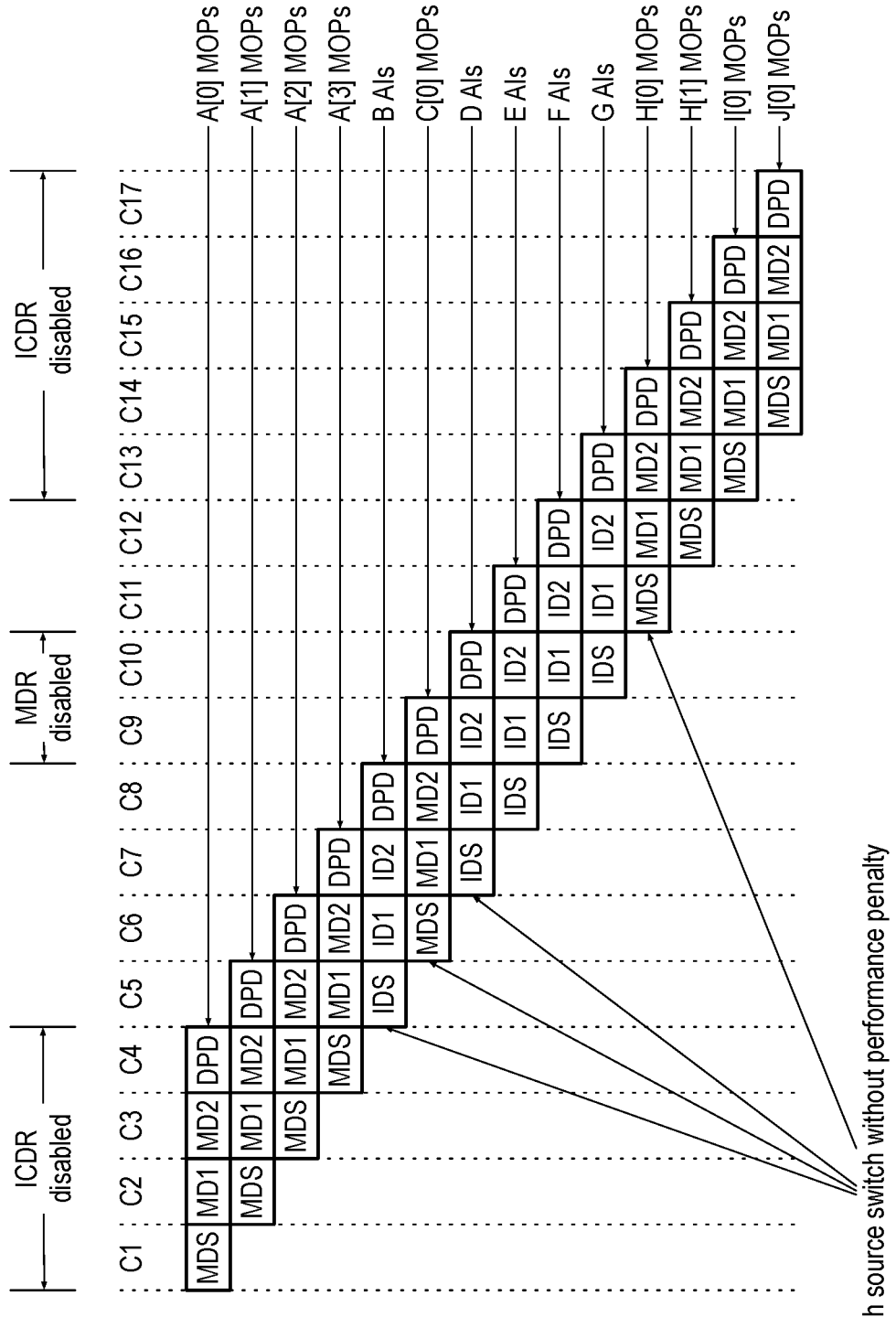
FIG. 16 is an example pipeline diagram illustrating operation of the processor of FIG. 1 in accordance with embodiments of the present disclosure.

FIG. 16 is an example pipeline diagram illustrating operation of the processor 100 of FIG. 1 in accordance with embodiments of the present disclosure. FIG. 16 is described with reference to the example processor state of FIG. 15. Seventeen clock cycles are shown denoted C1 through C16. During the seventeen clock cycles, different IFU 106 stages and other stages of the processor pipeline of FIG. 7B are shown that perform their functions to accomplish the fetching in program order of the MOPs and AIs of FIG. 15 by the IFU 106 from the MDR 175 and the ICDR 524. Reference is made below using A-J to refer to the corresponding FBDs, FBlks, MEs, and MDREs of FIG. 15.

During each of clocks C1-C14, except for clock cycles C2-C4 and C12, an FBD 511 of FIG. 5 corresponding to FBDs A through J is read from the FBD FIFO 104, e.g., in response to the assertion of read signal 598 by the control logic 501. The FBD 511 is used by the IFU 106 to fetch FBlks of AIs or MEs of MOPs during clock cycles shown in FIG. 16. Prior to the clock cycle in which an FBD 511 is read from the FBD FIFO 104, the PR4 stage produced the FBD 191. For example, prior to clock cycle C1, the PR4 stage produced FBD A which is subsequently used by the IFU 106 to fetch MDREs A[0], A[1], A[2], and A[3] during clock cycles C1 through C6, and prior to clock cycle C5, the PR4 stage produced FBD B which is subsequently used by the IFU 106 to fetch FBIk B during clock cycles C5 through C7.

During clocks C2-C4 no FBD 511 is read from the FBD FIFO 104 because the ME 350 associated with FBIk A has four MDREs, and during clock C12 no FBD 511 is read from the FBD FIFO 104 because the ME 350 associated with FBIk H has two MDREs. More specifically, during clocks C2-C4 there is no need to read another FBD 511 because during clock C2 the MDR pointer is the second initial MDR pointer 316 obtained from the FBD 511, and during clocks C3 and C4 the MDR pointers are the next MDR pointers 344 fetched from the MDR 175. Similarly, during clock C12 there is no need to read another FBD 511 because during clock C12 the MDR pointer is the second initial MDR pointer 316 obtained from the FBD 511.

During clock C1, the MDS stage sets up the first initial MDR pointer 516 of FBD A to the MDR 175 to select MDRE A[0]. During clock C2, the MD1 stage reads the MOPs of MDRE A[0], and the MDS stage sets up the second initial MDR pointer 516 of FBD A to the MDR 175 to select MDRE A[1]. During clock C3: the MD2 stage writes the fetched MOPs of MDRE A[0] to the FBIk FIFO 108; the MD1 stage reads the MOPs of MDRE A[1]; and the MDR pipeline forwards the next MDR pointer 344 of MDRE A[0] as next MDR pointer 574 back through mux 572 to the MDR 175 input, and the MDS stage sets up the A[0] next MDR pointer 574 to select MDRE A[2]. During clock C4: the DPD stage reads the MOPs of MDRE A[0] from the FBIk FIFO 108; the MD2 stage writes the MOPs of MDRE A[1] to the FBIk FIFO 108; the MD1 stage reads the MOPs of MDRE A[2]; and the MDS stage sets up the A[1] next MDR pointer 574 to select MDRE A[3].

During clock C5: the DPD stage reads the MOPs of MDRE A[1] from the FBIk FIFO 108; the MD2 stage writes the MOPs of MDRE A[2] to the FBIk FIFO 108; the MD1 stage reads the MOPs of MDRE A[3]; and the IDS stage sets up the predicted set index 504 and the predicted way number 506 to the ICDR 524 to select FBIk B. During clock C6: the DPD stage reads the MOPs of MDRE A[2] from the FBIk FIFO 108; the MD2 stage writes the MOPs of MDRE A[3] to the FBIk FIFO 108; the ID1 stage reads the AIs of FBIk B; and the MDS stage sets up the only initial MDR pointer 516 of FBD C to the MDR 175 to select MDRE C[0]. During clock C7: the DPD stage reads the MOPs of MDRE A[3] from the FBIk FIFO 108; the ID2 stage writes the fetched AIs of FBIk B to the FBIk FIFO 108; the MD1 stage reads the MOPs of MDRE C[0]; and the IDS stage sets up the predicted set index 504 and the predicted way number 506 to the ICDR 524 to select FBIk D. During clock C8: the DPD stage reads the AIs of FBIk B from the FBIk FIFO 108; the MD2 stage writes the MOPs of MDRE C[0] to the FBIk FIFO 108; the ID1 stage reads the AIs of FBIk D; and the IDS stage sets up the predicted set index 504 and the predicted way number 506 to the ICDR 524 to select FBIk E.

During clock C9: the DPD stage reads the MOPs of MDRE C[0] from the FBIk FIFO 108; the ID2 stage writes the AIs of FBIk D to the FBIk FIFO 108; the ID1 stage reads the AIs of FBIk E; and the IDS stage sets up the predicted set index 504 and the predicted way number 506 to the ICDR 524 to select FBIk F. During clock C10: the DPD stage reads the AIs of FBIk D from the FBIk FIFO 108; the ID2 stage writes the AIs of FBIk E to the FBIk FIFO 108; the ID1 stage reads the AIs of FBIk F; and the IDS stage sets up the predicted set index 504 and the predicted way number 506 to the ICDR 524 to select FBIk G. During clock C11: the DPD stage reads the AIs of FBIk E from the FBIk FIFO 108; the ID2 stage writes the AIs of FBIk F to the FBIk FIFO 108; the ID1 stage reads the AIs of FBIk G; and the MDS stage sets up the first initial MDR pointer 516 of FBD H to the MDR 175 to select MDRE H[0].

During clock C12: the DPD stage reads the AIs of FBIk F from the FBIk FIFO 108; the ID2 stage writes the AIs of FBIk G to the FBIk FIFO 108; the MD1 stage reads the MOPs of MDRE H[0]; and the MDS stage sets up the second initial MDR pointer 516 of FBD H to the MDR 175 to select MDRE H[1]. During clock C13: the DPD stage reads the AIs of FBIk G from the FBIk FIFO 108; the MD2 stage writes the MOPs of MDRE H[0] to the FBIk FIFO 108; the MD1 stage reads the MOPs of MDRE H[1]; and the MDS stage sets up the only initial MDR pointer 516 of FBD I to the MDR 175 to select MDRE I[0]. During clock C14: the DPD stage reads the MOPs of MDRE H[0] from the FBIk FIFO 108; the MD2 stage writes the MOPs of MDRE H[1] to the FBIk FIFO 108; the MD1 stage reads the MOPs of MDRE I[0]; and the MDS stage sets up the only initial MDR pointer 516 of FBD J to the MDR 175 to select MDRE J[0].

During clock C15: the DPD stage reads the MOPs of MDRE H[1] from the FBIk FIFO 108; the MD2 stage writes the MOPs of MDRE I[0] to the FBIk FIFO 108; and the MD1 stage reads the MOPs of MDRE J[0]. During clock C16: the DPD stage reads the MOPs of MDRE I[0] from the FBIk FIFO 108; and the MD2 stage writes the MOPs of MDRE J[0] to the FBIk FIFO 108. During clock C17: the DPD stage reads the MOPs of MDRE J[0] from the FBIk FIFO 108.

In the example of FIG. 16, it is assumed that the program stream instruction mix is such that the back-end 130 and the DEC 112 can consume the MOPs and AIs immediately as they are produced by the IFU 106, which is why the DPD stage is shown immediately following the MD2/ID2 stage for each FBIk/MDRE of written AIs/MOPs. However, as described above, in some instances this assumption will not be true such that the MOPs and AIs will need to be buffered in the FBIk FIFO 108 until the DPD stage of the DEC 112 can consume them.

As shown in FIG. 16, advantageously the IFU 106 is configured to switch from fetching MOPs from the MDR 175 to fetching AIs from the ICDR 524 and vice versa without incurring a performance penalty. That is, the IFU 106 can continue providing MOPs/AIs (to the FBIk FIFO 108) each clock cycle even when switching between fetch sources. This is possible because the FSI 514 enables the IFU 106 to know prior to fetching which of the two fetch sources (i.e., the MDR 175 or the ICDR 524) to fetch from rather than the IFU 106 needing to predict a fetch source as in some conventional designs. Furthermore, the FSI 514 may enable the IFU 106 to advantageously consume less power. As shown in FIG. 16, the MDR 175 (e.g., during C9-C10) or the ICDR 524 (e.g., during C1-C4 and C13-C17) may be disabled when not being accessed, which may advantageously reduce power consumption relative to a conventional design that does not know ahead of time which fetch source to fetch from and therefore fetches from both concurrently.

Figure 17:
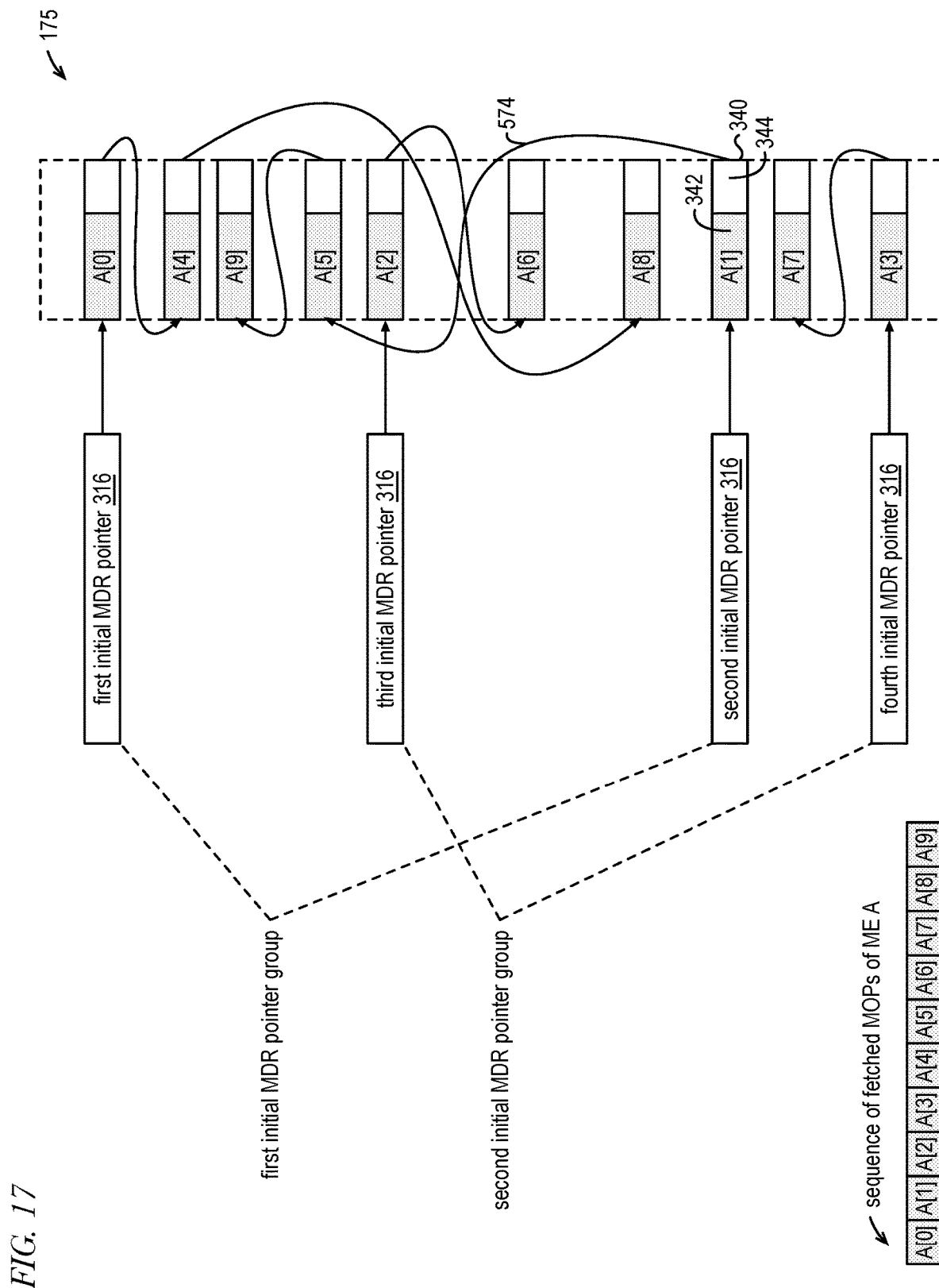
FIG. 17 is an example block diagram illustrating operation of the processor of FIG. 1 in accordance with embodiments of the present disclosure.

FIG. 17 is an example block diagram illustrating operation of the processor 100 of FIG. 1 in accordance with embodiments of the present disclosure. As described above, in the example of FIG. 17, the initial MDR pointer 336 group size (G) is two, and the MDR 175 pipeline latency is two such that the number of initial MDR pointers 336 is four, which are designated first initial MDR pointer, second initial MDR pointer, third initial MDR pointer, and fourth initial MDR pointer in FIG. 17 according to program order, i.e., the first initial MDR pointer points to the first MDRE in program order of the ME 350, the second initial MDR pointer points to the second MDRE in program order of the ME 350, the third initial MDR pointer points to the third MDRE in program order of the ME 350, and the fourth initial MDR pointer points to the fourth MDRE in program order of the ME 350. As shown, the first initial MDR pointer and the second initial MDR pointer form a first initial MDR pointer group that concurrently access the MDR 175, and the third initial MDR pointer and the fourth initial MDR pointer form a second initial MDR pointer group that concurrently access the MDR 175.

FIG. 17 shows the MDR 175 of FIG. 1 with MDREs 340 holding the MOPs of a single ME 350, denoted A, whose number of MDREs is ten, denoted A[0] through A[9] in program order. As shown, the first initial MDR pointer 316 points to MDRE A[0], the second initial MDR pointer 316 points to MDRE A[1], the third initial MDR pointer 316 points to MDRE A[0], and the fourth initial MDR pointer 316 points to MDRE A[3], the next MDR pointer 344 of A[0] points to A[4], the next MDR pointer 344 of A[1] points to A[5], the next MDR pointer 344 of A[2] points to A[6], the next MDR pointer 344 of A[3] points to A[7], the next MDR pointer 344 of A[4] points to A[8], and the next MDR pointer 344 of A[5] points to A[9] such that the MOPs of the ME 350 associated with FBIk A are fetched in program order for provision to the FBIk FIFO 108 in program order. More specifically, during a first clock cycle MDREs A[0] and A[1] are fetched using the first and second initial MDR pointers, during a second clock cycle MDREs A[2] and A[3] are fetched using the third and fourth initial MDR pointers, during a third clock cycle MDREs A[4] and A[5] are fetched using the next MDR pointers of MDREs A[0] and A[1], during a fourth clock cycle MDREs A[6] and A[7] are fetched using the next MDR pointers of MDREs A[2] and A[3], and during a fifth clock cycle MDREs A[8] and A[9] are fetched using the next MDR pointers of MDREs A[4] and A[5] in a pipelined manner similar to that described in FIG. 16, except that two MDREs are fetched per clock cycle, and no switching between fetch sources is described. Also shown at the bottom left of FIG. 17 is the sequence of fetched MOPs of ME A, namely the MOPs of MDREs A[0] through A[9] in program order.

As may be observed from the foregoing, the distributed MDRE pointer mechanism in which the MDRE pointers are distributed between the MTR 173 and the MDR 175 may advantageously improve performance of the MOC 171 by preserving the associativity of the MOC 171 thereby potentially reducing conflict misses relative to some conventional approaches (e.g., the '535 Patent), may advantageously reduce fragmentation and increase efficiency of the MOC 171, and may advantageously facilitate the building of MOC 171 entries having a large number of MOPs.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

To aid the Patent Office and any readers of this application and any patent issued on this application in interpreting the claims appended hereto, applicants wish to indicate they do not intend any of the appended claims or claim elements to invoke 35 U.S.C. § 112 (f) unless the words "means for" or "step for" are explicitly used in the particular claim. Furthermore, use of the term "configured to" is not intended to invoke 35 U.S.C. § 112 (f). Still further, uses of the terms "unit" (e.g., as in "prediction unit", "instruction fetch unit", "decode unit", "execution unit", or "logic" (e.g., as in "control logic" or "formation logic") or "element" (e.g., as in "storage element") are intended to connote structure that is included in a microprocessor, which includes circuitry configured to perform disclosed operations, including storage circuitry that stores microcode processed by the circuitry.

The invention claimed is:

1. A microprocessor, comprising:
   a macro-op (MOP) cache (MOC) comprising:
      a MOC tag RAM (MTR) arranged as a set-associative cache of MTR entries; and
      a MOC data RAM (MDR) managed as a pool of MDR entries;
   wherein a MOC entry (ME) comprises:
      one MTR entry; and
      one or more MDR entries that hold the MOPs of the ME, wherein the MDR entries of the ME have a program order;
   wherein each MDR entry is configured to hold:
      one or more MOPs of the ME; and
      a next MDR entry pointer;
   wherein each MTR entry is configured to hold:
      a length that specifies the number of the MDR entries of the ME; and
      one or more initial MDR entry pointers;
   wherein the MOC is configured to:
      during allocation of a ME into the MOC, populate the one or more initial MDR entry pointers and the next MDR entry pointers to point to the one or more MDR entries of the ME based on the program order; and
      in response to an access of the MOC that hits upon the MTR entry of an ME, fetch the MDR entries of the ME according to the program order:
         initially using the one or more initial MDR entry pointers of the hit upon MTR entry; and
         subsequently using the next MDR entry pointers of fetched MDR entries of the ME, until all the MDR entries of the ME have been fetched from the MDR.

2. The microprocessor of claim 1,
   wherein the one or more initial MDR entry pointers is a predetermined number; and
   wherein the number of MDR entries of a ME is constrained by a size of the pool of MDR entries but is not constrained by the predetermined number of the one or more initial MDR entry pointers because of the next MDR entry pointers.

3. The microprocessor of claim 1,
   wherein each MDR entry is configured to hold up to a predetermined number Q of MOPs,
   wherein Q is greater than zero.

4. The microprocessor of claim 3,
   wherein Q is three.

5. The microprocessor of claim 1,
   wherein the MDR comprises a pipeline having a fetch latency of S clock cycles, wherein S is at least two;
   wherein the one or more initial MDR entry pointers comprise at least S initial MDR entry pointers; and
   wherein the S initial MDR entry pointers are used to fetch first through Sth MDR entries of the ME during first through Sth adjacent clock cycles such that pipeline bubbles are avoided during transition from fetching the MDR entries of the ME initially using the one or more initial MDR entry pointers provided by the hit upon MTR entry to fetching the remaining MDR entries of the ME using the next MDR entry pointers provided by the MDR.

6. The microprocessor of claim 1,
   wherein the one or more initial MDR entry pointers comprise B initial MDR entry pointers for concurrently fetching B MDR entries from the MDR, wherein B is greater than one.

7. The microprocessor of claim 6,
   wherein the MDR comprises B read ports for concurrently fetching the B MDR entries.

8. The microprocessor of claim 6,
   wherein the number of MDR entries of a ME need not be allocated in quanta of B MDR entries but is instead allocatable in quanta of less than B MDR entries.

9. The microprocessor of claim 1,
   wherein the MDR comprises a pipeline having a fetch latency of S clock cycles, wherein S is at least two;
   wherein the one or more initial MDR entry pointers comprise S*B initial MDR entry pointers; and wherein the S*B initial MDR entry pointers are used to fetch first through S*Bth MDR entries of the ME during first through Sth adjacent clock cycles such that pipeline bubbles are avoided during transition from fetching the MDR entries of the ME initially using the one or more initial MDR entry pointers provided by the hit upon MTR entry to fetching the remaining MDR entries of the ME using the next MDR entry pointers provided by the MDR.

10. The microprocessor of claim 1,
wherein each MDR entry is configured to hold up to a predetermined number Q of MOPs,
wherein Q is greater than one.

11. The microprocessor of claim 10,
wherein Q is three.

12. The microprocessor of claim 1,
wherein the MOC allocates the MDR entries of the pool such that the initial MDR entry pointers and the next MDR entry pointers may point to any MDR entry of the pool.

13. The microprocessor of claim 1, further comprising:
a fusion engine configured to:
  fuse MOPs decoded from architectural instructions of a plurality of fetch blocks into the MOPs of a ME; and
  allocate the ME into the MOC;
wherein a fetch block comprises a sequential run of architectural instructions in a program instruction stream.

14. A method, comprising:
in a microprocessor comprising:
  a macro-op (MOP) cache (MOC) comprising:
    a MOC tag RAM (MTR) arranged as a set-associative cache of MTR entries; and
    a MOC data RAM (MDR) managed as a pool of MDR entries;
  wherein a MOC entry (ME) comprises:
    one MTR entry; and
    one or more MDR entries that hold the MOPs of the ME, wherein the MDR entries of the ME have a program order;
  wherein each MDR entry is configured to hold:
    one or more MOPs of the ME; and
    a next MDR entry pointer;
  wherein each MTR entry is configured to hold:
    a length that specifies the number of the MDR entries of the ME; and
    one or more initial MDR entry pointers;
during allocation of a ME into the MOC, populating by the MOC the one or more initial MDR entry pointers and the next MDR entry pointers to point to the one or more MDR entries of the ME based on the program order; and
in response to an access of the MOC that hits upon the MTR entry of an ME, fetching by the MOC the MDR entries of the ME according to the program order:
  initially using the one or more initial MDR entry pointers of the hit upon MTR entry; and
  subsequently using the next MDR entry pointers of fetched MDR entries of the ME, until all the MDR entries of the ME have been fetched from the MDR.

15. The method of claim 14,
wherein the one or more initial MDR entry pointers is a predetermined number; and
wherein the number of MDR entries of a ME is constrained by a size of the pool of MDR entries but is not constrained by the predetermined number of the one or more initial MDR entry pointers because of the next MDR entry pointers.

16. The method of claim 14,
wherein each MDR entry is configured to hold up to a predetermined number Q of MOPs,
wherein Q is greater than zero.

17. The microprocessor of claim 16,
wherein Q is three.

18. The method of claim 14,
wherein the MDR comprises a pipeline having a fetch latency of S clock cycles, wherein S is at least two; and
wherein the one or more initial MDR entry pointers comprise at least S initial MDR entry pointers;
the method further comprising:
  using the S initial MDR entry pointers to fetch first through Sth MDR entries of the ME during first through Sth adjacent clock cycles such that pipeline bubbles are avoided during transition from fetching the MDR entries of the ME initially using the one or more initial MDR entry pointers provided by the hit upon MTR entry to fetching the remaining MDR entries of the ME using the next MDR entry pointers provided by the MDR.

19. The method of claim 14,
wherein the one or more initial MDR entry pointers comprise B initial MDR entry pointers for concurrently fetching B MDR entries from the MDR, wherein B is greater than one.

20. The method of claim 19,
wherein the MDR comprises B read ports for concurrently fetching the B MDR entries.

21. The method of claim 19,
wherein the number of MDR entries of a ME need not be allocated in quanta of B MDR entries but is instead allocatable in quanta of less than B MDR entries.

22. The method of claim 14,
wherein the MDR comprises a pipeline having a fetch latency of S clock cycles, wherein S is at least two; and
wherein the one or more initial MDR entry pointers comprise S*B initial MDR entry pointers; and
the method further comprising:
  using the S*B initial MDR entry pointers to fetch first through S*Bth MDR entries of the ME during first through Sth adjacent clock cycles such that pipeline bubbles are avoided during transition from fetching the MDR entries of the ME initially using the one or more initial MDR entry pointers provided by the hit upon MTR entry to fetching the remaining MDR entries of the ME using the next MDR entry pointers provided by the MDR.

23. The method of claim 14,
wherein each MDR entry is configured to hold up to a predetermined number Q of MOPs,
wherein Q is greater than one.

24. The method of claim 10,
wherein Q is three.

25. The method of claim 14,
wherein the MOC allocates the MDR entries of the pool such that the initial MDR entry pointers and the next MDR entry pointers may point to any MDR entry of the pool.

26. The method of claim 14, further comprising:
fusing, by a fusion engine, MOPs decoded from architectural instructions of a plurality of fetch blocks into the MOPs of a ME; and allocating, by the fusion engine, the ME into the MOC;
wherein a fetch block comprises a sequential run of architectural instructions in a program instruction stream.

27. A non-transitory computer-readable medium having instructions stored thereon that are capable of causing or configuring a microprocessor comprising:
a macro-op (MOP) cache (MOC) comprising:
a MOC tag RAM (MTR) arranged as a set-associative cache of MTR entries; and
a MOC data RAM (MDR) managed as a pool of MDR entries;
wherein a MOC entry (ME) comprises:
one MTR entry; and
one or more MDR entries that hold the MOPs of the ME, wherein the MDR entries of the ME have a program order;
wherein each MDR entry is configured to hold:
one or more MOPs of the ME; and
a next MDR entry pointer;
wherein each MTR entry is configured to hold:
a length that specifies the number of the MDR entries of the ME; and
one or more initial MDR entry pointers;
wherein the MOC is configured to:
during allocation of a ME into the MOC, populate the one or more initial MDR entry pointers and the next MDR entry pointers to point to the one or more MDR entries of the ME based on the program order; and
in response to an access of the MOC that hits upon the MTR entry of an ME, fetch the MDR entries of the ME according to the program order:
initially using the one or more initial MDR entry pointers of the hit upon MTR entry; and
subsequently using the next MDR entry pointers of fetched MDR entries of the ME, until all the MDR entries of the ME have been fetched from the MDR.

* * * * *

UNITED STATES PATENT AND TRADEMARK OFFICE
CERTIFICATE OF CORRECTION

| | | |
|---|---|---|
| PATENT NO. | : 12,282,430 B1 | Page 1 of 15 |
| APPLICATION NO. | : 18/380152 | |
| DATED | : April 22, 2025 | |
| INVENTOR(S) | : Favor et al. | |

It is certified that error appears in the above-identified patent and that said Letters Patent is hereby corrected as shown below:

On the Title Page

On Page 2, in Item (56), under "OTHER PUBLICATIONS", in Column 2, Line 17, delete "Internaitonal" and insert -- International --, therefor.

In the Specification

In Column 5, Line 46, delete "uops" and insert -- $\mu$ops --, therefor.

In Column 6, Line 13, delete "(FBIk)" and insert -- (FBlk) --, therefor.

In Column 8, Line 30, delete "(FBIk)" and insert -- (FBlk) --, therefor.

In Column 9, Line 53, delete "FBIk" and insert -- FBlk --, therefor.

In Column 10, Line 48, delete "FBIk." and insert -- FBlk. --, therefor.

In Column 10, Line 52, delete "FBIk," and insert -- FBlk, --, therefor.

In Column 10, Line 55, delete "FBIk such that the FBIk" and insert -- FBlk such that the FBlk --, therefor.

In Column 10, Line 61, delete "FBIk" and insert -- FBlk --, therefor.

In Column 10, Line 67, delete "FBIk" and insert -- FBlk --, therefor.

In Column 11, Line 7, delete "FBIk" and insert -- FBlk --, therefor.

In Column 11, Line 19, delete "FBIk" and insert -- FBlk --, therefor.

Signed and Sealed this
Twenty-fourth Day of June, 2025

Coke Morgan Stewart
*Acting Director of the United States Patent and Trademark Office*

CERTIFICATE OF CORRECTION (continued)
U.S. Pat. No. 12,282,430 B1

In Column 11, Line 30, delete "FBIk" and insert -- FBlk --, therefor.

In Column 11, Line 33, delete "FBIk" and insert -- FBlk --, therefor.

In Column 11, Line 35, delete "FBIk length, i.e., the FBIk" and insert -- FBlk length, i.e., the FBlk --, therefor.

In Column 11, Line 36, delete "FBIk." and insert -- FBlk. --, therefor.

In Column 11, Line 42, delete "FBIk," and insert -- FBlk, --, therefor.

In Column 11, Line 43, delete "FBIk," and insert -- FBlk, --, therefor.

In Column 11, Line 62, delete "FBIk" and insert -- FBlk --, therefor.

In Column 11, Line 63, delete "FBIk" and insert -- FBlk --, therefor.

In Column 12, Line 7, delete "FBIk" and insert -- FBlk --, therefor.

In Column 12, Line 11, delete "FBIk" and insert -- FBlk --, therefor.

In Column 12, Line 19, delete "FBIk" and insert -- FBlk --, therefor.

In Column 12, Line 41, delete "FBIk" and insert -- FBlk --, therefor.

In Column 12, Line 43, delete "FBIk after the FBIk" and insert -- FBlk after the FBlk --, therefor.

In Column 12, Line 46, delete "FBIk" and insert -- FBlk --, therefor.

In Column 12, Line 49, delete "FBIk" and insert -- FBlk --, therefor.

In Column 12, Line 53, delete "FBIk" and insert -- FBlk --, therefor.

In Column 12, Line 67, delete "FBIk." and insert -- FBlk. --, therefor.

In Column 13, Line 16, delete "busses" and insert -- buses --, therefor.

In Column 13, Line 20, delete "FBIk" and insert -- FBlk --, therefor.

In Column 13, Line 58, delete "FBIk," and insert -- FBlk, --, therefor.

In Column 13, Line 60, delete "FBIk," and insert -- FBlk, --, therefor.

In Column 13, Line 62, delete "FBIk" and insert -- FBlk --, therefor.

CERTIFICATE OF CORRECTION (continued)
U.S. Pat. No. 12,282,430 B1

In Column 13, Line 64, delete "FBIk," and insert -- FBlk, --, therefor.

In Column 13, Line 65, delete "FBIk." and insert -- FBlk. --, therefor.

In Column 14, Line 2, delete "FBIk" and insert -- FBlk --, therefor.

In Column 14, Line 3, delete "FBIk." and insert -- FBlk. --, therefor.

In Column 14, Line 4, delete "FBIk" and insert -- FBlk --, therefor.

In Column 14, Line 7, delete "FBIk is a hot FBIk" and insert -- FBlk is a hot FBlk --, therefor.

In Column 14, Line 16, delete "FBIk" and insert -- FBlk --, therefor.

In Column 15, Line 56, delete "FBIk" and insert -- FBlk --, therefor.

In Column 15, Line 58, delete "FBIk" and insert -- FBlk --, therefor.

In Column 15, Line 65, delete "the up to" and insert -- up to --, therefor.

In Column 17, Line 38, delete "FBIk," and insert -- FBlk, --, therefor.

In Column 17, Line 44, delete "FBIk," and insert -- FBlk, --, therefor.

In Column 17, Line 44, delete "FBIk" and insert -- FBlk --, therefor.

In Column 17, Line 52, delete "FBIk." and insert -- FBlk. --, therefor.

In Column 17, Line 60, delete "FBIk" and insert -- FBlk --, therefor.

In Column 18, Line 9, delete "FBIk" and insert -- FBlk --, therefor.

In Column 18, Line 20, delete "FBIk" and insert -- FBlk --, therefor.

In Column 18, Line 27, delete "FBIk" and insert -- FBlk --, therefor.

In Column 18, Line 30, delete "FBIk" and insert -- FBlk --, therefor.

In Column 18, Line 32, delete "FBIk length, i.e., the FBIk" and insert -- FBlk length, i.e., the FBlk --, therefor.

In Column 18, Line 33, delete "FBIk." and insert -- FBlk. --, therefor.

In Column 18, Line 37, delete "FBIk" and insert -- FBlk --, therefor.

In Column 18, Line 38, delete "FBIk" and insert -- FBlk --, therefor.

In Column 18, Line 43, delete "FBIk" and insert -- FBlk --, therefor.

In Column 18, Line 54, delete "FBIk," and insert -- FBlk, --, therefor.

In Column 18, Line 61, delete "FBIk" and insert -- FBlk --, therefor.

In Column 18, Line 66, delete "FBIk" and insert -- FBlk --, therefor.

In Column 19, Line 27, delete "FBIk" and insert -- FBlk --, therefor.

In Column 19, Line 50, delete "FBIk" and insert -- FBlk --, therefor.

In Column 19, Line 52, delete "FBIk." and insert -- FBlk. --, therefor.

In Column 19, Line 54, delete "FBIk" and insert -- FBlk --, therefor.

In Column 19, Line 55, delete "FBIk" and insert -- FBlk --, therefor.

In Column 19, Line 56, delete "FBIk" and insert -- FBlk --, therefor.

In Column 20, Line 5, delete "FBIk" and insert -- FBlk --, therefor.

In Column 20, Line 6, delete "FBIk" and insert -- FBlk --, therefor.

In Column 20, Line 14, delete "FBIk" and insert -- FBlk --, therefor.

In Column 21, Line 7, delete "Nis" and insert -- Nis --, therefor.

In Column 21, Line 22, delete "Nis" and insert -- Nis --, therefor.

In Column 22, Line 10, delete "single-FBIk" and insert -- single-FBlk --, therefor.

In Column 22, Line 11, delete "multi-FBIk" and insert -- multi-FBlk --, therefor.

In Column 22, Line 24, delete "FBIk A" and insert -- FBlk A --, therefor.

In Column 22, Line 24, delete "FBIk B" and insert -- FBlk B --, therefor.

In Column 22, Line 25, delete "FBIk" and insert -- FBlk --, therefor.

In Column 22, Line 26, delete "FBIk B, and FBIk B" and insert -- FBlk B, and FBlk B --, therefor.

In Column 22, Line 27, delete "FBIk" and insert -- FBlk --, therefor.

CERTIFICATE OF CORRECTION (continued)
U.S. Pat. No. 12,282,430 B1

In Column 22, Line 29, delete "FBIk A followed FBIk" and insert -- FBlk A followed FBlk --, therefor.

In Column 22, Line 49, delete "FBIk" and insert -- FBlk --, therefor.

In Column 22, Line 65, delete "FBIk" and insert -- FBlk --, therefor.

In Column 23, Line 5, delete "FBIk" and insert -- FBlk --, therefor.

In Column 23, Line 10, delete "FBIk" and insert -- FBlk --, therefor.

In Column 23, Line 24, delete "FBIk" and insert -- FBlk --, therefor.

In Column 23, Line 48, delete "FBIk" and insert -- FBlk --, therefor.

In Column 23, Line 52, delete "FBIk" and insert -- FBlk --, therefor.

In Column 24, Line 26, delete "FBIk" and insert -- FBlk --, therefor.

In Column 24, Line 33, delete "FBIk." and insert -- FBlk. --, therefor.

In Column 24, Line 43, delete "FBIk." and insert -- FBlk. --, therefor.

In Column 24, Line 45, delete "FBIk" and insert -- FBlk --, therefor.

In Column 24, Line 49, delete "FBIk" and insert -- FBlk --, therefor.

In Column 24, Line 54, delete "FBIk" and insert -- FBlk --, therefor.

In Column 24, Line 59, delete "FBIk" and insert -- FBlk --, therefor.

In Column 24, Line 62, delete "FBIk" and insert -- FBlk --, therefor.

In Column 24, Line 67, delete "FBIk" and insert -- FBlk --, therefor.

In Column 25, Line 2, delete "FBIk" and insert -- FBlk --, therefor.

In Column 25, Line 5, delete "FBIk" and insert -- FBlk --, therefor.

In Column 25, Line 11, delete "FBIk" and insert -- FBlk --, therefor.

In Column 25, Line 14, delete "FBIk" and insert -- FBlk --, therefor.

In Column 25, Line 19, delete "FBIk" and insert -- FBlk --, therefor.

In Column 25, Line 21, delete "FBIk" and insert -- FBlk --, therefor.

In Column 25, Line 27, delete "FBIk-sent at block 602." and insert -- FBlk. --, therefor.

In Column 25, Line 29, delete "FBIk." and insert -- FBlk. --, therefor.

In Column 25, Line 34, delete "FBIk" and insert -- FBlk --, therefor.

In Column 25, Line 42, delete "FBIk" and insert -- FBlk --, therefor.

In Column 25, Line 48, delete "FBIk" and insert -- FBlk --, therefor.

In Column 25, Line 54, delete "FBIk" and insert -- FBlk --, therefor.

In Column 25, Line 54, delete "FBIk." and insert -- FBlk. --, therefor.

In Column 26, Line 44, delete "blacks." and insert -- blocks. --, therefor.

In Column 27, Line 1, delete "FBIk" and insert -- FBlk --, therefor.

In Column 28, Line 48, delete "FBIk" and insert -- FBlk --, therefor.

In Column 28, Line 49, delete "FBIk" and insert -- FBlk --, therefor.

In Column 30, Line 17, delete "FBIk" and insert -- FBlk --, therefor.

In Column 30, Line 33, delete "FBIk" and insert -- FBlk --, therefor.

In Column 30, Line 38, delete "FBIk" and insert -- FBlk --, therefor.

In Column 30, Line 39, delete "Nis" and insert -- N is --, therefor.

In Column 30, Line 46, delete "FBIk" and insert -- FBlk --, therefor.

In Column 30, Line 48, delete "FBIk" and insert -- FBlk --, therefor.

In Column 30, Line 50, delete "FBIk" and insert -- FBlk --, therefor.

In Column 31, Line 67, delete "FBIk" and insert -- FBlk --, therefor.

In Column 32, Line 43, delete "FBIk" and insert -- FBlk --, therefor.

In Column 32, Line 66, delete "FBIk" and insert -- FBlk --, therefor.

In Column 33, Line 3, delete "FBIk written to the FBIk" and insert -- FBlk written to the FBlk --, therefor.

In Column 33, Line 4, delete "FBIk" and insert -- FBlk --, therefor.

CERTIFICATE OF CORRECTION (continued)
U.S. Pat. No. 12,282,430 B1

In Column 33, Line 28, delete "FBIk." and insert -- FBlk. --, therefor.

In Column 33, Line 48, delete "FBIk" and insert -- FBlk --, therefor.

In Column 33, Line 51, delete "FBIk" and insert -- FBlk --, therefor.

In Column 34, Line 47, delete "FBIk" and insert -- FBlk --, therefor.

In Column 35, Line 11, delete "FBIk" and insert -- FBlk --, therefor.

In Column 36, Line 27, delete "FBIk" and insert -- FBlk --, therefor.

In Column 36, Line 51, delete "FBIk" and insert -- FBlk --, therefor.

In Column 37, Line 2, delete "FBIk" and insert -- FBlk --, therefor.

In Column 37, Line 39, delete "FBIk" and insert -- FBlk --, therefor.

In Column 37, Line 52, delete "FBIk" and insert -- FBlk --, therefor.

In Column 37, Line 55, delete "FBIk" and insert -- FBlk --, therefor.

In Column 37, Line 56, delete "FBIk." and insert -- FBlk. --, therefor.

In Column 37, Line 58, delete "FBIk" and insert -- FBlk --, therefor.

In Column 38, Line 9, delete "FBIk" and insert -- FBlk --, therefor.

In Column 38, Line 11, delete "FBIk" and insert -- FBlk --, therefor.

In Column 38, Line 66, delete "FBIk (i.e. the FBIk" and insert -- FBlk (i.e. the FBlk --, therefor.

In Column 39, Line 17, delete "FBIk." and insert -- FBlk. --, therefor.

In Column 39, Line 24, delete "FBIk" and insert -- FBlk --, therefor.

In Column 39, Line 29, delete "FBIk." and insert -- FBlk. --, therefor.

In Column 39, Line 41, delete "FBIk" and insert -- FBlk --, therefor.

In Column 39, Line 51, delete "FBIk" and insert -- FBlk --, therefor.

In Column 39, Line 53, delete "FBIk." and insert -- FBlk. --, therefor.

In Column 39, Line 57, delete "FBIk" and insert -- FBlk --, therefor.

CERTIFICATE OF CORRECTION (continued)
U.S. Pat. No. 12,282,430 B1

In Column 39, Line 62, delete "FBIk" and insert -- FBlk --, therefor.

In Column 39, Line 63, delete "FBIk," and insert -- FBlk, --, therefor.

In Column 39, Line 64, delete "FBIk." and insert -- FBlk. --, therefor.

In Column 40, Line 6, delete "FBIk," and insert -- FBlk, --, therefor.

In Column 40, Line 31, delete "FBIk" and insert -- FBlk --, therefor.

In Column 40, Line 32, delete "FBIk" and insert -- FBlk --, therefor.

In Column 40, Line 61, delete "FBIk," and insert -- FBlk, --, therefor.

In Column 40, Line 63, delete "FBIk," and insert -- FBlk, --, therefor.

In Column 40, Line 63, delete "FBIk" and insert -- FBlk --, therefor.

In Column 40, Line 64, delete "FBIk" and insert -- FBlk --, therefor.

In Column 40, Line 66, delete "FBIk." and insert -- FBlk. --, therefor.

In Column 40, Line 66, delete "FBIk" and insert -- FBlk --, therefor.

In Column 40, Line 67, delete "FBIk" and insert -- FBlk --, therefor.

In Column 41, Line 1, delete "FBIk is the FBIk" and insert -- FBlk is the FBlk --, therefor.

In Column 41, Line 53, delete "FBIk." and insert -- FBlk. --, therefor.

In Column 42, Line 8, delete "FBIk" and insert -- FBlk --, therefor.

In Column 42, Line 19, delete "FBIk" and insert -- FBlk --, therefor.

In Column 42, Line 23, delete "FBIk" and insert -- FBlk --, therefor.

In Column 42, Line 31, delete "FBIk" and insert -- FBlk --, therefor.

In Column 42, Line 36, delete "FBIk," and insert -- FBlk, --, therefor.

In Column 42, Line 38, delete "FBIk," and insert -- FBlk, --, therefor.

In Column 42, Line 40, delete "FBIk" and insert -- FBlk --, therefor.

In Column 43, Line 8, delete "FBIk," and insert -- FBlk, --, therefor.

In Column 43, Line 10, delete "FBIk" and insert -- FBlk --, therefor.

In Column 43, Line 11, delete "FBIk." and insert -- FBlk. --, therefor.

In Column 44, Lines 18-19, delete "HNFAT [J-1], BrDir-S [J-1]," and insert -- HNFAT[J-1], BrDir-S[J-1], --, therefor.

In Column 44, Line 19, delete "IndBr-S [J-1]," and insert -- IndBr-S[J-1], --, therefor.

In Column 44, Lines 22-23, delete "FBIk [J-1]," and insert -- FBlk[J-1], --, therefor.

In Column 44, Line 23, delete "FBIk [J-1]," and insert -- FBlk[J-1], --, therefor.

In Column 44, Line 24, delete "FBIk [J-1]" and insert -- FBlk[J-1] --, therefor.

In Column 44, Line 25, delete "BrDir-S [J-1], IndBr-S [J-1]," and insert -- BrDir-S[J-1], IndBr-S[J-1], --, therefor.

In Column 44, Line 55, delete "FBIk," and insert -- FBlk, --, therefor.

In Column 44, Line 57, delete "FBIk" and insert -- FBlk --, therefor.

In Column 44, Line 59, delete "FBIk," and insert -- FBlk, --, therefor.

In Column 44, Line 63, delete "FBIk" and insert -- FBlk --, therefor.

In Column 45, Line 16, delete "BrDir-S [J-1]" and insert -- BrDir-S[J-1] --, therefor.

In Column 45, Line 18, delete "FBIk," and insert -- FBlk, --, therefor.

In Column 45, Line 20, delete "FBIk," and insert -- FBlk, --, therefor.

In Column 45, Line 21, delete "IndBr-S [J-1]" and insert -- IndBr-S[J-1] --, therefor.

In Column 45, Line 22, delete "FBIk" and insert -- FBlk --, therefor.

In Column 45, Line 24, delete "BrDir-F [J]" and insert -- BrDir-F[J] --, therefor.

In Column 45, Line 29, delete "IndBr-F [J]" and insert -- IndBr-F[J] --, therefor.

In Column 45, Line 31, delete "FBIk" and insert -- FBlk --, therefor.

In Column 45, Line 41, delete "BrDir-S [J-1];" and insert -- BrDir-S[J-1]; --, therefor.

In Column 45, Line 46, delete "IndBr-S [J-1]" and insert -- IndBr-S[J-1] --, therefor.

CERTIFICATE OF CORRECTION (continued)
U.S. Pat. No. 12,282,430 B1

In Column 45, Lines 59-60, delete "HNFAT [J-1]" and insert -- HNFAT[J-1] --, therefor.

In Column 46, Line 14, delete "HNFAT [J-1]" and insert -- HNFAT[J-1] --, therefor.

In Column 46, Line 37, delete "HNFAT [J-1]" and insert -- HNFAT[J-1] --, therefor.

In Column 46, Lines 52-53, delete "MOC entry 330" and insert -- MTR entry 330 --, therefor.

In Column 46, Line 66, delete "FBIk" and insert -- FBlk --, therefor.

In Column 47, Line 3, delete "FBIk" and insert -- FBlk --, therefor.

In Column 48, Line 51, delete "BrDir-F [J], the IndBr-F [J]," and insert -- BrDir-F[J], the IndBr-F[J], --, therefor.

In Column 48, Line 56, delete "HNFAT [J], a BrDir-S [J], and a IndBr-S [J]" and insert -- HNFAT[J], a BrDir-S[J], and a IndBr-S[J] --, therefor.

In Column 48, Line 58, delete "BrDir-F [J]" and insert -- BrDir-F[J] --, therefor.

In Column 48, Line 59, delete "IndBr-F [J]" and insert -- IndBr-F[J] --, therefor.

In Column 48, Line 60, delete "FBlk [J]" and insert -- FBlk[J] --, therefor.

In Column 48, Line 60, delete "BrDir-S [J]" and insert -- BrDir-S[J] --, therefor.

In Column 48, Line 61, delete "IndBr-S [J]," and insert -- IndBr-S[J], --, therefor.

In Column 48, Line 63, delete "FBlk [J]," and insert -- FBlk[J], --, therefor.

In Column 49, Line 3, delete "FBlk [J]" and insert -- FBlk[J] --, therefor.

In Column 49, Lines 4-5, delete "HNFAT [J]," and insert -- HNFAT[J], --, therefor.

In Column 49, Line 7, delete "FBlk [J]" and insert -- FBlk[J] --, therefor.

In Column 49, Line 11, delete "HNFAT [J]" and insert -- HNFAT[J] --, therefor.

In Column 49, Line 13, delete "HNFAT [J]." and insert -- HNFAT[J]. --, therefor.

In Column 49, Lines 15-16, delete "HNFAT [J-1], BrDir-S [J-1], and IndBr-S [J-1])" and insert -- HNFAT[J-1], BrDir-S[J-1], and IndBr-S[J-1]) --, therefor.

In Column 49, Lines 36-37, delete "BrDir-F [J], and IndBr-F [J]" and insert -- BrDir-F[J], and IndBr-F[J] --, therefor.

CERTIFICATE OF CORRECTION (continued)
U.S. Pat. No. 12,282,430 B1

In Column 49, Line 46, delete "FBIk," and insert -- FBlk, --, therefor.

In Column 49, Line 46, delete "FBlk [J-1]" and insert -- FBlk[J-1] --, therefor.

In Column 49, Line 52, delete "FBIk" and insert -- FBlk --, therefor.

In Column 49, Line 59, delete "FBIk" and insert -- FBlk --, therefor.

In Column 49, Line 62, delete "FBIk" and insert -- FBlk --, therefor.

In Column 50, Line 60, delete "FBIk," and insert -- FBlk, --, therefor.

In Column 50, Line 60, delete "FBIk" and insert -- FBlk --, therefor.

In Column 50, Line 66, delete "FBIk," and insert -- FBlk, --, therefor.

In Column 51, Line 4, delete "FBIk" and insert -- FBlk --, therefor.

In Column 51, Line 37, delete "FBIk" and insert -- FBlk --, therefor.

In Column 51, Line 38, delete "FBIk" and insert -- FBlk --, therefor.

In Column 52, Line 5, delete "FBIk," and insert -- FBlk, --, therefor.

In Column 52, Line 10, delete "FBIk," and insert -- FBlk, --, therefor.

In Column 54, Line 47, delete "IndBr-S [J]" and insert -- IndBr-S[J] --, therefor.

In Column 54, Line 55, delete "BrDir-F [J+1]" and insert -- BrDir-F[J+1] --, therefor.

In Column 54, Line 56, delete "IndBr-F [J+1]" and insert -- IndBr-F[J+1] --, therefor.

In Column 54, Line 57, delete "BrDir-S [J+1]" and insert -- BrDir-S[J+1] --, therefor.

In Column 54, Line 57, delete "IndBr-S [J+1]" and insert -- IndBr-S[J+1] --, therefor.

In Column 55, Line 13, delete "FBIk" and insert -- FBlk --, therefor.

In Column 55, Line 15, delete "HNFAT [J-1], BrDir-S [J-1]," and insert -- HNFAT[J-1], BrDir-S[J-1], --, therefor.

In Column 55, Line 16, delete "IndBr-S [J-1]." and insert -- IndBr-S[J-1]. --, therefor.

In Column 55, Line 19, delete "FBIk." and insert -- FBlk. --, therefor.

In Column 55, Line 25, delete "BrDir-S [J-1], and IndBr-S [J-1]," and insert -- BrDir-S[J-1], and IndBr-S[J-1], --, therefor.

In Column 55, Line 29, delete "HNFAT [J-1]" and insert -- HNFAT[J-1] --, therefor.

In Column 55, Line 38, delete "HNFAT [J-1]" and insert -- HNFAT[J-1] --, therefor.

In Column 55, Line 49, delete "FBIk)" and insert -- FBlk) --, therefor.

In Column 55, Line 54, delete "BrDir-F [J])," and insert -- BrDir-F[J]), --, therefor.

In Column 55, Line 55, delete "IndBr-F [J])" and insert -- IndBr-F[J]) --, therefor.

In Column 55, Line 55 delete "FBIk" and insert -- FBlk --, therefor.

In Column 55, Line 65, delete "FBIk" and insert -- FBlk --, therefor.

In Column 56, Line 12, delete "FBIk;" and insert -- FBlk; --, therefor.

In Column 56, Line 13, delete "FBIk" and insert -- FBlk --, therefor.

In Column 56, Line 15, delete "FBIk;" and insert -- FBlk; --, therefor.

In Column 56, Line 16, delete "FBIk" and insert -- FBlk --, therefor.

In Column 56, Line 18, delete "FBIk." and insert -- FBlk. --, therefor.

In Column 56, Line 46, delete "FBIk" and insert -- FBlk --, therefor.

In Column 57, Line 8, delete "FBIk" and insert -- FBlk --, therefor.

In Column 57, Line 21, delete "FBIk" and insert -- FBlk --, therefor.

In Column 57, Line 26, delete "FBIk" and insert -- FBlk -- , therefor.

In Column 57, Line 38, delete "FBIk" and insert -- FBlk --, therefor.

In Column 58, Line 30, delete "His" and insert -- H is --, therefor.

In Column 58, Line 31, delete "ME 1" and insert -- ME I --, therefor.

In Column 58, Line 37, delete "FBIk" and insert -- FBlk --, therefor.

In Column 58, Line 45, delete "FBIk" and insert -- FBlk --, therefor.

In Column 58, Line 48, delete "FBIk" and insert -- FBlk --, therefor.

In Column 58, Line 49, delete "FBIk" and insert -- FBlk --, therefor.

In Column 58, Line 51, delete "FBIk" and insert -- FBlk --, therefor.

In Column 58, Line 53, delete "FBIk" and insert -- FBlk --, therefor.

In Column 58, Line 63, delete "FBIk" and insert -- FBlk --, therefor.

In Column 59, Line 7, delete "FBIk." and insert -- FBlk. --, therefor.

In Column 59, Line 8, delete "FBIk" and insert -- FBlk --, therefor.

In Column 59, Line 10, delete "FBIk" and insert -- FBlk --, therefor.

In Column 59, Line 12, delete "MDRES" and insert -- MDREs --, therefor.

In Column 59, Line 57, delete "FBIk" and insert -- FBlk --, therefor.

In Column 59, Line 59, delete "FBIk" and insert -- FBlk --, therefor.

In Column 60, Line 10, delete "FBIk" and insert -- FBlk --, therefor.

In Column 60, Line 16, delete "FBIk" and insert -- FBlk --, therefor.

In Column 60, Line 18, delete "FBIk" and insert -- FBlk --, therefor.

In Column 60, Line 22, delete "FBIk" and insert -- FBlk --, therefor.

In Column 60, Line 23, delete "FBIk" and insert -- FBlk --, therefor.

In Column 60, Line 26, delete "FBIk" and insert -- FBlk --, therefor.

In Column 60, Line 27, delete "FBIk" and insert -- FBlk --, therefor.

In Column 60, Line 29, delete "the FBIk" and insert -- the FBlk --, therefor.

In Column 60, Line 29, delete "FBIk" and insert -- FBlk --, therefor.

In Column 60, Line 33, delete "FBIk" and insert -- FBlk --, therefor.

In Column 60, Line 34, delete "FBIk" and insert -- FBlk --, therefor.

In Column 60, Line 34, delete "FBIk" and insert -- FBlk --, therefor.

In Column 60, Line 37, delete "FBIk" and insert -- FBlk --, therefor.

In Column 60, Line 38, delete "FBIk B from the FBIk" and insert -- FBlk B from the FBlk --, therefor.

In Column 60, Line 39, delete "FBIk" and insert -- FBlk --, therefor.

In Column 60, Line 40, delete "FBIk" and insert -- FBlk --, therefor.

In Column 60, Line 42, delete "FBIk" and insert -- FBlk --, therefor.

In Column 60, Line 45, delete "FBIk" and insert -- FBlk --, therefor.

In Column 60, Line 46, delete "FBIk D to the FBIk" and insert -- FBlk D to the FBlk --, therefor.

In Column 60, Line 47, delete "FBIk" and insert -- FBlk --, therefor.

In Column 60, Line 49, delete "FBIk" and insert -- FBlk --, therefor.

In Column 60, Line 50, delete "FBIk D from the FBIk" and insert -- FBlk D from the FBlk --, therefor.

In Column 60, Line 51, delete "FBIk E from the FBIk" and insert -- FBlk E from the FBlk --, therefor.

In Column 60, Line 52, delete "FBIk" and insert -- FBlk --, therefor.

In Column 60, Line 54, delete "FBIk" and insert -- FBlk --, therefor.

In Column 60, Line 55, delete "of FBIk" and insert -- of FBlk --, therefor.

In Column 60, Line 55, delete "the FBIk" and insert -- the FBlk --, therefor.

In Column 60, Line 56, delete "FBIk F to the FBIk" and insert -- FBlk F to the FBlk --, therefor.

In Column 60, Line 57, delete "FBIk" and insert -- FBlk --, therefor.

In Column 60, Line 60, delete "FBIk" and insert -- FBlk --, therefor.

In Column 60, Line 61, delete "FBIk" and insert -- FBlk --, therefor.

In Column 60, Line 62, delete "FBIk G to the FBIk" and insert -- FBlk G to the FBlk --, therefor.

In Column 60, Line 66, delete "FBIk G from the FBIk" and insert -- FBlk G from the FBlk --, therefor.

In Column 60, Line 67, delete "FBIk" and insert -- FBlk --, therefor.

In Column 61, Line 5, delete "FBIk" and insert -- FBlk --, therefor.
In Column 61, Line 6, delete "FBIk" and insert -- FBlk --, therefor.

CERTIFICATE OF CORRECTION (continued)
U.S. Pat. No. 12,282,430 B1

In Column 61, Line 11, delete "FBIk" and insert -- FBlk --, therefor.

In Column 61, Line 12, delete "FBIk" and insert -- FBlk --, therefor.

In Column 61, Line 16, delete "FBIk" and insert -- FBlk --, therefor.

In Column 61, Line 17, delete "FBIk" and insert -- FBlk --, therefor.

In Column 61, Line 18, delete "FBIk" and insert -- FBlk --, therefor.

In Column 61, Line 25, delete "FBIk/MDRE" and insert -- FBlk/MDRE --, therefor.

In Column 61, Line 28, delete "FBIk" and insert -- FBlk --, therefor.

In Column 61, Line 34, delete "FBIk" and insert -- FBlk --, therefor.

In Column 62, Line 18, delete "FBIk" and insert -- FBlk --, therefor.

In Column 63, Line 48, delete "unit"," and insert -- unit"), --, therefor.

In the Claims

In Column 66, Line 8, in Claim 17, delete "microprocessor" and insert -- method --, therefor.